US012231812B2

(12) United States Patent
Fang et al.

(10) Patent No.: US 12,231,812 B2
(45) Date of Patent: Feb. 18, 2025

(54) DEVICE INTERACTION METHOD AND ELECTRONIC DEVICE

(71) Applicant: Huawei Technologies Co., Ltd., Shenzhen (CN)

(72) Inventors: Rongjie Fang, Shenzhen (CN); Bing Yang, Shenzhen (CN); Weilong Lai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 169 days.

(21) Appl. No.: 17/912,615

(22) PCT Filed: Mar. 16, 2021

(86) PCT No.: PCT/CN2021/081065
§ 371 (c)(1),
(2) Date: Sep. 19, 2022

(87) PCT Pub. No.: WO2021/185244
PCT Pub. Date: Sep. 23, 2021

(65) Prior Publication Data
US 2023/0216990 A1    Jul. 6, 2023

(30) Foreign Application Priority Data
Mar. 18, 2020 (CN) .......................... 202010192324.5

(51) Int. Cl.
*H04N 7/15*       (2006.01)
*H04M 1/72412*    (2021.01)
(52) U.S. Cl.
CPC ........ *H04N 7/152* (2013.01); *H04M 1/72412* (2021.01)

(58) Field of Classification Search
CPC ............. H04N 7/152; H04N 21/42203; H04N 21/4223; H04N 21/4316; H04N 21/43615; H04N 21/4788; H04N 7/147; H04N 7/141; H04N 7/142; H04N 21/4122; H04N 21/4126; H04M 1/72412
See application file for complete search history.

(56) References Cited

U.S. PATENT DOCUMENTS

2010/0060715 A1    3/2010  Laasik et al.
2011/0164106 A1    7/2011  Kim
(Continued)

FOREIGN PATENT DOCUMENTS

CN    102572365 A    7/2012
CN    103813211 A    5/2014
(Continued)

OTHER PUBLICATIONS

Huang Zhou-yan, A Practical Study of Control and Management System of Smart Home, Enterprise Science and Technology & Development, Applied Technology, No. 18, (Cumulatively No. 336), Sep. 2012, 3 pages.

*Primary Examiner* — Yosef K Laekemariam
(74) *Attorney, Agent, or Firm* — Conley Rose, P.C.

(57) ABSTRACT

A device interaction method includes when an electronic device is in a video call state, that the electronic device may display a dialog box or a control. In response to an operation performed on the dialog box or the control, the electronic device interacts with another device in a same local area network such as switching a video call from the electronic device to a smart television or performing projection on a smart television.

20 Claims, 34 Drawing Sheets

(56) References Cited

U.S. PATENT DOCUMENTS

| | | |
|---|---|---|
| 2014/0240446 A1 | 8/2014 | Hsu et al. |
| 2016/0309118 A1 | 10/2016 | Li et al. |
| 2017/0163796 A1 | 6/2017 | Brooksby et al. |
| 2017/0171254 A1 | 6/2017 | Hua et al. |
| 2018/0352192 A1 | 12/2018 | Matsubara |

FOREIGN PATENT DOCUMENTS

| | | | | |
|---|---|---|---|---|
| CN | 104461701 A | | 3/2015 | |
| CN | 104954724 A | | 9/2015 | |
| CN | 105635625 A | | 6/2016 | |
| CN | 105898181 A | | 8/2016 | |
| CN | 106101600 A | | 11/2016 | |
| CN | 106791570 A | | 5/2017 | |
| CN | 106856472 A | | 6/2017 | |
| CN | 107493451 A | | 12/2017 | |
| CN | 108829461 A | | 11/2018 | |
| CN | 108881779 A | | 11/2018 | |
| CN | 108881780 A | | 11/2018 | |
| CN | 108924289 A | | 11/2018 | |
| CN | 109495769 A | | 3/2019 | |
| CN | 109714557 A | | 5/2019 | |
| CN | 110087012 A | | 8/2019 | |
| CN | 110138937 | * | 8/2019 | .............. H04M 1/02 |
| CN | 110138937 A | | 8/2019 | |
| GB | 2463103 A | | 3/2010 | |

\* cited by examiner

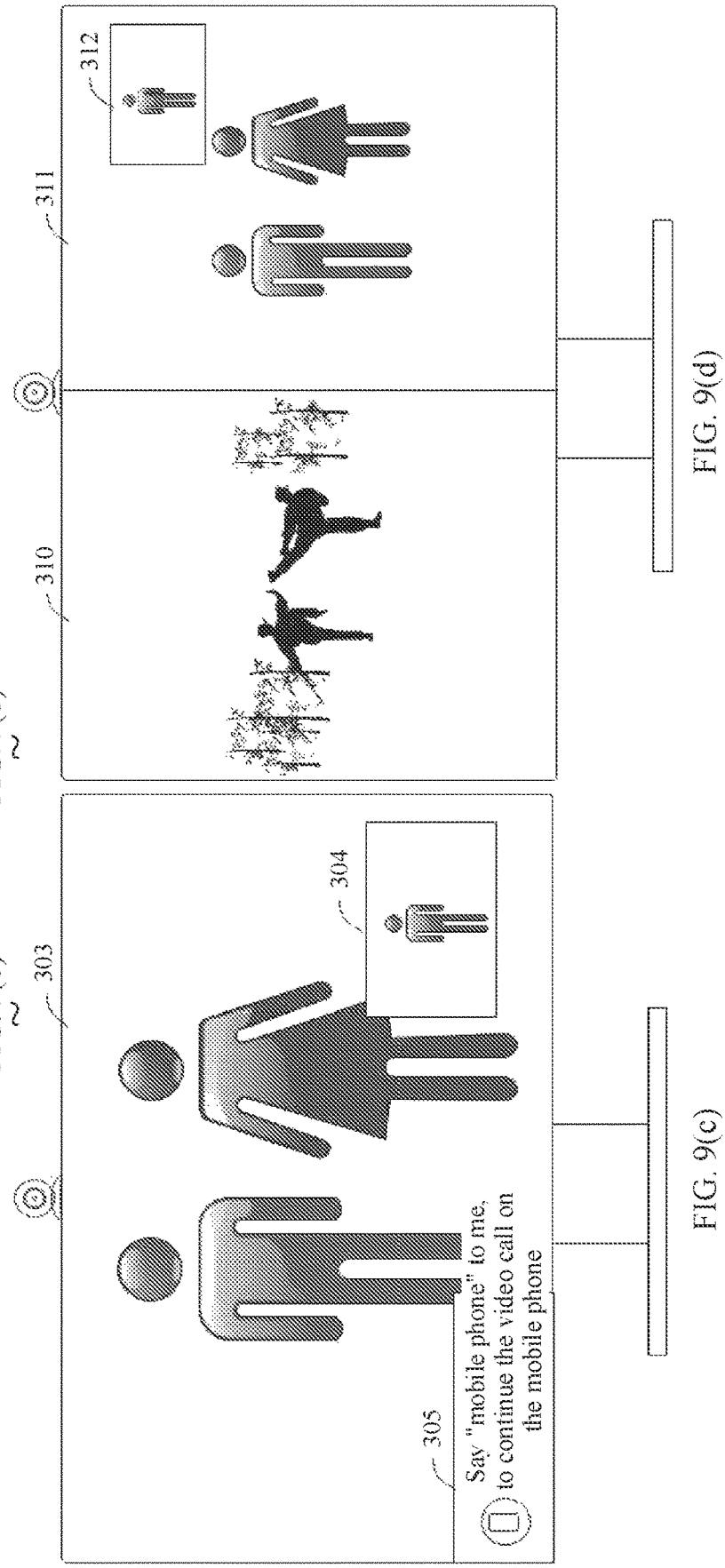

DEVICE INTERACTION METHOD AND ELECTRONIC DEVICE

CROSS-REFERENCE TO RELATED APPLICATIONS

This is a U.S. National Stage of International Patent Application No. PCT/CN2021/081065 filed on Mar. 16, 2021, which claims priority to Chinese Patent Application No. 202010192324.5 filed on Mar. 18, 2020, both of which are hereby incorporated by reference in their entireties.

TECHNICAL FIELD

This application relates to the terminal field, and in particular, to a device interaction method and an electronic device.

BACKGROUND

With development of terminal technologies, more and more applications can be implemented by using a mobile phone. However, limited by a structure and capabilities of the mobile phone, user experience with some applications is not optimal on the mobile phone. For example, the mobile phone does not have a large screen to provide a good image display effect when playing a video. For another example, the mobile phone needs to be hand-held during a video call due to the small screen, which brings a poor display effect.

With development of an Internet of things (Internet of Things, IoT) technology, better user experience can be obtained in the foregoing scenarios by using the technology. For example, when making a video call by using a mobile phone, a user may choose to transfer video content displayed on the mobile phone to a smart television for display. In this way, the user does not need to hold the device, and both a display effect and user experience are satisfactory. However, the foregoing operation is relatively cumbersome. Consequently, capabilities of a smart device are not fully applied.

SUMMARY

An objective of the present invention is to provide a device interaction method, device, and system, which can prompt a user to perform device interaction, so that capabilities of a smart device are fully utilized, and user experience is improved.

The foregoing objective and other objectives are achieved by using features in the independent claims. Further implementations are embodied in the dependent claims, the specification, and the accompanying drawings.

According to a first aspect, a device interaction method is provided, including: A first device displays a first interface; the first device determines that a first hardware resource is used and determines a first application that uses the first hardware resource; the first device determines that a second hardware resource is used and determines a second application that uses the second hardware resource; the first device displays a first control on the first interface when a preset condition is met, where the preset condition includes: the first device determines that the first application and the second application are a same application, and the first device determines that a second device has a video playback capability, where the second device and the first device are connected to a same local area network; and the first device sends first information to the second device in response to a first operation on the first control. The first information enables the second device to display a second interface, and the second interface is associated with the first interface. The first hardware resource is a camera, and the second hardware resource is an audio resource; or the first hardware resource is an audio resource, and the second hardware resource is a camera.

According to the technical solution described in the first aspect, the first device can determine a status of the first device, to prompt a user to perform device interaction with the second device. This fully utilizes capabilities of a smart device and improves user experience.

According to the first aspect, in a possible implementation, the camera is a front-facing camera.

According to the foregoing implementation, a status of the camera can be determined more accurately.

According to the first aspect, in a possible implementation, the audio resource includes a microphone.

According to the foregoing implementation, a status of an audio device can be determined more accurately.

According to the first aspect, in a possible implementation, the first interface is an interface of a video call.

The interface of the video call may be an interface before the video call is connected, or may be an interface after the video call is connected. According to the foregoing implementation, the first device determines that the first device is in a video call state.

According to the first aspect, in a possible implementation, the second interface is the same as the first interface.

Herein, that the second interface is the same as the first interface indicates that the second interface may be the same as an interface displayed on the first device, or may be the same as a part that is of an interface displayed on the first device and that does not include a status bar and a navigation bar.

According to the foregoing implementation, the second device can display an interface that is the same as an interface of the first device.

According to the first aspect, in a possible implementation, the first interface and the second interface include a same element and different layouts.

Herein, that the first interface and the second interface include a same element indicates that both the first interface and the second interface include a display area for displaying data collected by cameras of both parties of the video call. That the first interface and the second interface include different layouts indicates that relative locations of the display areas are different.

According to the foregoing implementation, the first device may switch the video call from the first device to the second device for continuing.

According to the first aspect, in a possible implementation, the first interface is the interface before the video call is connected, and the second interface is the interface after the video call is connected.

According to the foregoing implementation, the first device may prompt to perform switching when the video call is not connected, and connect the video call after the switching.

According to the first aspect, in a possible implementation, in response to the first operation, the video call is connected.

According to the foregoing implementation, user operations can be reduced in a video call switching process.

According to the first aspect, in a possible implementation, the first device determines, by using a first message sent by a camera manager, that the camera is used; and the first device determines, by using a second message sent by an audio manager, that the audio resource is used.

According to the foregoing implementation, the first device can determine that each hardware resource is used.

According to the first aspect, in a possible implementation, the first device determines a first foreground application when determining that the first hardware resource is used; the first device determines a second foreground application when determining that the second hardware resource is used; and in response to the fact that the first device determines that the second foreground application and the first foreground application are a same application, the first device determines the first foreground application as the first application, and determines the second foreground application as the second application.

According to the foregoing implementation, an application that uses the hardware resource is determined by determining a foreground application when the hardware resource is used.

According to the first aspect, in a possible implementation, when the first device determines that the first hardware resource and the second hardware resource are used, the first device respectively determines a first foreground application and a second foreground application based on time of receiving the first message and time of receiving the second message; and in response to the fact that the first device determines that the second foreground application and the first foreground application are a same application, the first device determines the first foreground application as the first application, and determines the second foreground application as the second application.

According to the foregoing implementation, the first device can start to determine the foreground application when determining that both the first hardware resource and the second hardware resource are used. This improves determining efficiency.

According to the first aspect, in a possible implementation, in response to the fact that the first device determines that the first foreground application and the second foreground application are different applications, the first device determines, by using first permission access information of the first hardware resource, the first application that uses the first hardware resource, and determines, by using second permission access information of the second hardware resource, the second application that uses the second hardware resource.

Herein, permission access information may include a permission access record.

According to the foregoing implementation, the first device can more accurately determine the application that uses the hardware resource.

According to the first aspect, in a possible implementation, in response to the fact that the first device determines that the first foreground application and the second foreground application are different applications, the first device determines, by using permission access information of the microphone, an application that uses the audio resource.

According to the foregoing implementation, the first device determines, based on a service feature of the video call, an application that correspondingly uses a hardware resource.

According to the first aspect, in a possible implementation, the first device displays a second control on the first interface when the preset condition further includes that the first device determines that a third device has the video playback capability, where the third device and the first device are connected to a same local area network; and the first device sends second information to the third device in response to an operation on the second control. The second information enables the third device to display a third interface, and the third interface is associated with the first interface.

According to the foregoing implementation, the first device can display a plurality of interactive devices to the user.

According to the first aspect, in a possible implementation, the first interface is an interface displayed when a video call request is received. When the preset condition is met, the method further includes: The first device sends third information to the second device. The third information enables the second device to display the video call request.

According to the foregoing implementation, the second device can prompt the user of the video call request.

According to the first aspect, in a possible implementation, when the second device displays the second interface, and the first device is disconnected from the local area network, the first device displays the first interface, and the second device does not display the second interface.

According to the foregoing implementation, the first device can perform device interaction based on a network status.

According to the first aspect, in a possible implementation, the first device displays a third control when the second device displays the second interface, so that the second device does not display the second interface in response to an operation on the third control.

According to the foregoing implementation, the first device can switch the video call back to a mobile phone for continuing.

According to the first aspect, in a possible implementation, the preset condition further includes: The first device determines that the first application is included in an application list. The application list includes information about one or more video call applications.

According to the foregoing implementation, the first device may perform different processing on different video call applications.

According to a second aspect, a device interaction system is provided, including: a first device and a second device. The second device and the first device are connected to a same local area network. The first device displays a first interface; the first device determines that a first hardware resource is used and determines a first application that uses the first hardware resource; the first device determines that a second hardware resource is used and determines a second application that uses the second hardware resource; the first device displays a first control on the first interface when a preset condition is met, where the preset condition includes: the first device determines that the first application and the second application are a same application, and the first device determines that the second device has a video playback capability; the first device sends first information to the second device in response to a first operation on the first control; and the second device displays a second interface in response to receiving the first information. The second interface is associated with the first interface. The first hardware resource is a camera, and the second hardware resource is an audio resource; or the first hardware resource is an audio resource, and the second hardware resource is a camera.

According to the technical solution described in the second aspect, the first device can determine a status of the first device, to prompt a user to perform device interaction with the second device. This fully utilizes capabilities of a smart device and improves user experience.

According to the second aspect, in a possible implementation, the camera is a front-facing camera.

According to the foregoing implementation, a status of the camera can be determined more accurately.

According to the second aspect, in a possible implementation, the audio resource includes a microphone.

According to the foregoing implementation, a status of an audio device can be determined more accurately.

According to the second aspect, in a possible implementation, the first interface is an interface of a video call.

The interface of the video call may be an interface before the video call is connected, or may be an interface after the video call is connected. According to the foregoing implementation, the first device determines that the first device is in a video call state.

According to the second aspect, in a possible implementation, the second interface is the same as the first interface.

Herein, that the second interface is the same as the first interface indicates that the second interface may be the same as an interface displayed on the first device, or may be the same as a part that is of an interface displayed on the first device and that does not include a status bar and a navigation bar.

According to the foregoing implementation, the second device can display an interface that is the same as an interface of the first device.

According to the second aspect, in a possible implementation, the first interface and the second interface include a same element and different layouts.

Herein, that the first interface and the second interface include a same element indicates that both the first interface and the second interface include a display area for displaying data collected by cameras of both parties of the video call. That the first interface and the second interface include different layouts indicates that relative locations of the display areas are different.

According to the foregoing implementation, the first device may switch the video call from the first device to the second device for continuing.

According to the second aspect, in a possible implementation, the first interface is the interface before the video call is connected, and the second interface is the interface after the video call is connected.

According to the foregoing implementation, the first device may prompt to perform switching when the video call is not connected, and connect the video call after the switching.

According to the second aspect, in a possible implementation, in response to the first operation, the video call is connected.

According to the foregoing implementation, user operations can be reduced in a video call switching process.

According to the second aspect, in a possible implementation, the first device determines, by using a first message sent by a camera manager, that the camera is used; and the first device determines, by using a second message sent by an audio manager, that the audio resource is used.

According to the foregoing implementation, the first device can determine that each hardware resource is used.

According to the second aspect, in a possible implementation, the first device determines a first foreground application when determining that the first hardware resource is used; the first device determines a second foreground application when determining that the second hardware resource is used; and in response to the fact that the first device determines that the second foreground application and the first foreground application are a same application, the first device determines the first foreground application as the first application, and determines the second foreground application as the second application.

According to the foregoing implementation, an application that uses the hardware resource is determined by determining a foreground application when the hardware resource is used.

According to the second aspect, in a possible implementation, when the first device determines that the first hardware resource and the second hardware resource are used, the first device respectively determines a first foreground application and a second foreground application based on time of receiving the first message and time of receiving the second message; and in response to the fact that the first device determines that the second foreground application and the first foreground application are a same application, the first device determines the first foreground application as the first application, and determines the second foreground application as the second application.

According to the foregoing implementation, the first device can start to determine the foreground application when determining that both the first hardware resource and the second hardware resource are used. This improves determining efficiency.

According to the second aspect, in a possible implementation, in response to the fact that the first device determines that the first foreground application and the second foreground application are different applications, the first device determines, by using first permission access information of the first hardware resource, the first application that uses the first hardware resource, and determines, by using second permission access information of the second hardware resource, the second application that uses the second hardware resource.

According to the foregoing implementation, the first device can more accurately determine the application that uses the hardware resource.

According to the second aspect, in a possible implementation, in response to the fact that the first device determines that the first foreground application and the second foreground application are different applications, the first device determines, by using permission access information of the microphone, an application that uses the audio resource.

According to the foregoing implementation, the first device determines, based on a service feature of the video call, an application that correspondingly uses a hardware resource.

According to the second aspect, in a possible implementation, the system further includes a third device. The third device and the first device are connected to a same local area network. The first device displays a second control on the first interface when the preset condition further includes that the first device determines that the third device has the video playback capability; and the first device sends second information to the third device in response to an operation on the second control. The second information enables the third device to display a third interface, and the third interface is associated with the first interface.

According to the foregoing implementation, the first device can display a plurality of interactive devices to the user.

According to the second aspect, in a possible implementation, the first interface is an interface displayed when a video call request is received. When the preset condition is met, the following is further included: The first device sends third information to the second device, and in response to receiving the third information, the second device displays the video call request.

According to the foregoing implementation, the second device can prompt the user of the video call request.

According to the second aspect, in a possible implementation, when the second device displays the second interface, and the first device is disconnected from the local area network, the first device displays the first interface, and the second device does not display the second interface.

According to the foregoing implementation, the first device can perform device interaction based on a network status.

According to the second aspect, in a possible implementation, the first device displays a third control when the second device displays the second interface, so that the second device does not display the second interface in response to an operation on the third control.

According to the foregoing implementation, the first device can switch the video call back to a mobile phone for continuing.

According to the second aspect, in a possible implementation, the preset condition further includes: The first device determines that the first application is included in an application list. The application list includes information about one or more video call applications.

According to the foregoing implementation, the first device may perform different processing on different video call applications.

According to the second aspect, in a possible implementation, before the second device displays the interface of the video call, the following is further included: The second device displays first video information; and in response to the first operation, the second device displays the first video information and the interface of the video call.

According to the foregoing implementation, the second device can simultaneously perform video playback and the video call.

According to the second aspect, in a possible implementation, in response to the first operation, the second device displays second information. The second information is used to prompt the user to perform a second operation. The second device detects the second operation, and the second operation is performed on the second device. In response to the second operation, the first device displays the interface of the video call.

According to the foregoing implementation, the second device prompts the user to perform device interaction.

According to the second aspect, in a possible implementation, before the first device establishes a video call with the second device, the following is further included: The first device displays a third interface. The first device displays the third interface in response to the first operation, where the third interface includes the third control; the first device detects a third operation, where the third operation is performed on the third control; and the first device displays the interface of the video call in response to the third operation.

According to the foregoing implementation, the second device can perform user interaction.

According to a third aspect, an electronic device is provided, including one or more processors, a memory, and one or more programs. The one or more programs are stored in the memory and are configured to be executed by the one or more processors, the one or more programs include instructions, and the instructions used to perform the method according to the implementations of the first aspect.

According to a fourth aspect, a computer-readable medium is provided, and is configured to store one or more programs. The one or more programs are configured to be executed by one or more processors, the one or more programs include instructions, and the instructions are used to perform the method according to the implementations of the first aspect.

It should be understood that descriptions of technical features, technical solutions, advantages, or similar words in this specification do not imply that all features and advantages can be implemented in any individual embodiment. In contrast, it may be understood that the descriptions of the features or advantages mean that a particular technical feature, technical solution, or advantage is included in at least one embodiment. Therefore, the descriptions of the technical features, technical solutions, or advantages in this specification do not necessarily indicate a same embodiment. Further, the technical features, technical solutions, and advantages described in the following embodiments may be combined in any proper manner. A person skilled in the art should understand that an embodiment may be implemented without one or more particular technical features, technical solutions, or advantages of a particular embodiment. In other embodiments, an additional technical feature and advantage may be identified in a particular embodiment that does not embody all the embodiments.

BRIEF DESCRIPTION OF DRAWINGS

FIG. 9(a) to FIG. 9(d) show further graphical user interfaces during device interaction according to an embodiment of this application;

DESCRIPTION OF EMBODIMENTS

Figure 1:
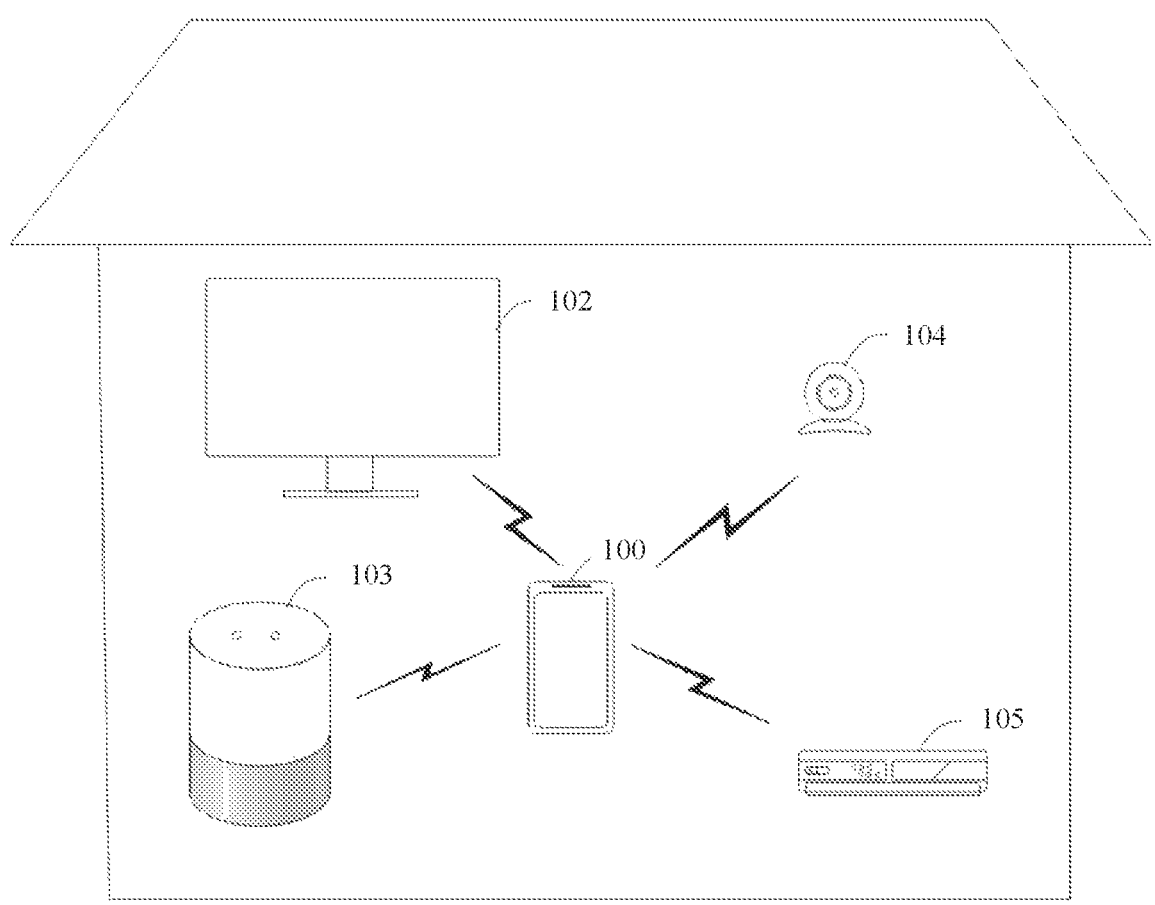
FIG. 1 is a diagram of a system framework to which a device interaction method is applied according to an embodiment of this application.

Terms used in the following embodiments of this application are merely intended to describe particular embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that, a term "and/or" used in this application indicates and includes any one or all of possible combinations of one or more listed items.

The following describes an electronic device, a graphical user interface used for such an electronic device, and embodiments used for using such an electronic device. In some embodiments, the electronic device may be a portable electronic device that further includes other functions such as a personal digital assistant function and/or a music player function, for example, a mobile phone, a tablet computer, or a wearable electronic device having a wireless communications function (for example, a smartwatch). An example embodiment of a portable electronic device includes but is not limited to a portable electronic device using iOS®, Android®, Microsoft®, or another operating system. The portable electronic device may alternatively be another portable electronic device, for example, a laptop (Laptop) computer having a touch-sensitive surface or a touch panel. It should be further understood that, in some other embodiments, the electronic device may not be a portable electronic device, but is a desktop computer having a touch-sensitive surface or a touch panel.

A term "user interface (user interface, UI)" in this specification, the claims, and the accompanying drawings of this application is a medium interface for interaction and information exchange between a user and an application or an operating system, and the interface implements conversion between an internal form of information and a form that can be accepted by the user. A user interface of an application is source code written in a specific computer language such as Java or an extensible markup language (extensible markup language, XML). Interface source code is parsed and rendered on a terminal device, and finally is presented as user-recognizable content, for example, a control such as an image, a text, or a button. A control (control), also referred to as a widget (widget), is a basic element in the user interface. Typical controls include a toolbar (toolbar), a menu bar (menu bar), a text box (text box), a button (button), a scrollbar (scrollbar), an image, and a text. An attribute and content of a control in an interface are defined by using a tag or a node. For example, the control included in the interface is defined in the XML by using a node such as <Textview>, <ImgView>, or <VideoView>. One node corresponds to one control or attribute in the interface. After being parsed and rendered, the node is presented as user-visible content. In addition, interfaces of a plurality of applications such as a hybrid application (hybrid application) usually further include a web page. A web page, also referred to as a page, may be understood as a special control embedded in an interface of an application. A web page is source code written in a specific computer language, for example, a hypertext markup language (hypertext markup language, HTML), cascading style sheets (cascading style sheets, CSS), or JavaScript (JavaScript, JS). The web page source code may be loaded and displayed as user-recognizable content by a browser or a web page display component with a function similar to a function of the browser. Specific content included in the web page is also defined by using a tag or a node in the web page source code. For example, an element and an attribute of the web page are defined in the HTML by using <p>, <img>, <video>, or <canvas>.

The user interface is usually represented in a form of a graphical user interface (graphical user interface, GUI), and is a user interface that is related to a computer operation and that is displayed in a graphic manner. The user interface may be an interface element such as an icon, a window, or a control displayed on a display of an electronic device. The control may include visible interface elements such as an icon, a button, a menu, a tab, a text box, a dialog box, a status bar, a navigation bar, or a widget.

FIG. 1 shows an example of an application scenario of a device interaction method according to an embodiment of this application. As shown in FIG. 1, an electronic device 100, a smart television 102, a smart speaker 103, and other devices form a device group, and all devices in the device group may communicate with each other.

For example, a mobile phone, a tablet computer, a smart speaker, a smartwatch, and a notebook computer of a user may be used as a device group. When the user logs in to the mobile phone, the tablet computer, the smart speaker, the smartwatch, and the notebook computer by using a same account, the mobile phone, the tablet computer, the smart speaker, and the notebook computer are in one local area network (Local Area Network, LAN), and all devices in the local area network may communicate with each other. The devices in the local area network may be connected to the local area network in a wired or wireless manner.

For another example, electronic devices 100 may alternatively form a local area network in a wireless communications manner (for example, Bluetooth, Wi-Fi, or a ZigBee network). For example, a user can add a mobile phone, a tablet computer, a smart speaker, and a notebook computer to a Wi-Fi network named "1234". Each electronic device 100 in the Wi-Fi network forms a local area network, and all devices in the local area network form a device group.

Certainly, in addition to the local area network, the electronic devices 100 in the device group may alternatively be interconnected through a cellular network, or the electronic devices 100 may be interconnected through a transfer device (for example, a USB data cable or a dock device), to implement a communications function between the electronic devices 100 in the device group. This is not limited in this embodiment of this application.

According to the device interaction method provided in this embodiment of this application, the electronic device in a specific state can prompt the user to interact with another device.

For example, a user performs a video call by using a mobile phone. When it is determined that the mobile phone is currently in a video call state, the mobile phone prompts the user that a mobile phone interface may be switched to the smart television.

Alternatively, a user performs a voice call by using a mobile phone. When it is determined that the mobile phone is currently in a voice call state, the mobile phone prompts the user that a voice signal may be switched to the smart speaker, so that the user performs the voice call by using the smart speaker.

Alternatively, when a user watches a video by using a tablet computer, and when the tablet computer determines that the video is currently being played, the tablet computer prompts the user that a video signal may be switched to the smart television for playing.

The electronic device 100 may interact with one or more of the devices shown in FIG. 1.

It may be understood that a device in the device group is not limited to the device type shown in FIG. 1. The device may also be a device such as a network camera, a set-top box, an unmanned aerial vehicle, or an electronic game console, or may be a device such as a tablet computer, a PDA, or a desktop computer, or may be an intelligent wearable device or an in-vehicle device.

Figure 2A:
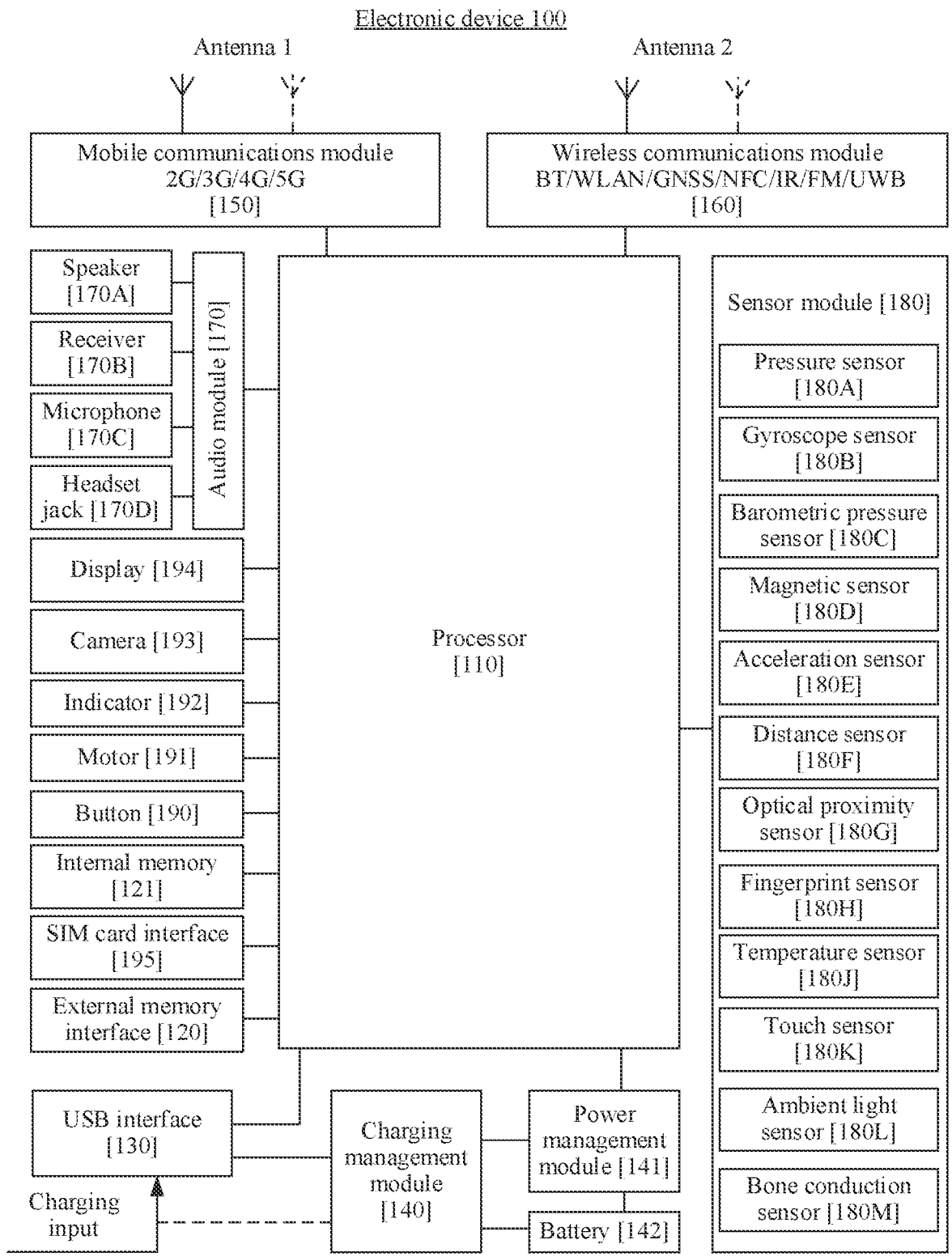
FIG. 2A is a block diagram of an electronic device according to an embodiment of this application.

FIG. 2A is a schematic diagram of a structure of the electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. In some embodiments, the electronic device 100 may alternatively include one or more processors 110.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, so that efficiency of the electronic device 100 is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like.

The I2C interface is a two-way synchronous serial bus, including a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 via the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the electronic device 100, or may be configured to transmit data between the electronic device 100 and a peripheral device, or may be configured to connect to a headset for playing audio through the headset. The interface may be further configured to connect to another electronic device such as an AR device.

It may be understood that an interface connection relationship between the modules that is shown in this embodiment of the present invention is merely an example for description, and does not constitute a limitation on the structure of the electronic device 100. In some other embodiments, the electronic device 100 may alternatively use an interface connection manner different from an interface connection manner in the foregoing embodiment, or use a combination of a plurality of interface connection manners.

The charging management module 140 is configured to receive charging input from the charger. The charger may be a wireless charger or a wired charger. In some embodiments of wired charging, the charging management module 140 may receive charging input of the wired charger through the USB interface 130. In some embodiments of wireless charging, the charging management module 140 may receive wireless charging input through a wireless charging coil of the electronic device 100. The charging management module 140 supplies power to the electronic device through the power management module 141 while charging the battery 142.

The power management module 141 is configured to connect the battery 142 and the charging management module 140 to the processor 110. The power management module 141 receives input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may further be multiplexed to improve antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G, 3G, 4G, 5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules of the mobile communications module 150 may be disposed in the same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent component. In some other embodiments, the modem processor may be independent of the processor 110, and is disposed in the same device as the mobile communications module 150 or another functional module.

The wireless communications module 160 may provide a wireless communication solution that is applied to the electronic device 100 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, ultra-wideband (UWB), or the like. The wireless communications module 160 may be one or more components integrating at least one communications processor module. The wireless communications module 160 receives an electromagnetic wave through the antenna, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna. For example, the wireless communications module 160 may include a Bluetooth module and a Wi-Fi module.

In some embodiments, the antenna 1 of the electronic device 100 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), a millimeter wave (mmWave), BT, a GNSS, a WLAN, NFC, FM, UWB, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute instructions to generate or change display information.

The display 194 is configured to display an image, a video, and the like. The display 194 includes a display panel. The display panel may use a liquid crystal display (liquid crystal display, LCD), an organic light-emitting diode (organic light-emitting diode, OLED), an active-matrix organic light-emitting diode or an active-matrix organic light-emitting diode (active-matrix organic light emitting diode, AMOLED), a flexible light-emitting diode (flexible light-emitting diode, FLED), a mini LED, a micro LED, a micro OLED, a quantum dot light-emitting diode (quantum dot light emitting diode, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor AP, and the like.

The ISP may be configured to process data fed back by the camera 193. For example, during photographing, a shutter is pressed, a ray of light is transmitted to a photosensitive element of the camera through a lens, and an optical signal is converted into an electrical signal. The photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected to the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193, and N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 can play or record videos of a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by drawing on a structure of a biological neural network, for example, by drawing on a transfer mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be configured to connect to an external storage card, for example, a micro SD card, to extend a storage capability of the electronic device 100. The external memory card communicates with the processor 110 through the external memory interface 120, to implement a data storage function. For example, data such as music, a photo, and video is stored in the external memory card.

The internal memory 121 may be configured to store one or more computer programs, and the one or more computer programs include instructions. The processor 110 may run the instructions stored in the internal memory 121, so that the electronic device 100 is enabled to perform the data sharing method provided in some embodiments of this application, various function applications, data processing, and the like. The internal memory 121 may include a program storage area and a data storage area. The program storage area may store an operating system. The program storage area may further store one or more applications (such as Gallery and Contacts), and the like. The data storage area may store data (for example, Photos and Contacts) created during use of the electronic device 100. In addition, the internal memory 121 may include a high-speed random access memory, and may further include a nonvolatile memory, for example, at least one magnetic disk storage device, a flash memory, or a universal flash storage (universal flash storage, UFS).

The electronic device 100 may implement audio functions by using the audio module 170, the speaker 170A, the receiver 170B, the microphone 170C, the headset jack 170D, the application processor, and the like, for example, implement a music playback function and a recording function.

The audio module 170 is configured to convert digital audio information into an analog audio signal for output, and is also configured to convert analog audio input into a digital audio signal. The audio module 170 may be further configured to code and decode audio signals. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be configured to play music or answer a call in a hands-free mode by using the speaker 170A.

The receiver 170B, also referred to as an "earpiece", is configured to convert an electrical audio signal into a sound signal. When a call is answered or speech information is received through the electronic device 100, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile electronic device platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation through the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the electronic device 100. In some embodiments, an angular velocity of the electronic device 100 around three axes (namely, axes x, y, and z) may be determined by using the gyroscope sensor 180B. The gyroscope sensor 180B may be configured to implement image stabilization during photographing. For example, when the shutter is pressed, the gyroscope sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyroscope sensor 180B may also be used in navigation and motion sensing game scenarios.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance through the distance sensor 180F to implement quick focusing.

The optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object through the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be configured to automatically unlock and lock a screen in a flip cover mode and a pocket mode.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may implement fingerprint-based unlocking, application access locking, fingerprint-based photographing, fingerprint-based call answering, and the like by using a feature of the collected fingerprint.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is lower than still another threshold, the electronic device 100 boosts an output voltage of the battery 142 to avoid abnormal shutdown caused by a low temperature.

The touch sensor 180K may also be referred to as a touch panel or a touch-sensitive surface. The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor to determine a type of the touch event. A visual output related to the touch operation may be provided through the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and functional control of the electronic device 100.

The motor 191 may generate a vibration prompt. The motor 191 may be configured to provide an incoming call vibration prompt or a touch vibration feedback. For example, touch operations performed on different applications (such as a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be inserted into the same SIM card interface 195 at the same time. The plurality of cards may be of a same type or different types. The SIM card interface 195 may be compatible with different types of SIM cards. The SIM card interface 195 is also compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The electronic device 100 shown in FIG. 2A as an example may display, by using the display 194, graphical user interfaces described in the following embodiments. The electronic device 100 may detect a touch operation in each graphical user interface by using the touch sensor 180K, for example, a tap operation (for example, a touch operation or a double-tap operation on an icon) in each graphical user interface, or an upward or downward swipe operation or an operation of drawing a circle gesture in each graphical user interface. In some embodiments, the electronic device 100 may detect, by using the gyroscope sensor 180B, the acceleration sensor 180E, or the like, a motion gesture made by the user by holding the electronic device 100, for example, shaking the electronic device. In some embodiments, the electronic device 100 may detect a non-touch gesture operation by using the camera 193 (for example, a 3D camera or a depth camera).

A software system of the electronic device 100 may use a layered architecture, an event-driven architecture, a micro-kernel architecture, a micro service architecture, or a cloud architecture. In this embodiment of the present invention, an Android system of a layered architecture is used as an example to illustrate the software structure of the electronic device 100.

Figure 2B:
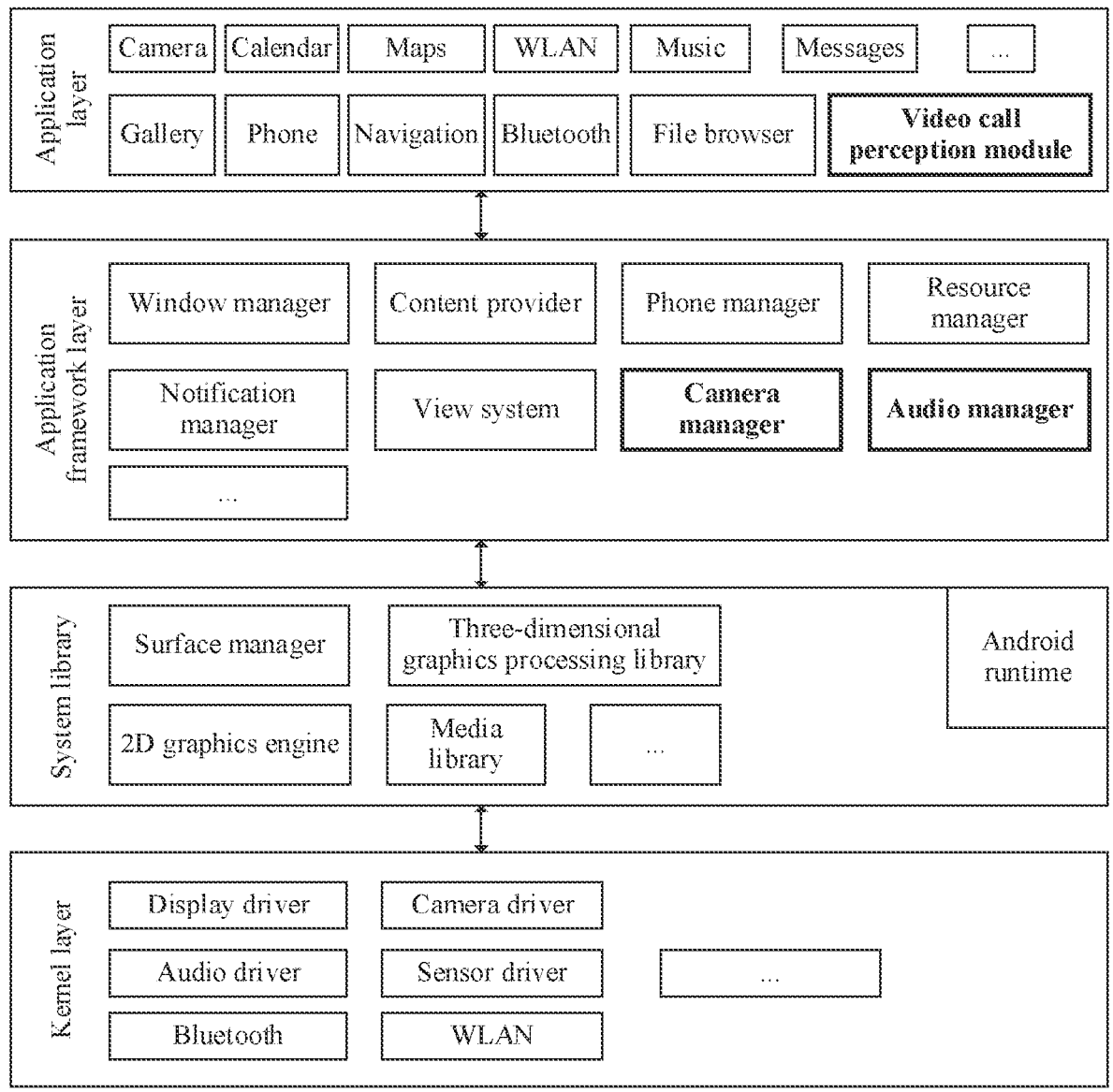
FIG. 2B is a diagram of a software framework of an electronic device according to an embodiment of this application.
Figure 3A:
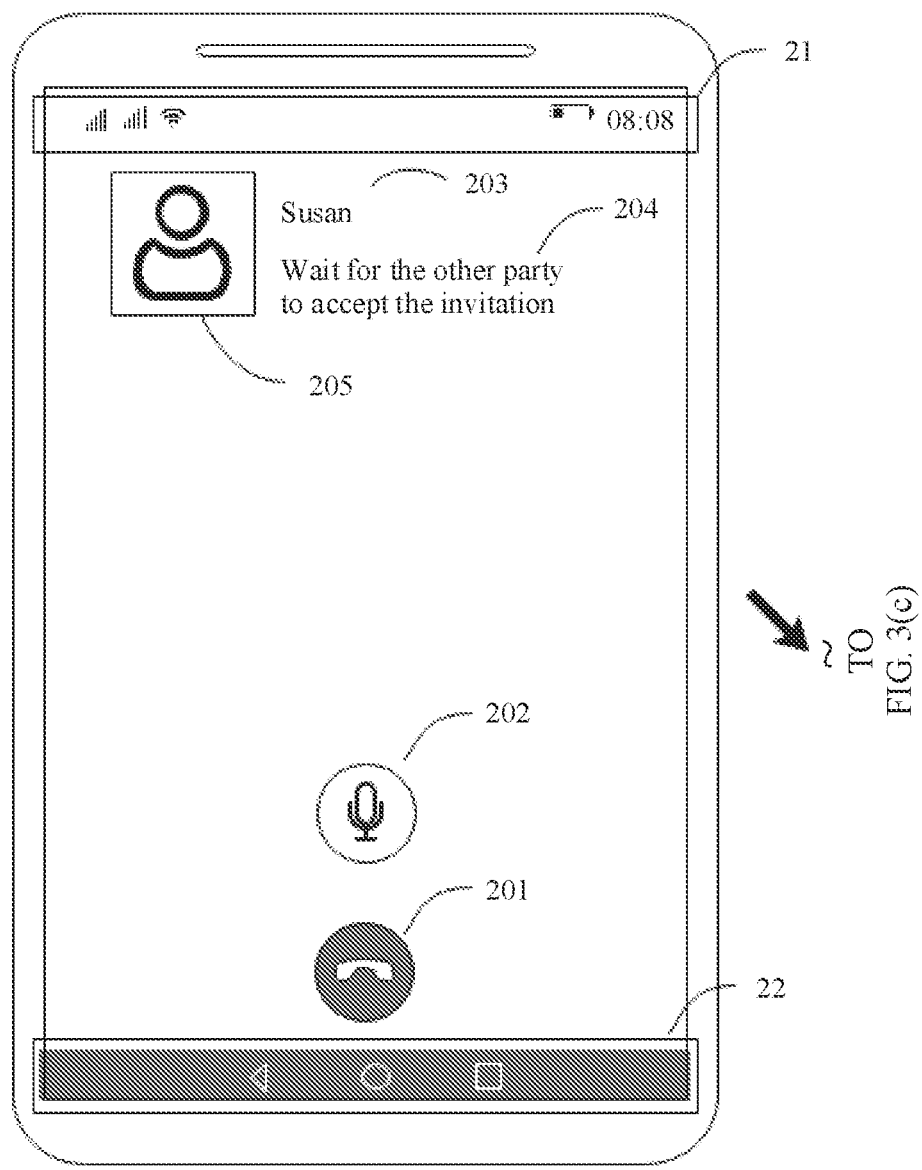
FIG. 3(a) to FIG. 3(d) show graphical user interfaces during device interaction according to an embodiment of this application.
Figure 3B:
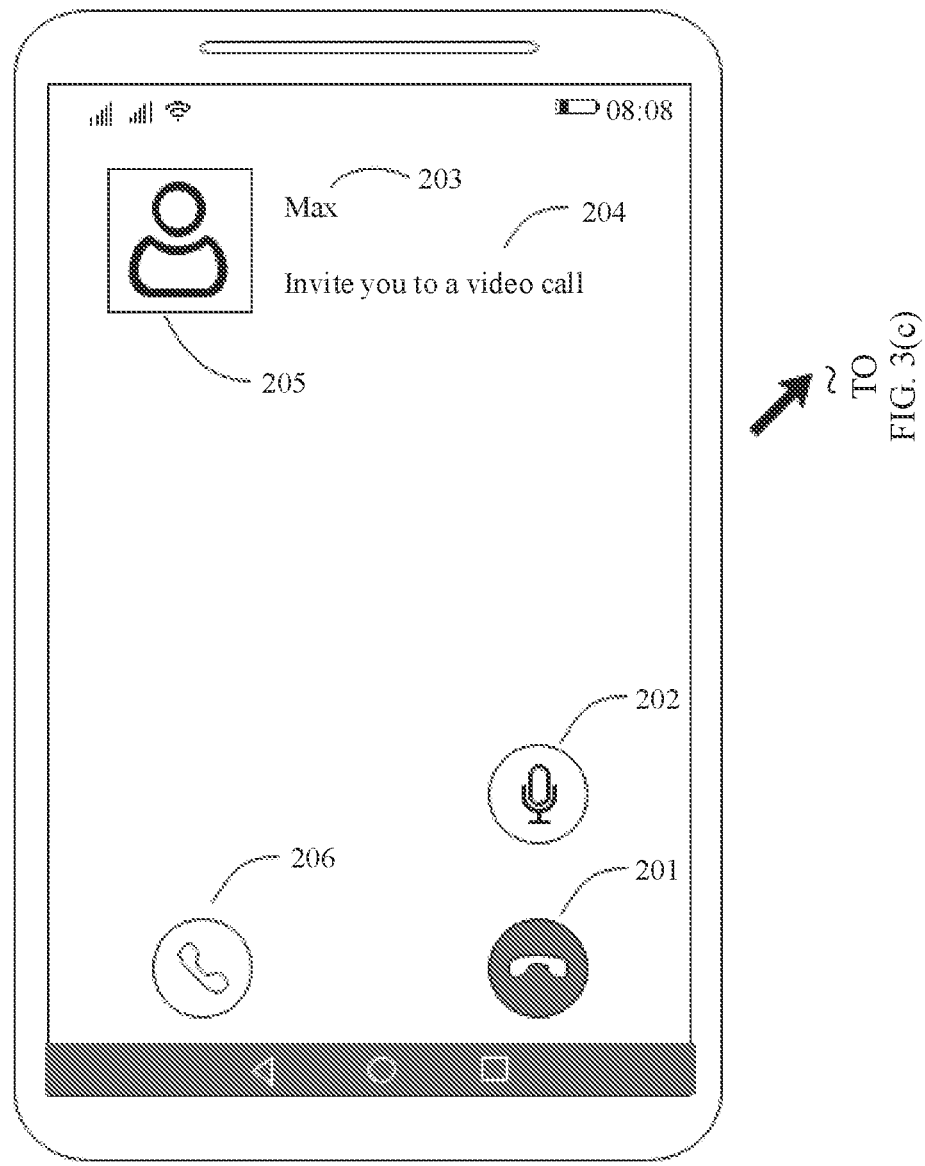
Figure 3C:
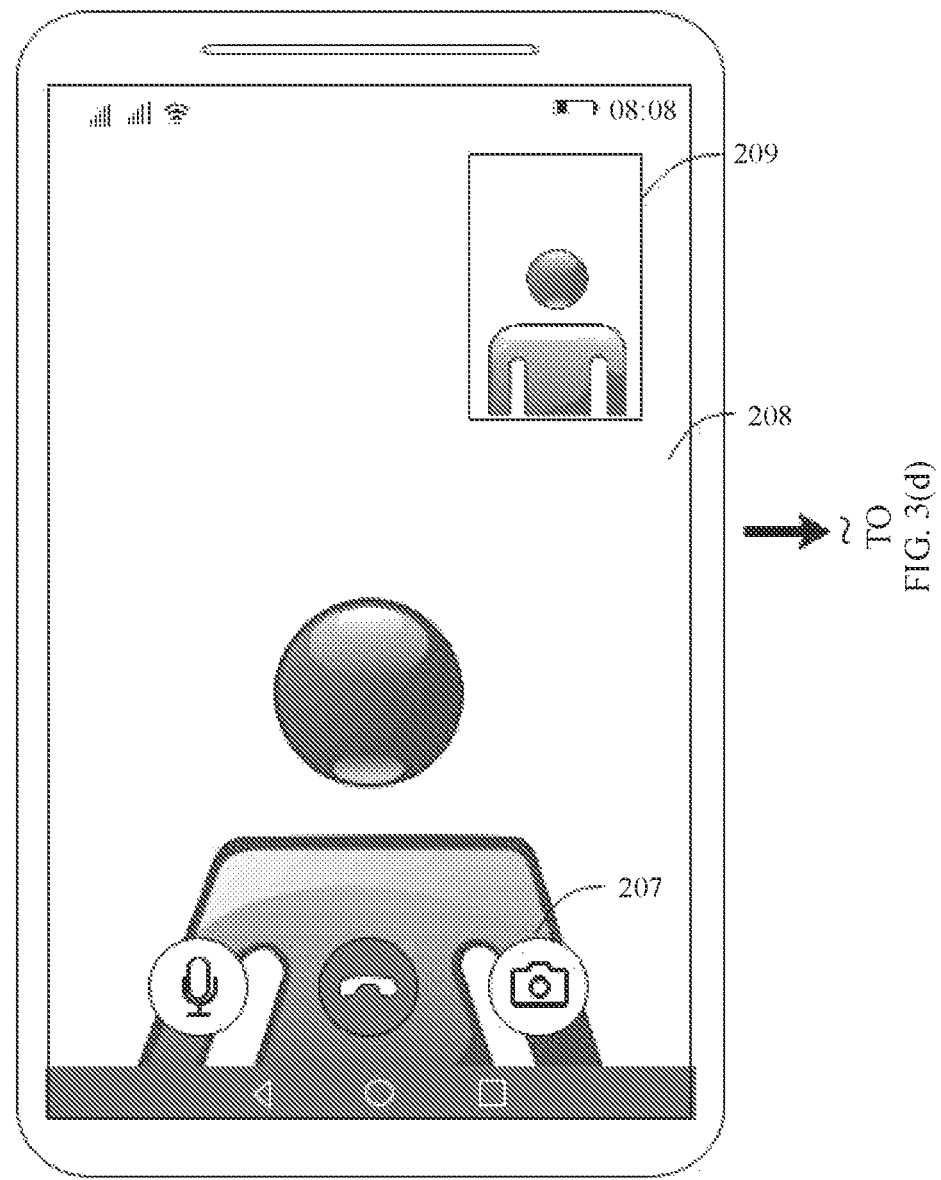
Figure 3D:
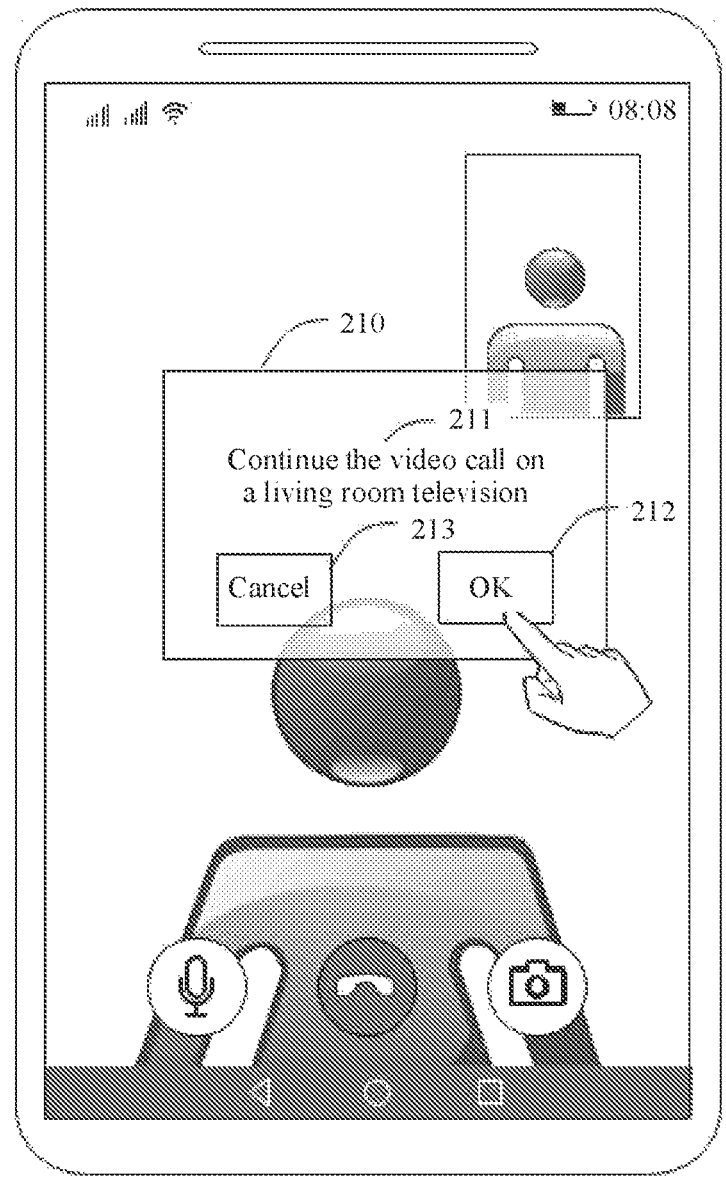

FIG. 2B is a block diagram of a software structure of the electronic device 100 according to an embodiment of the present invention.

In the layered architecture, software is divided into several layers, and each layer has a clear role and task. The layers communicate with each other through a software interface. In some embodiments, the Android system is divided into four layers, namely, an application layer, an application framework layer, an Android runtime (Android runtime) and system library, and a kernel layer from top to bottom.

The application layer may include a series of application packages.

As shown in FIG. 2B, the application package may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 2B, the application program framework layer may include a window manager, a content provider, a view system, a phone manager, a resource manager, a notification manager, a camera manager, an audio manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, an audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS notification icon may include a text display view and an image display view.

The phone manager is configured to provide a communications function of the electronic device 100, for example, management of a call status (including answering, declining, or the like).

The resource manager provides various resources for an application, such as a localized character string, an icon, an image, a layout file, and a video file.

The notification manager enables an application to display notification information in the status bar, and may be configured to transmit a notification-type message. The displayed information may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an announcement is given, the electronic device vibrates, or the indicator light blinks.

The camera manager is configured to manage a status of one or more cameras. When a camera is used or released, the camera manager can notify a use or release event and a corresponding camera ID.

The audio manager is configured to manage audio settings and audio-related hardware, such as the microphones and the speaker. The audio manager can be configured to control settings such as an audio mode and volume, and monitor use or release of a hardware resource such as the microphone or the speaker.

The Android runtime includes a kernel library and a virtual machine. The Android runtime is responsible for scheduling and management of the Android system.

The kernel library includes two parts: One part is a performance function that needs to be invoked by the Java language, and the other part is an Android kernel library.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The software system shown in FIG. 2B relates to application presentation (such as gallery and file management) that uses a sharing capability, a directional sharing module that provides a sharing capability, an application framework layer that provides a WLAN service and a Bluetooth service, and a kernel and a bottom layer that provide a WLAN Bluetooth capability and a basic communications protocol.

The following describes an example of a working process of software and hardware of the electronic device 100 in a photographing scenario.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. An example in which the touch operation is a touch operation and a control corresponding to the touch operation is a control of a camera application icon is used. A camera application invokes an interface of the application framework layer, so that the camera application is started. Then, a camera driver is started by invoking the kernel layer, and a static image or a video is captured by using the camera 193.

After a terminal device such as the electronic device 100 or the smart television 102 is powered on, device addressing may be performed to obtain an IP address. After the device addressing is complete and an IP address is assigned to the device, a device discovery procedure may start. In some other embodiments, the device may also use a fixed IP address to access a network. Device discovery may include the following three cases: After having a control request, the device may search a current network for a corresponding available device; or after accessing the network and obtaining the IP address, the device may start to broadcast to the network that the device has entered the network to search for the control request. To implement control and being controlled between smart devices, each terminal device may support a digital living network alliance (Digital Living Network Alliance, DLNA for short) technology. The DLNA, formerly known as a digital home work group (Digital Home Work Group, DHWG for short), aims to implement interconnection between wireless and wired networks, including PCs, consumer appliances, and mobile devices, making unlimited sharing and growth of digital media and content services possible. The DLNA divides functional modules into four parts: a digital media server (Digital Media Server, DMS for short), a digital media receiver (Digital Media Receiver, DMR for short), a digital media controller (Digital Media Control, DMC for short), and a digital media player (Digital Media Player, DMP for short). The entire application of the DLNA is defined as five functional components: network interconnection, a network protocol, media transmission, device discovery, control, and management, and a media format. The network interconnection specifies a type and a protocol of an accessed network, for example, a wired network: 802.3i/u, and a wireless network: 802.11a/b/g/n. The network protocol specifies a used network protocol. The media transmission specifies that all DLNA devices support media transmission by using a hypertext transfer protocol (Hypertext Transfer Protocol, HTTP for short). The functional component of device discovery, control, and media management uses a universal plug and play (Universal Plug and Play, UPnP) protocol stack to implement device discovery and management through a series of steps and protocols, which is a most important layer of the DLNA. The media format specifies a media format for sharing and using digital media and content. The device discovery, control, and media management is implemented by using the UPnP protocol stack. The UPnP protocol stack includes a simple service discovery protocol (Simple Service Discovery Protocol, SSDP), a generic event notification architecture (Generic Event Notification Architecture, GENA), and a simple object access protocol (Simple Object Access Protocol, SOAP), and is used for interconnection between various devices. The UPnP protocol stack has good universality, does not require a dedicated device driver layer, and can be implemented on any operating system.

For example, after accessing the local area network, the electronic device 100 may broadcast, to the network, that the electronic device 100 has entered the network, and simultaneously obtain attribute information of another device from the network, for example, a device type, a device identifier, and device description information. In some other embodiments, the electronic device 100 may obtain a list of available devices in the network from one device (for example, a router or a control device in the network) in the network. The device list may include a device type, a device identifier, device description information, and the like of each available device. The device type may distinguish between types of terminal devices, such as a television set, a camera, and a PC. The device identifier is used to distinguish different devices. The device description information indicates more specific description information of the device, for example, capability information such as a service or a protocol supported by the device.

In some other embodiments, the electronic device 100 may preset a device discovery button. When the electronic device 100 detects that the user enables the device discovery button, the electronic device 100 may obtain attribute information of another available device in the device group. In some embodiments, the user may enable the device discovery button through some fixed entries. For example, these fixed entries may be a drop-down menu, a pull-up menu, a side menu, or a floating menu. This is not limited in this embodiment of this application.

The device discovery button may be a virtual button, or may be a physical button. In addition, the electronic device 100 may alternatively enable the device discovery by using a voice command or a specific gesture.

The electronic device 100 may store attribute information of devices that interact with each other before, and maintain the stored attribute information of the devices after accessing the local area network or having the control request. For example, the electronic device 100 switches the video call to the smart television 102 in a previous video call process, and the electronic device 100 may store attribute information of the smart television 102. After accessing the network again or generating an interaction request, the electronic device 100 may monitor whether the smart television 102 is available and whether the stored attribute information changes. If the foregoing information changes, the foregoing information is updated.

FIG. 3(*a*) to FIG. 3(*d*) show an example of graphical user interfaces during multi-device interaction according to an embodiment of this application. FIG. 3(*a*) and FIG. 3(*b*) respectively show user interfaces when a user makes and answers a video call by using a video call application. As shown in FIG. 3(*a*), the user interface may include a status bar 21, a navigation bar 22, a hang-up control 201, a voice switching control 202, first information 203, second information 204, and third information 205.

The hang-up control 201 is configured to interrupt the video call. A mobile phone may detect a touch operation performed on the hang-up control 201 (for example, a tap operation performed on the hang-up control 201), and in response to this operation, the mobile phone may interrupt the video call.

The voice switching control 202 is configured to switch the video call to a voice call. The mobile phone may detect a touch operation performed on the voice switching control 202 (for example, a tap operation performed on the voice switching control 202). In response to the operation, the mobile phone may switch the video call to the voice call, and turn off the camera.

The first information 203 is used to display identification information of the other party of the video call. As shown in FIG. 3(*a*), the information may be an account name of a called user of the video call.

The second information 204 is used to prompt a current status. As shown in FIG. 3(*a*), the information may be "Wait for the other party to accept the invitation", to prompt the user that a current video call request has been sent and the other party has not answered the call.

The third information 205 is used to display icon information of the other party of the video call. As shown in FIG. 3(*a*), the information may be a profile picture of the user who initiates the video call.

The first information 203, the second information 204, and the third information 205 may be text information, or may be in a form of an image, an animation, or the like, or a combination of the foregoing forms. This is not limited in this embodiment.

The status bar 21 may include one or more signal strength indicators of a wireless fidelity (wireless fidelity, Wi-Fi) signal, one or more signal strength indicators of a mobile communications signal (also referred to as a cellular signal), a time indicator, and a battery status indicator.

The navigation bar 22 may include system navigation buttons such as a back button, a home screen (Home Screen) button, and an outbound task history button. When a system detects that the user taps the back button, the mobile phone may display a page previous to a current page. When it is detected that the user taps the home screen button, the mobile phone may display the home screen. When it is detected that the user taps the outbound task history button, the mobile phone may display a task recently started by the user. Names of the navigation buttons may alternatively be other names. This is not limited in this application. Each navigation button in the navigation bar 42 is not limited to a virtual button, and may also be implemented as a physical button. In some other embodiments, the mobile phone may not display the navigation bar or the navigation button, and implement, in response to an instruction such as a voice or a gesture, an operation corresponding to the navigation button.

As shown in FIG. 3(*b*), the graphical user interface may include a status bar, a navigation bar, a hang-up control 201, a voice switching control 202, an answering control 206, first information 203, second information 204, and third information 205.

The answering control 206 is configured to answer the video call. The mobile phone may detect a touch operation performed on the answering control 206 (for example, a tap operation performed on the answering control 206). In response to the operation, the mobile phone may answer the video call, and start to display data collected by a camera of the other party.

The first information 203 and the third information 205 are used to display an identifier and an icon of the other party of the video call. Refer to FIG. 3(*a*), and details are not described herein again.

The second information 204 is used to prompt a current status. As shown in FIG. 3(*b*), the second information may be "Invite you to a video call", and a prompt indicating that the video call request is received is displayed.

For the status bar, the navigation bar, the hang-up control, and the voice switching control, refer to FIG. 3(*a*). Details are not described herein again.

After a mobile phone of a called party in the video call detects the touch operation on the answering control 206, the video call is established. The mobile phones of both parties of the video call each may display a graphical user interface shown in FIG. 3(*c*). As shown in FIG. 3(*c*), the graphical user interface may include a camera switching control 207, a first video display area 208, and a second video display area 209.

The first video display area 208 may be configured to display data collected by a camera of one party of the video call.

The second video display area 209 may be configured to display data collected by a camera of the other party of the video call.

The second video display area 209 may be further configured to: when a touch operation of the user in the second video display area is detected, exchange data displayed in the first video display area 208 and the second video display area 209.

The camera switching control 207 may be configured to switch between cameras used by the mobile phone to collect the data. The mobile phone may detect an operation performed on the camera switching control 207 (for example, a tap operation performed on the camera switching control 207). In response to the operation, the mobile phone may switch the camera. For example, before the camera switching control 207 is tapped, the second video display area 209 displays data collected by a front-facing camera of the mobile phone. After the camera switching control 207 is tapped, the second video display area 207 displays data collected by a rear-facing camera of the mobile phone. The data may be a video.

The mobile phone may detect whether the mobile phone is in a video call state. If it is determined that the mobile phone is in a video call state, the mobile phone displays, on the graphical user interface shown in FIG. 3(*c*), a dialog box 210 shown in FIG. 3(*d*). This dialog box is used to guide the user to interact with other devices in the device group. Prompt information 211 may be displayed in the dialog box 210, and the prompt information may be used to prompt the user to interact with a device. As shown in FIG. 3(*d*), the prompt information 211 may be text information "Continue the video call on a living room television", to prompt the user that the current video call may be switched to the living room television. In this way, experience of a video call on a device with a large screen can be obtained. In addition, the dialog box may further include a control 212 and a control 213. The control 212 may display "OK". If the mobile phone detects a touch operation on the control, the mobile phone triggers switching of the current video call to the living room television for continuing. The control 213 may display "Cancel". If the mobile phone detects a touch operation on the control, the mobile phone may not display the dialog box 210, and continue to display the video call interface shown in FIG. 3(*c*).

In some other embodiments, the mobile phone may display the dialog box 210 when the video call is established. In other words, the graphical user interface is updated from the interface shown in FIG. 3(*a*) or FIG. 3(*b*) to the interface shown in FIG. 3(*d*).

It may be understood that the controls, dialog boxes, and information in FIG. 3(*a*) to FIG. 3(*d*) are merely used as examples, and patterns, locations, shapes, and forms thereof are not limited to examples shown in the figures. For example, the control may not be displayed in the user interface, and the electronic device may respond to a voice or gesture instruction of the user to trigger a function corresponding to the control. The information shown in the figures is not limited to text, and may alternatively be in other forms such as an image or an animation. This embodiment of this application does not impose any limitation on this.

Figure 4A:
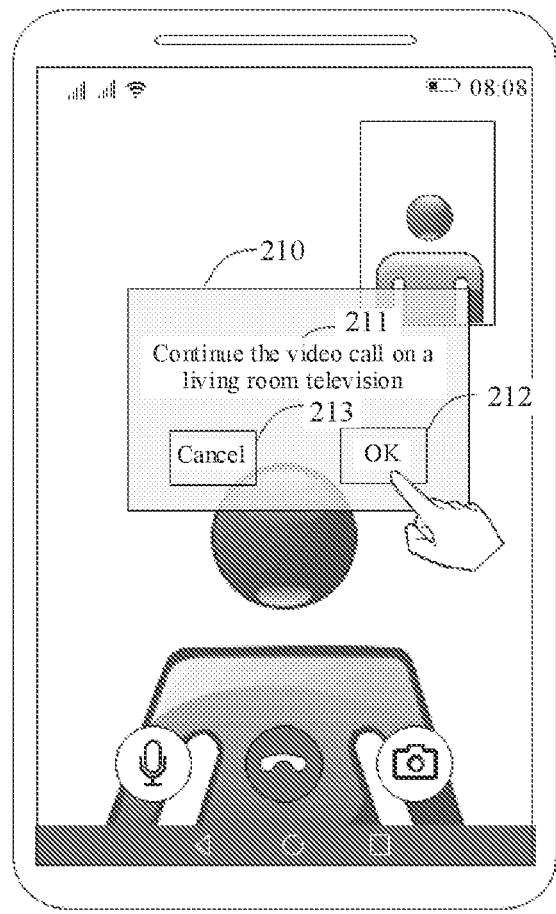
FIG. 4(a) to FIG. 4(d) show other graphical user interfaces during device interaction according to an embodiment of this application.
Figure 4B:
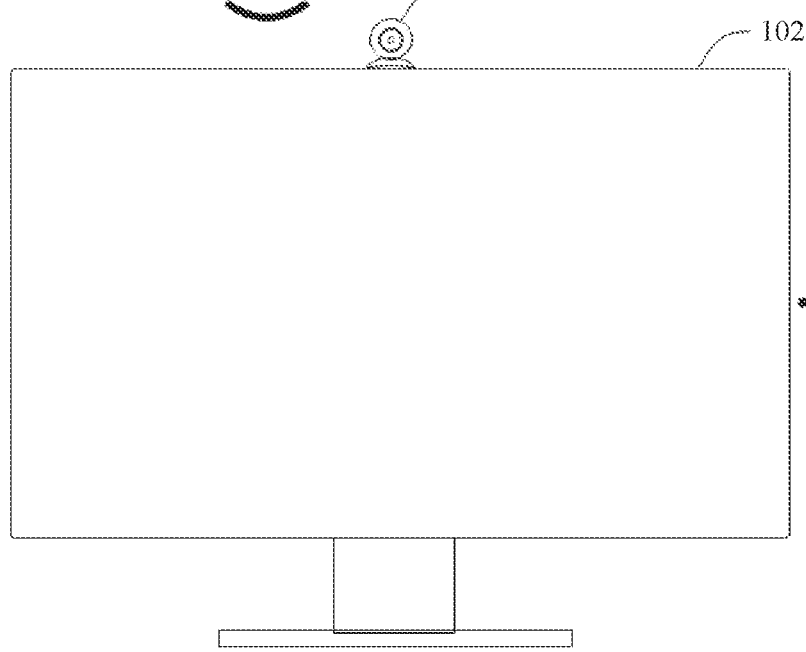
Figure 4D:
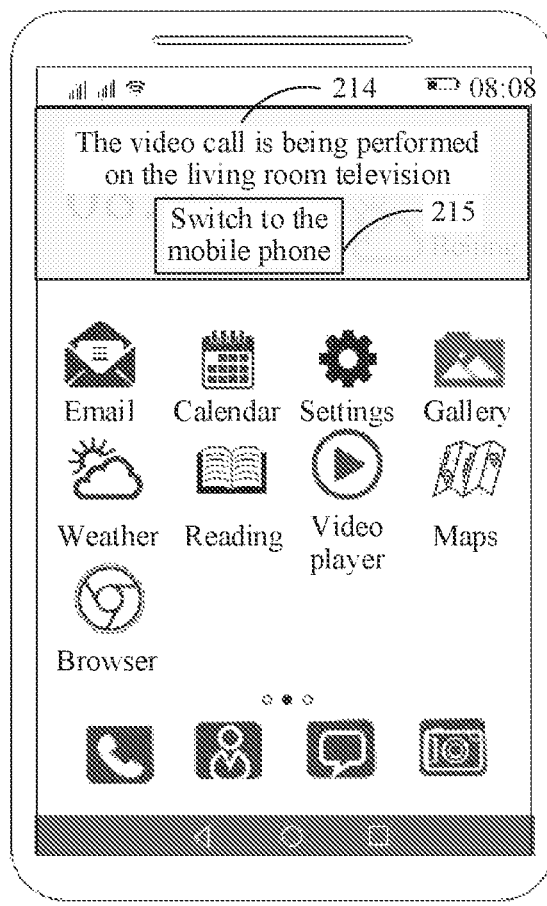
Figure 4C:
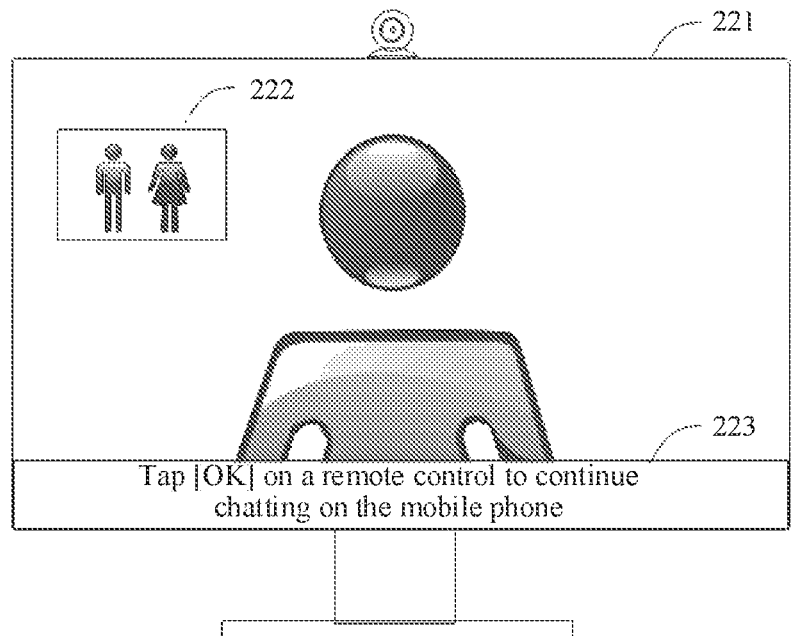

FIG. 4(a) to FIG. 4(d) show an example of an update process of each device interface when devices interact with each other. FIG. 4(a) shows an example of a dialog box displayed after a mobile phone detects that a video call is established. As shown in FIG. 4(a), if the mobile phone detects an operation on the control 212, the mobile phone triggers interaction with a smart television shown in FIG. 4(b). The smart television may have a user name "Living room television". FIG. 4(b) and FIG. 4(c) show examples of interfaces displayed by the smart television before and after the mobile phone interacts with the smart television. As shown in FIG. 4(b), before the mobile phone interacts with the smart television, the smart television may be in a standby state. The smart television is connected to a same local area network as the mobile phone, or establishes a wireless communication connection such as Bluetooth with the mobile phone, or may be connected to a network and log in to a same user account as the mobile phone. A video call application that is the same as that in the mobile phone, or different versions of a same application, or different applications that can share an account may be installed in the smart television 102, and a camera and a microphone may be built in or externally connected to the smart television 102. In some other embodiments, before the mobile phone triggers interaction with the smart television, the smart television may alternatively be in a state of displaying an image or a video.

When the mobile phone detects an operation on the control 212 in FIG. 4(a), the mobile phone may send a first switching message to the smart television. In response to the first switching message, the smart television may display the interface shown in FIG. 4(c). The interface may include a third video display area 221 and a fourth video display area 222. The third video display area 221 displays data collected by a camera of a device of the other party of the video call. The device of the other party may be a mobile phone or a television set, or may be switched from a mobile phone to a television set. The fourth video display area 222 displays data collected by a camera of a device of this party of the video call. The device of this party may be a smart television. The camera may be built in the smart television, or may be externally connected to the smart television.

In some other embodiments, the interface shown in FIG. 4(c) may further include a prompt message 223. The prompt message 223 may display text information, for example, "Tap [OK] on a remote control to continue chatting on the mobile phone". The prompt message 223 is used to prompt the user that the video call may be switched to the mobile phone for continuing. If the smart television 102 detects that the user taps the "OK" button on the remote control, the smart television 102 may send a second switching message to the mobile phone. In response to the message, the mobile phone may display data collected by a camera of the other party. After the switching is completed, the smart television 102 may return to an original interface. For example, if the smart television 102 is in a standby state before displaying a video call interface, the smart television 102 may return to the standby state in response to the fact that the user taps the "OK" button on the remote control. If the smart television 102 displays an on-demand video or a local video before displaying a video call interface, when switching to displaying the video call interface, the smart television 102 may pause playing the video; and in response to the fact that the user taps the "OK" button on the remote control, the smart television 102 may display a live program at a current moment, that is, the smart television 102 may continue to display the on-demand video or the local video from the pause moment. If the smart television 102 displays a live program before displaying a video call interface, after the user taps the "OK" button on the remote control, the smart television 102 may display the live program at the current moment; or the smart television may record a moment at which video playing is switched to a video call, the smart television 102 or a set-top box connected to the smart television may record a live program after the moment, and after the user taps the "OK" button on the remote control, the smart television 102 may continue to play the recorded live program from the moment.

After the mobile phone switches the video call to the smart television 102, the mobile phone returns to the user interface before the video call is generated. For example, the mobile phone displays a home screen before receiving a video call request. As shown in FIG. 4(d), after the mobile phone switches the video call to the smart television 102, the mobile phone returns to the home screen. In some embodiments, the graphical user interface may include a first notification message 214. The first notification message 214 may display text information, for example, "The video call is being performed on the living room television", to prompt the user that the video call is being performed on the living room television. The graphical user interface may further include a control 215. If the mobile phone detects an operation performed on the control, the mobile phone may send a third switching message to the smart television 102. In response to the third switching message, the mobile phone may continue the video call and display data collected by the camera of the other party, and the smart television 102 may display an interface displayed before a moment at which the mobile phone switches the video call to the smart television 102. In some other embodiments, if the mobile phone displays an interface of another application (such as gallery or reading) or an interface of a video call application before receiving the video call request, after the mobile phone switches the video call to the smart television 102, the mobile phone may display a corresponding interface before the switching. For a video call initiator, an interface displayed by the video call initiator before the video call request is initiated may include information about a called contact, a chat window with the called contact, or the like. After the mobile phone switches the video call to the smart television, the mobile phone may display a response interface before the switching.

Figure 5A:
FIG. 5(a) and FIG. 5(b) show graphical user interfaces for displaying notification information according to an embodiment of this application.
Figure 5B:
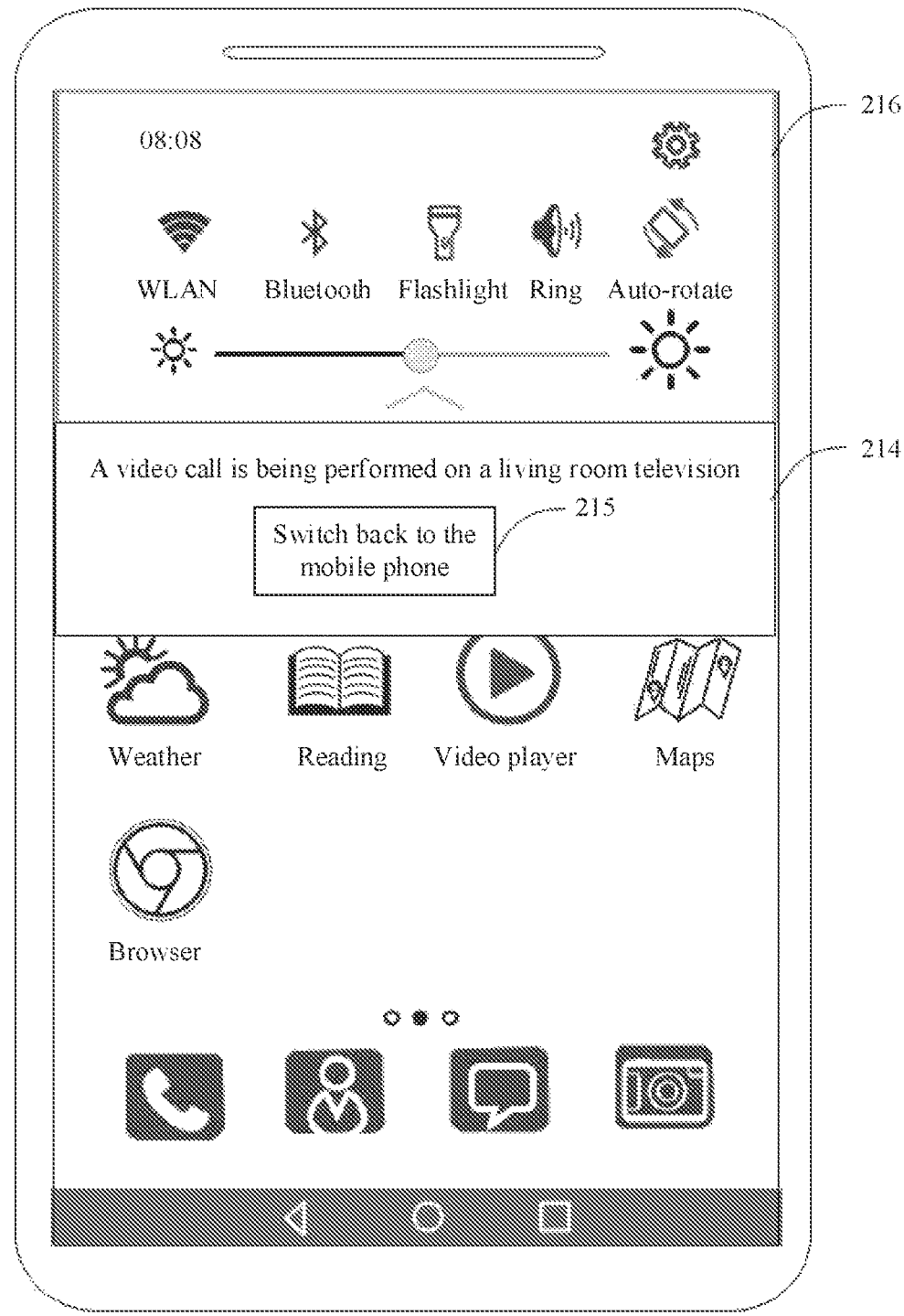
Figure 6A:
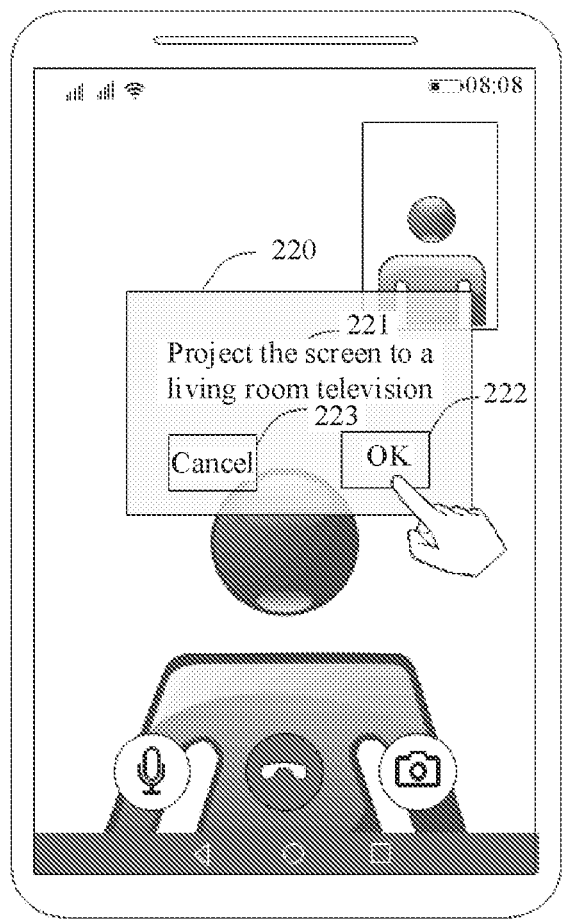
FIG. 6(a) to FIG. 6(d) show still other graphical user interfaces during device interaction according to an embodiment of this application.
Figure 6B:
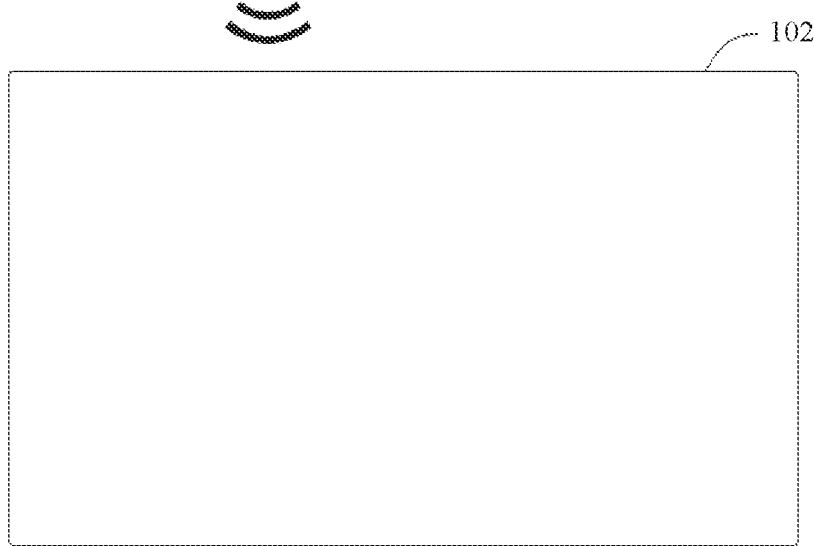
Figure 6D:
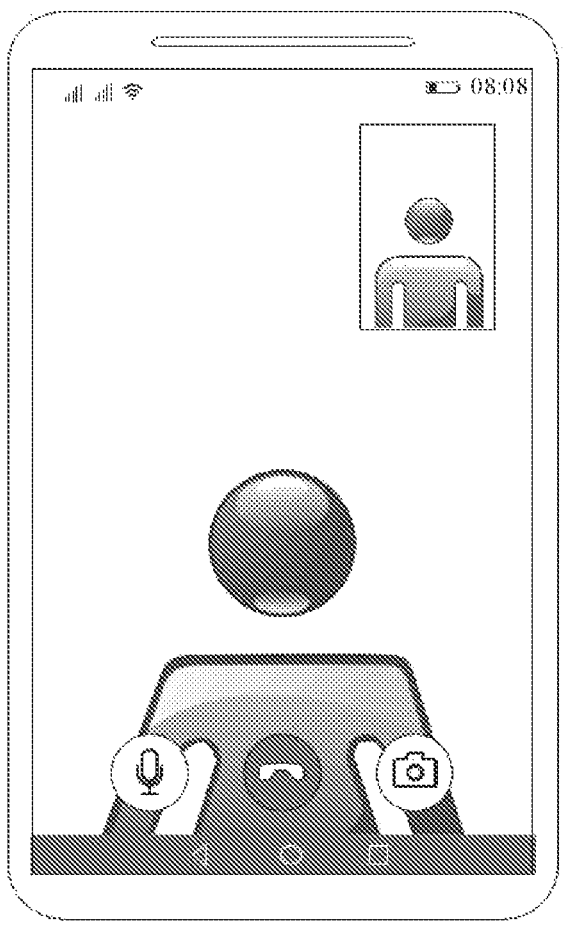
Figure 6C:
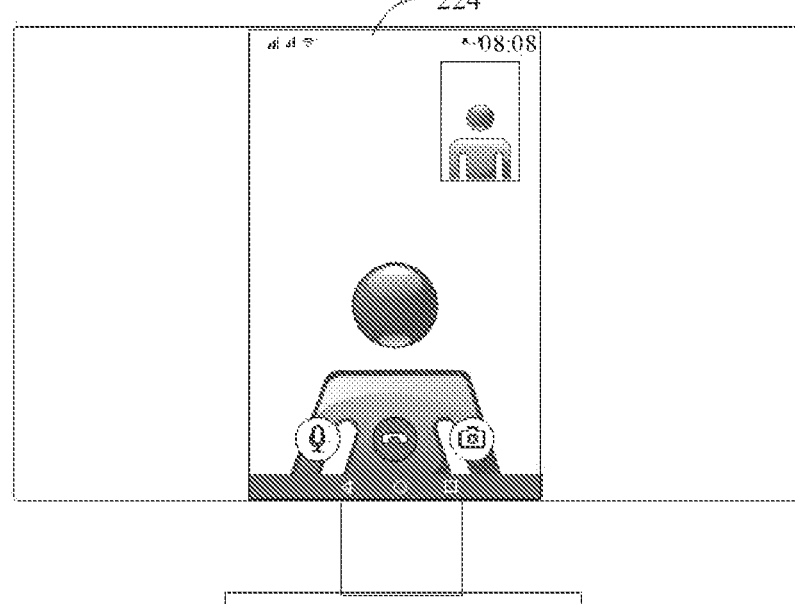
Figure 7A:
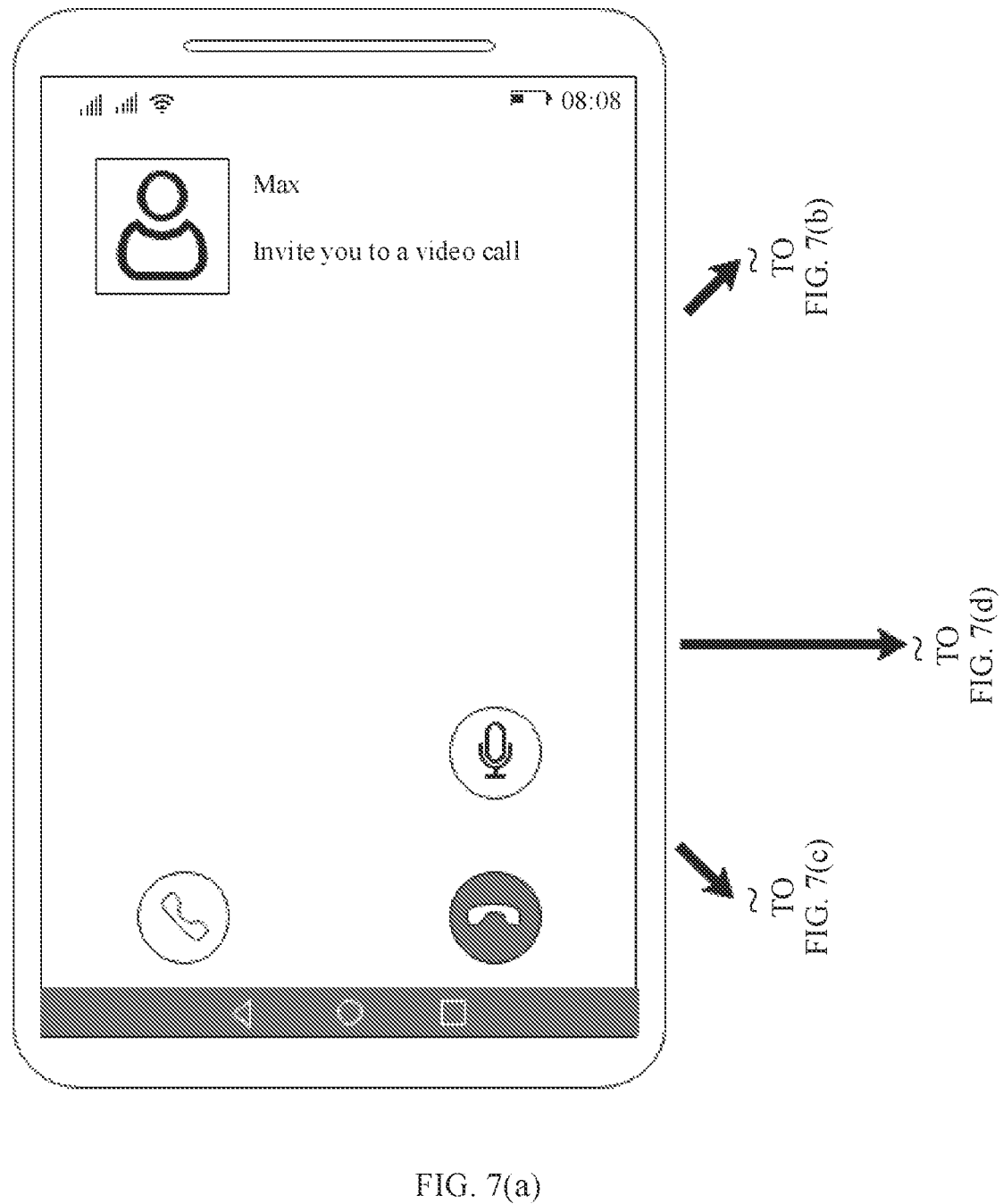
FIG. 7(a) to FIG. 7(d) show yet other graphical user interfaces during device interaction according to an embodiment of this application.
Figure 7B:
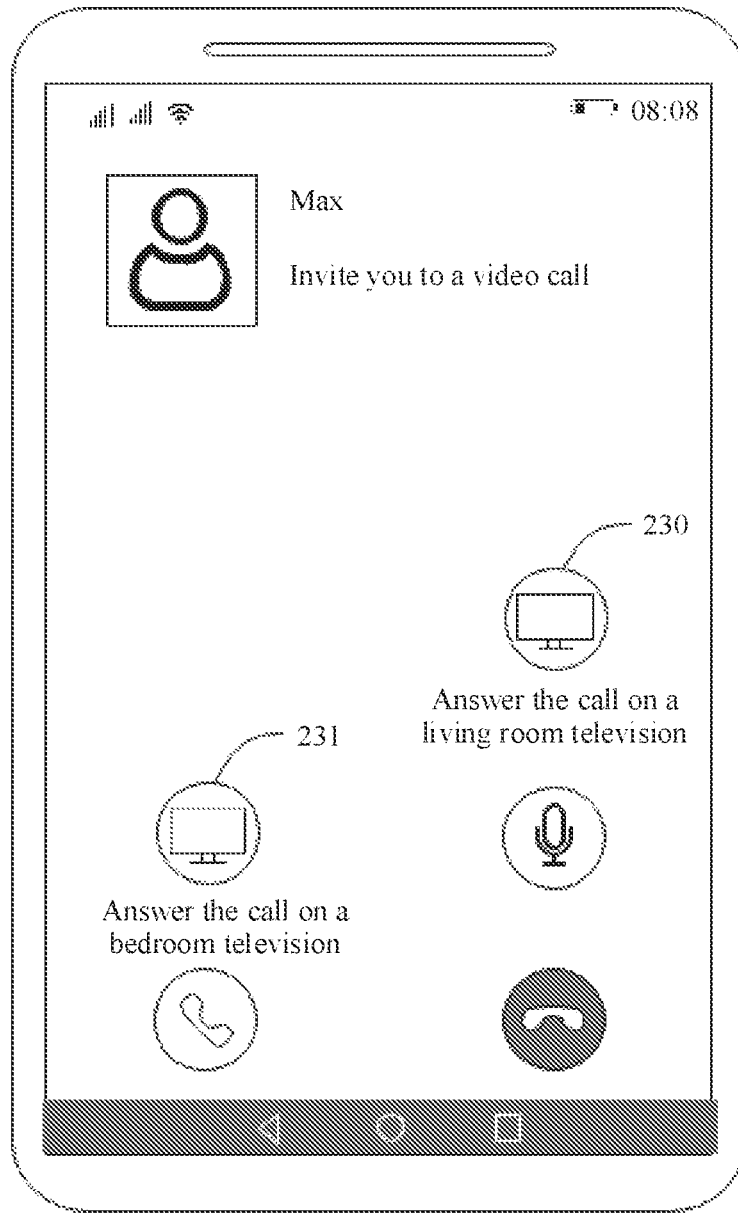
Figure 7C:
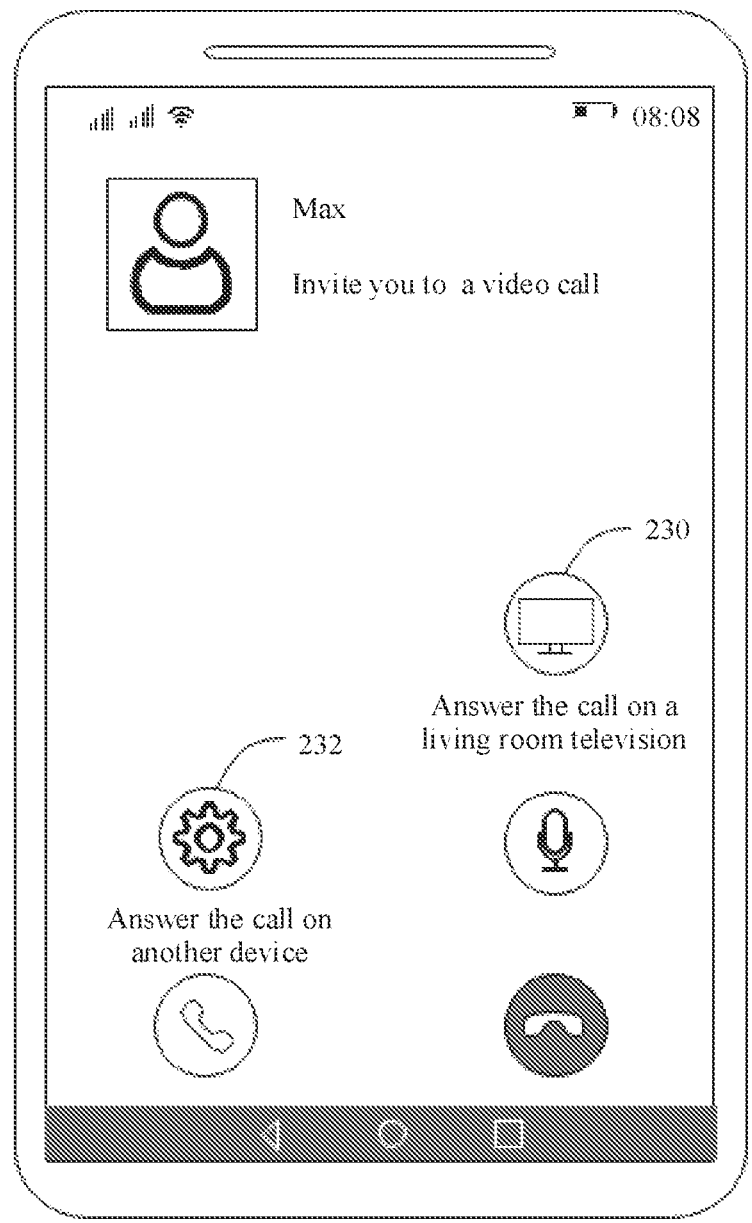
Figure 7D:
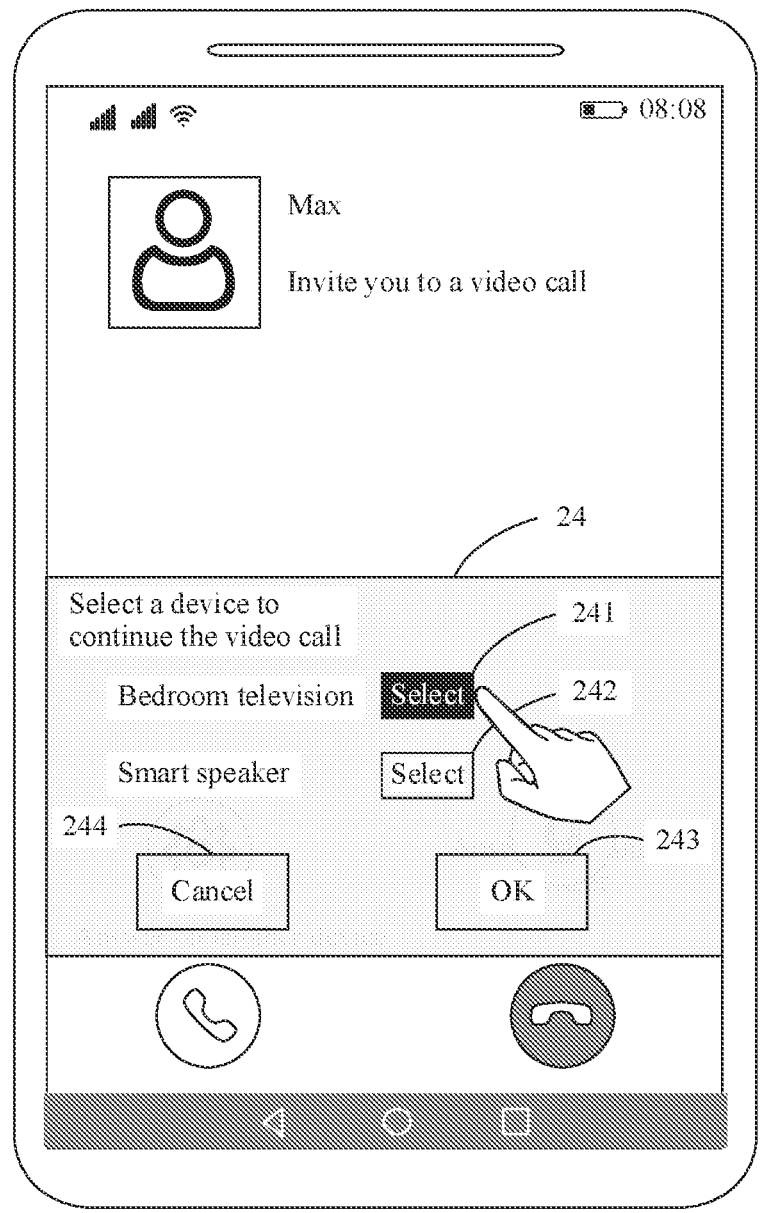
Figures 8A, 8B:
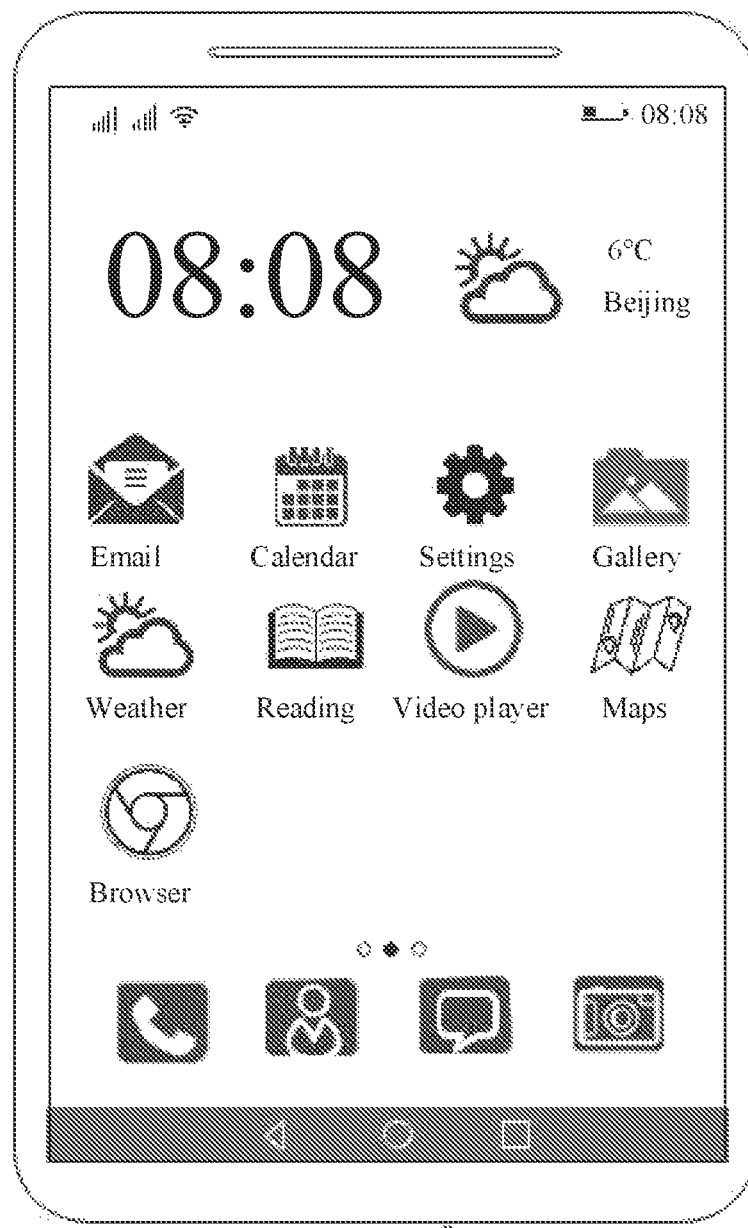
FIG. 8(a) to FIG. 8(d) show still yet other graphical user interfaces during device interaction according to an embodiment of this application.
Figure 8B:
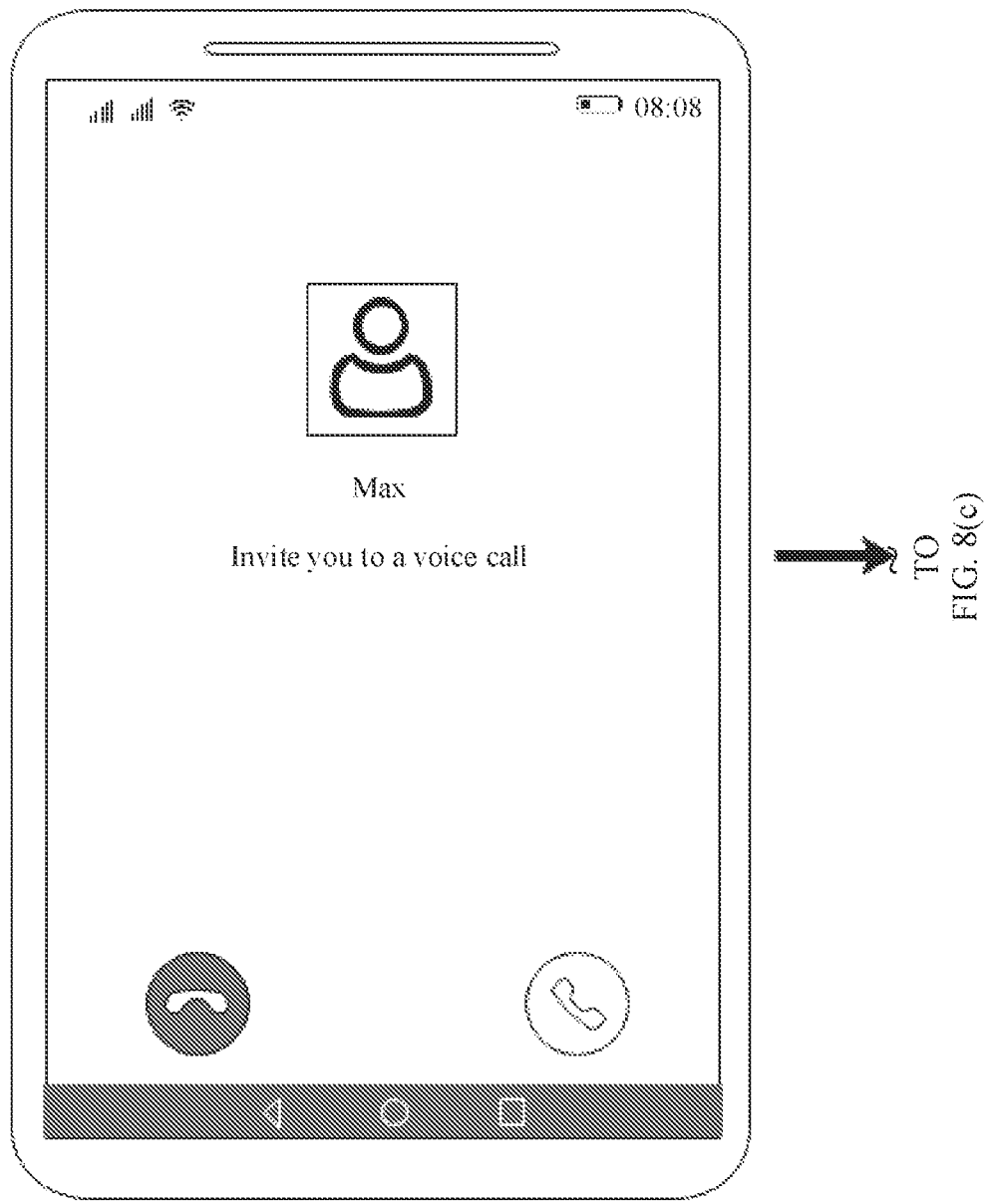
Figure 8C:
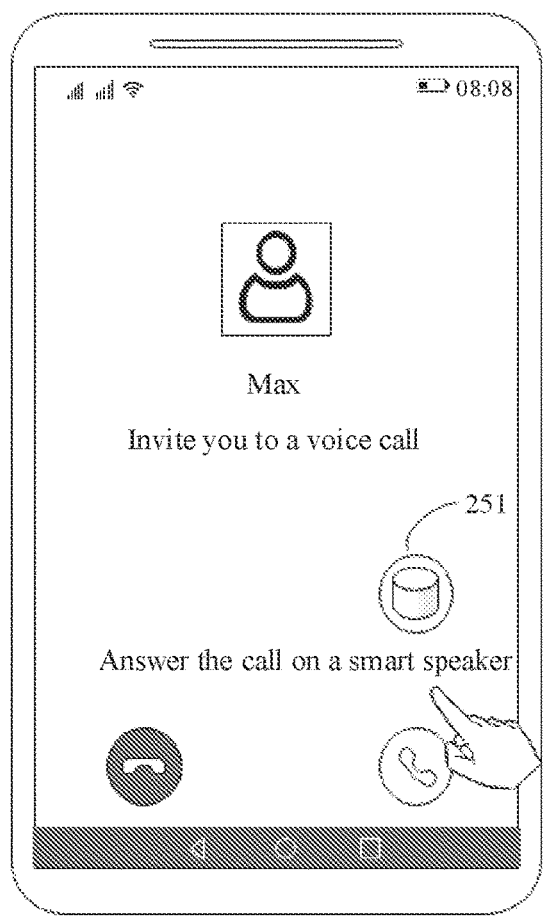
Figure 8C:
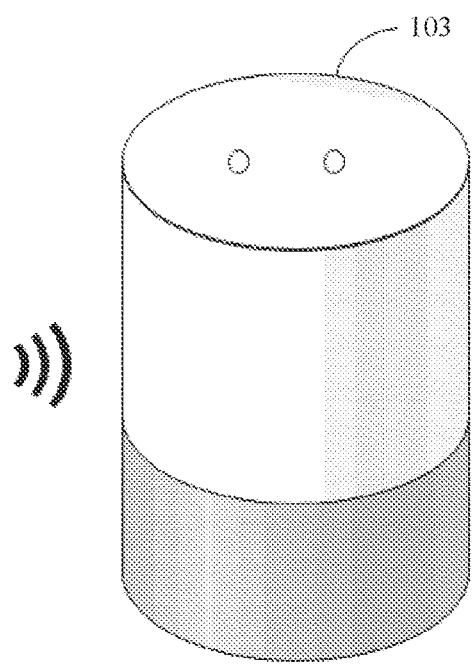
Figure 8D:
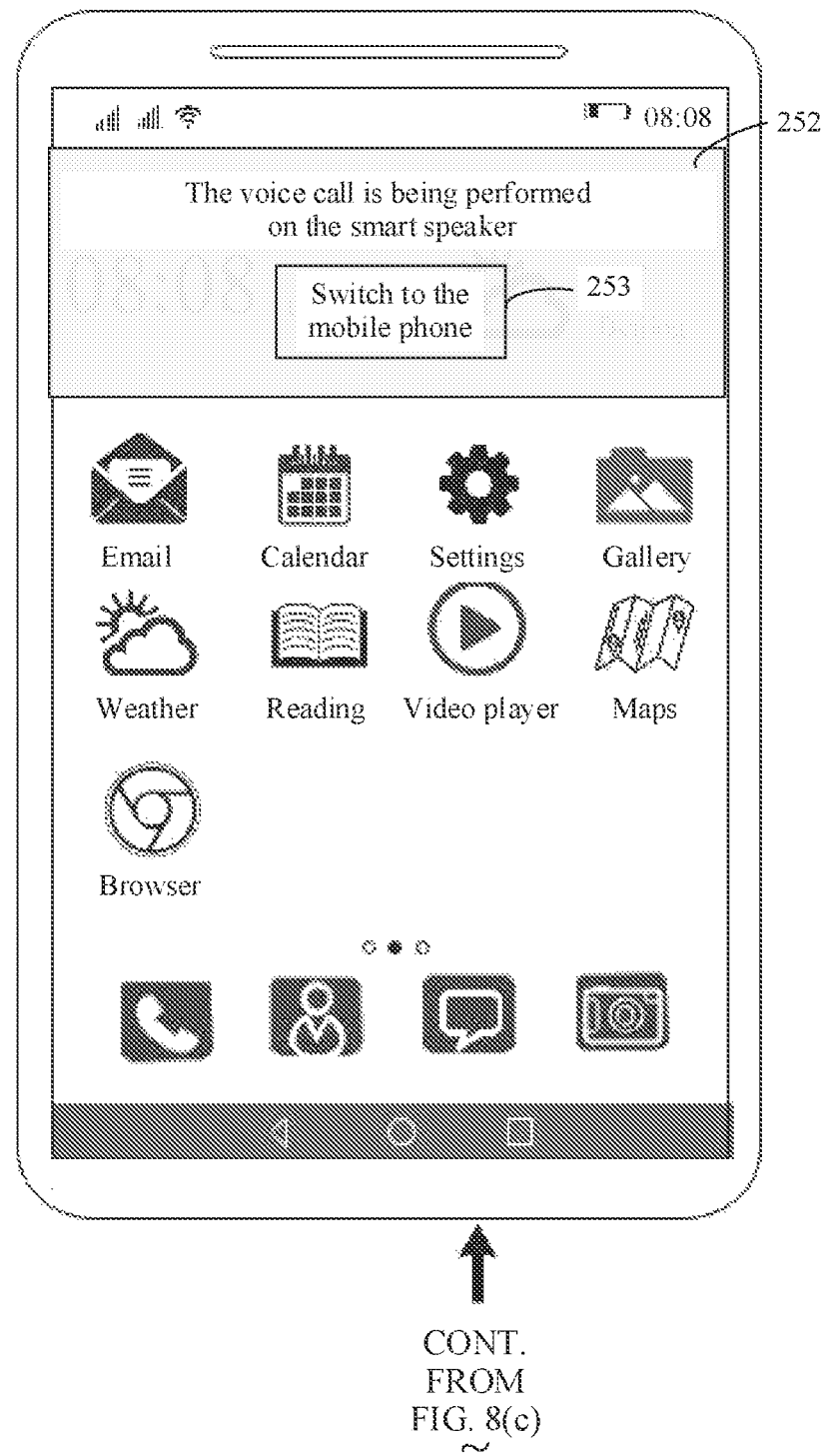

In some other embodiments, after the mobile phone switches the video call to the smart television 102, the user may switch, by using an operation shown in FIG. 5(a) and FIG. 5(b), the video call back to the mobile phone for continuing. As shown in FIG. 5(a), when the mobile phone detects a downward interaction gesture on a status bar, in response to the gesture, the mobile phone may display a window 216, a first notification message 214, and a control 215 on a graphical user interface, as shown in FIG. 5(b). An on/off control of a function such as Bluetooth or Wi-Fi may be displayed in the window 216. When the mobile phone detects an operation performed on the control 215, the mobile phone may trigger switching of the video call from the smart television 102 back to the mobile phone for continuing.

FIG. 6(a) to FIG. 6(d) show an example of another update process of each device interface when devices interact with each other. When a mobile phone determines that the mobile phone is in a video call state, the mobile phone may display, on a graphical user interface, a dialog box 220 shown in FIG. 6(a). The dialog box 220 may include prompt information 221, a control 222, and a control 223. The prompt information 221 is used to prompt a user that a screen projection operation can be performed. As shown in FIG. 6(*a*), the prompt information 211 may be text information "Project the screen to a living room television", to prompt the user that a video call interface currently displayed on the mobile phone may be projected to the living room television. In this way, experience of a video call on a device with a large screen can be obtained. In addition, the dialog box 220 may further include a control 222 and a control 223. The control 222 may display "OK". If the mobile phone detects a touch operation on the control, the mobile phone triggers a screen projection operation in the prompt information. The control 223 may display "Cancel". If the mobile phone detects a touch operation on the control, the mobile phone may not display the dialog box 220, may not perform a screen projection operation, and may continue to perform the video call.

FIG. 6(*b*) and FIG. 6(*c*) show examples of interfaces displayed by a smart television before and after the mobile phone interacts with the smart television. As shown in FIG. 6(*b*), before the mobile phone interacts with the smart television, the smart television may be in a standby state. The smart television is connected to a same local area network as the mobile phone, or establishes a wireless communication connection such as Bluetooth with the mobile phone, or may be connected to a network and log in to a same user account as the mobile phone. In some other embodiments, before the mobile phone triggers interaction with the smart television, the smart television may alternatively be in a state of displaying an image or a video.

When the mobile phone detects an operation on the control 222 shown in FIG. 6(*a*), the mobile phone may send a first screen projection message to the smart television. In response to the first screen projection message, the smart television may display the interface shown in FIG. 6(*c*). The interface may include a fifth video display area 224. The fifth video display area 224 displays data collected by a camera of a device of the other party of the video call. The device of the other party may be a mobile phone or a television set, or may be switched from a mobile phone to a television set.

FIG. 6(*d*) shows an example of a graphical user interface displayed on the mobile phone after the mobile phone interacts with the smart television. In response to an operation performed on the control 222 shown in FIG. 6(*a*), the mobile phone may not display the dialog box 220, but continue to display the video call interface. The screen projection operation enables an interface displayed on the smart television to be the same as an interface displayed on the mobile phone. In some other embodiments, the interface displayed on the smart television may be the same as a part that is of the graphical user interface displayed on the mobile phone and that does not include a status bar or a navigation bar. In some other embodiments, the interface displayed on the smart television may be the same as a video call application window.

In some other embodiments, in a video call, an electronic device 100 may determine, when initiating the video call and/or when receiving a video call request, to enter a video call state. The electronic device 100 may prompt a user to interact with another device.

FIG. 7(*a*) to FIG. 7(*d*) show an example of graphical user interfaces displayed when an electronic device 100 receives a video call request. FIG. 7(*a*) shows a graphical user interface displayed when a mobile phone receives a video call request. When the mobile phone determines to enter a video call state, as shown in FIG. 7(*b*), the mobile phone may display a control 230 on the graphical user interface. The control 230 may include prompt information, for example, "Answer the call on a living room television", used to prompt a user that the user may tap the control 230 to switch a video call to the living room television for continuing. In some other embodiments, in response to a detected operation performed on the control 230, the mobile phone may perform a screen projection operation with the living room television, so that the living room television displays an interface the same as that of the mobile phone.

In some other embodiments, as shown in FIG. 7(*b*), when the mobile phone determines to enter the video call state, and there is another device (for example, a "bedroom television") other than the living room television currently, the mobile phone may display a control 231 on the graphical user interface. The control 231 may include prompt information, for example, "Answer the call on a bedroom television", used to prompt the user that the user may tap the control 231 to switch the video call to the bedroom television. In some other embodiments, in response to a detected operation performed on the control 231, the mobile phone may perform a screen projection operation with the bedroom television, so that the bedroom television displays an interface the same as that of the mobile phone.

In some embodiments, when the mobile phone detects an operation performed on the control 230 or the control 231, the mobile phone may simulate a system to perform a tap operation on the answering control, to connect the video call.

In some embodiments, as shown in FIG. 7(*c*), when the mobile phone determines to enter the video call state, and there are a plurality of other devices than the living room television currently, the mobile phone may display a control 232 on the graphical user interface. The control 232 may include prompt information, for example, "Answer the call on another device", used to prompt the user that the user may tap the control 232 to select a device for interaction. In response to an operation performed on the control 232, the mobile phone may display a window 24 shown in FIG. 7(*d*). The window 24 may include a control 241 and a control 242. The control 241 and the control 242 may separately include prompt information, for example, a "Bedroom television" and a "Smart speaker", to prompt the user to select an interactive device by tapping a corresponding control. For example, in response to an operation performed on the control 241, the mobile phone may switch the video call to the bedroom television to continue or perform a screen projection operation with the bedroom television. In some other embodiments, in response to an operation performed on the control 241 or the control 242, the mobile phone determines a device that performs interaction. The window 24 further includes a control 243 and a control 244. The control 243 may display "OK". In response to an operation performed on the control 243, the mobile phone may interact with a device determined by using the control 241 and/or the control 242. The control 244 may display "Cancel". In response to an operation performed on the control 244, the mobile phone may display the graphical user interface shown in FIG. 7(*a*), to continue the video call.

In some other embodiments, when the mobile phone triggers interaction with another device by using a control in the window 24, the mobile phone may simulate a system to perform a tap operation on the answering control, to connect the video call.

In some other embodiments, when the mobile phone determines to enter a video call state, and currently there are a plurality of devices that can interact with each other, the mobile phone may display a window 24 on the graphical user interface shown in FIG. 7(*a*), as shown in FIG. 7(*d*).

In some other embodiments, the mobile phone may select a plurality of devices in the window 24 and interact with the plurality of devices. For example, the user selects a smart television, a smart speaker, and a network camera in the window 24. The mobile phone may use the smart television to display data collected by a camera of a device of the other party, use the smart speaker to collect audio data of this party, and use the network camera to collect video data of this party.

When the mobile phone sends a video call request, the mobile phone may determine that the mobile phone is in a video call state, and interact with another device by displaying a control or a dialog box on a graphical user interface and in response to an operation of the user. For specific steps, refer to FIG. 7(*a*) to FIG. 7(*d*). Details are not described herein again.

FIG. 8(*a*) to FIG. 8(*d*) show an example of graphical user interfaces for displaying device interaction information by an electronic device 100 in a voice call state. When the mobile phone receives a voice call request in a graphical user interface shown in FIG. 8(*a*), the mobile phone displays a graphical user interface shown in FIG. 8(*b*). The graphical user interface shown in FIG. 8(*b*) includes an answering control, a hang-up control, information indicating an identifier and a profile picture of the other party, and information indicating a current status, for example, text information "Invite you to a voice call", to prompt a user that the voice call request is received. For the foregoing controls and information, refer to FIG. 3(*a*) to FIG. 3(*d*). Details are not described herein again.

After receiving the voice call request, the mobile phone may determine that the mobile phone is in a voice call state. In response to the determining result, the mobile phone may display a control 251 shown in FIG. 8(*c*) on the graphical user interface. The control 251 may include prompt information, for example, text information "Answer the call on a smart speaker", to prompt the user to tap the control 251 to trigger use of the speaker to continue a current voice call. In response to an operation performed on the control 251, the mobile phone may send a switching message to the smart speaker 103, to switch the voice call to the smart speaker 103 for processing. The mobile phone may display a graphical user interface before the voice call request is received. In other words, the mobile phone displays the graphical user interface shown in FIG. 8(*a*). In some other embodiments, as shown in FIG. 8(*d*), the mobile phone may display a notification message 252 on a graphical user interface. The notification message 252 may include text information "The voice call is being performed on the smart speaker", to prompt the user that the voice call is being performed on the smart speaker 103. The graphical user interface may further include a control 253. If the mobile phone detects an operation performed on the control, the mobile phone may send a switching message to the smart speaker 103. In response to the switching message, the voice call may continue on the mobile phone.

In some other embodiments, in response to the operation performed on the control 251, the mobile phone may simulate a system to perform a tap operation on the answering control, to connect the video call.

In some other embodiments, the mobile phone may determine a type of a displayed control based on a current status. For example, in response to determining that the mobile phone is currently in a video call state, the mobile phone may display, in a graphical user interface, the dialog box 210 shown in FIG. 3(*d*), or the dialog box 220 shown in FIG. 6(*a*), or the control 230 and/or the control 231 shown in FIG. 7(*b*), or the control 232 shown in FIG. 7(*c*), or the window 24 shown in FIG. 7(*d*). In response to determining that the mobile phone is currently in a voice call state, the mobile phone may display, in a graphical user interface, the control 251 shown in FIG. 8(*c*).

Figure 9B:
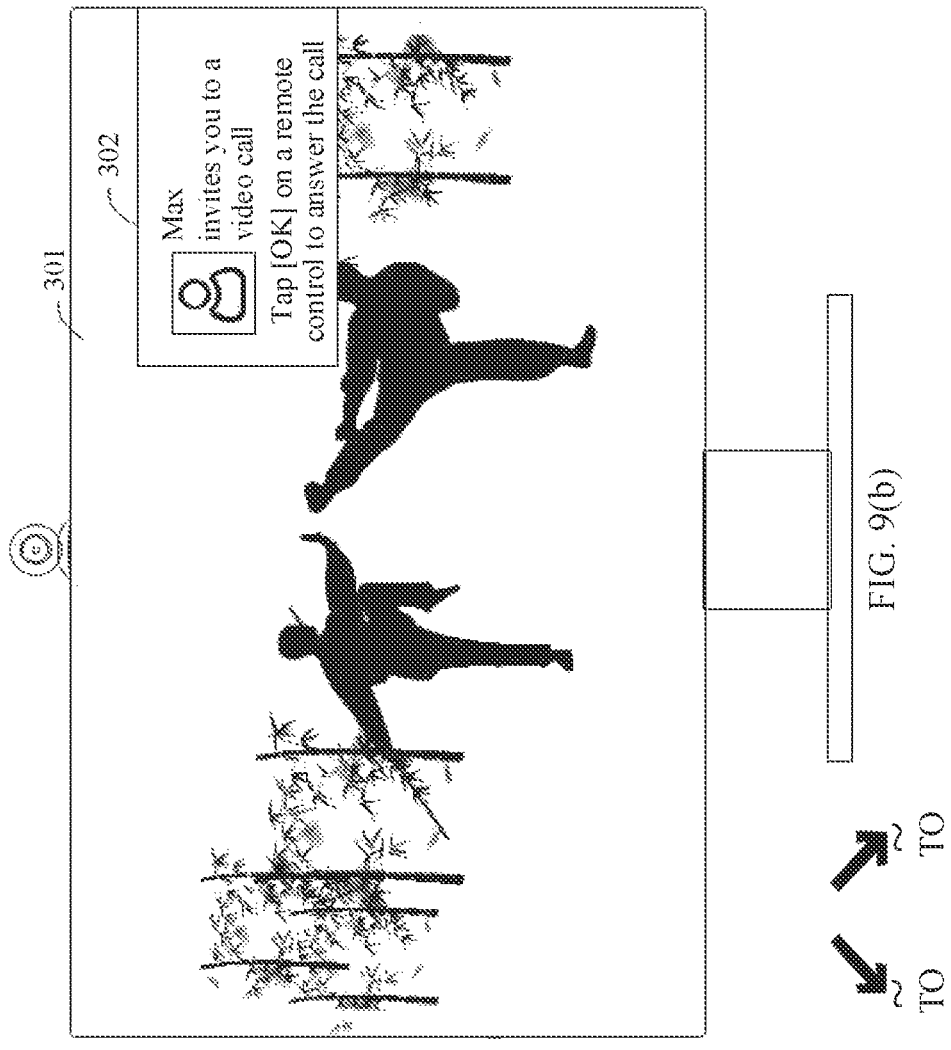
Figure 9A:
Figure 9A:
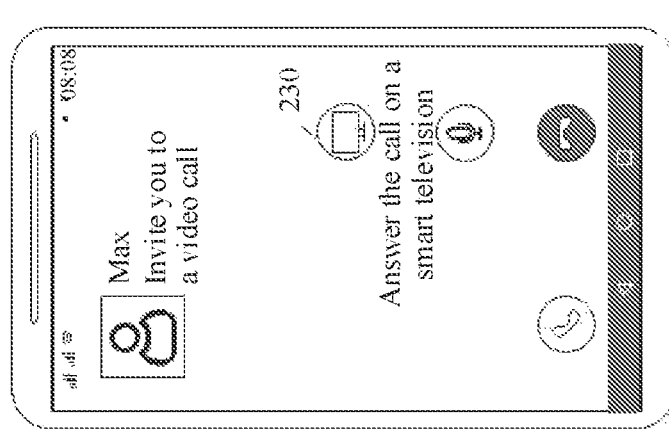

FIG. 9(*a*) to FIG. 9(*d*) show an example of graphical user interfaces displayed when an electronic device 100 sends a notification message to another device when it is determined that the electronic device 100 is in a video call state. As shown in FIG. 9(*a*), when it is determined that a mobile phone is in a video call state, the mobile phone may display a control 230 on a graphical user interface. For details, refer to FIG. 7(*a*) to FIG. 7(*d*). Details are not described herein again. In this case, the mobile phone may broadcast a notification message to another device in a device group, or may send a notification message to a specific device. The notification message is used to prompt a user that device interaction can be performed. As shown in FIG. 9(*a*) to FIG. 9(*d*), when it is determined that the mobile phone is in a video call state, the mobile phone may send a third notification message to a smart television. In response to receiving the third notification message, the smart television may display a fourth notification message 302 on an interface 301 that is playing a video and that is shown in FIG. 9(*b*). The fourth notification message 302 may be text information, for example, "Max invites you to a video call. Tap [OK] on a remote control to answer the call". The fourth notification message 302 is used to prompt the user to perform an operation to switch the video call from the mobile phone to the smart television for continuing. In some embodiments, the fourth notification message 302 may further include information such as an icon of the other party of the video call. If the smart television detects an operation performed on an OK button on a remote control, the smart television may send a fifth notification message to the mobile phone. After receiving the fifth notification message, the mobile phone switches the video call from the mobile phone to the smart television for continuing. In some other embodiments, before detecting an operation performed on an OK button on a remote control, the smart television may display an image or a live program, or may display an image or a video displayed by the mobile phone through screen projection, or may display a game interface.

In some other embodiments, the third notification message may be a segment of code. After receiving the third notification message, the smart television parses and renders the third notification message, and finally presents the third notification message as content that can be identified by the user.

In some other embodiments, the fourth notification message 302 may indicate the user to trigger device interaction by using a voice or gesture command.

In response to the operation that is detected by the smart television and that is performed on the OK button on the remote control, the smart television may display information collected by a camera of a device of the other party. As shown in FIG. 9(*c*), the smart television may include a sixth video display area 303 and a seventh video display area 304. The information collected by the camera of the device of the other party may be displayed in the sixth video display area 303, and information collected by a camera of a device of this party may be displayed in the seventh video display area 304. In some other embodiments, a graphical user interface displayed by the smart television may further include a sixth notification message 305. The sixth notification message 305 may be a text message, for example, "Say "mobile phone" to me, to continue the video call on the mobile phone", to prompt the user to perform a corresponding operation to perform video call switching. If the smart television detects a voice indication "mobile phone" input by the user by using a microphone of the smart television or a microphone built in the remote control, the smart television triggers switching of the video call to the mobile phone.

In some embodiments, when displaying a video call interface, the smart television may pause a video that is being played. In some other embodiments, when the smart television displays a live program before detecting the operation performed on the OK key on the remote control, when the smart television displays the video call interface, the smart television or a set-top box connected to the smart television may record a moment at which a video playing interface is switched to the video call interface, and the smart television 102 or the set-top box connected to the smart television 102 may record the live program after the moment. When the video call ends on the smart television, the recorded live program can be displayed from the recorded moment. In some other embodiments, when the smart television displays the live program before detecting the operation performed on the OK key on the remote control, and when the video call ends on the smart television, the live program may continue to be displayed from a current moment.

In some other embodiments, the smart television may continue to display the previous image or video while displaying the video call interface. As shown in FIG. 9(d), the user interface displayed by the smart television may include an eighth video display area 310, a ninth video display area 311, and a tenth video display area 312. The eighth video display area 310 may display a video displayed by the smart television before the video call interface is displayed, the ninth video display area 311 may display data collected by the camera of the device of the other party of the video call, and the tenth video display area 312 may display data collected by the camera of the device of this party of the video call.

In some other embodiments, the eighth video display area 310 may occupy a larger display area, and the ninth video display area 311 and the tenth video display area 312 may occupy smaller display areas.

In some other embodiments, the user interface of the smart television may include only the eighth video display area and the ninth video display area.

By displaying the interface, the user can continue a currently ongoing activity when performing device switching, which further improves user experience.

Figure 10:
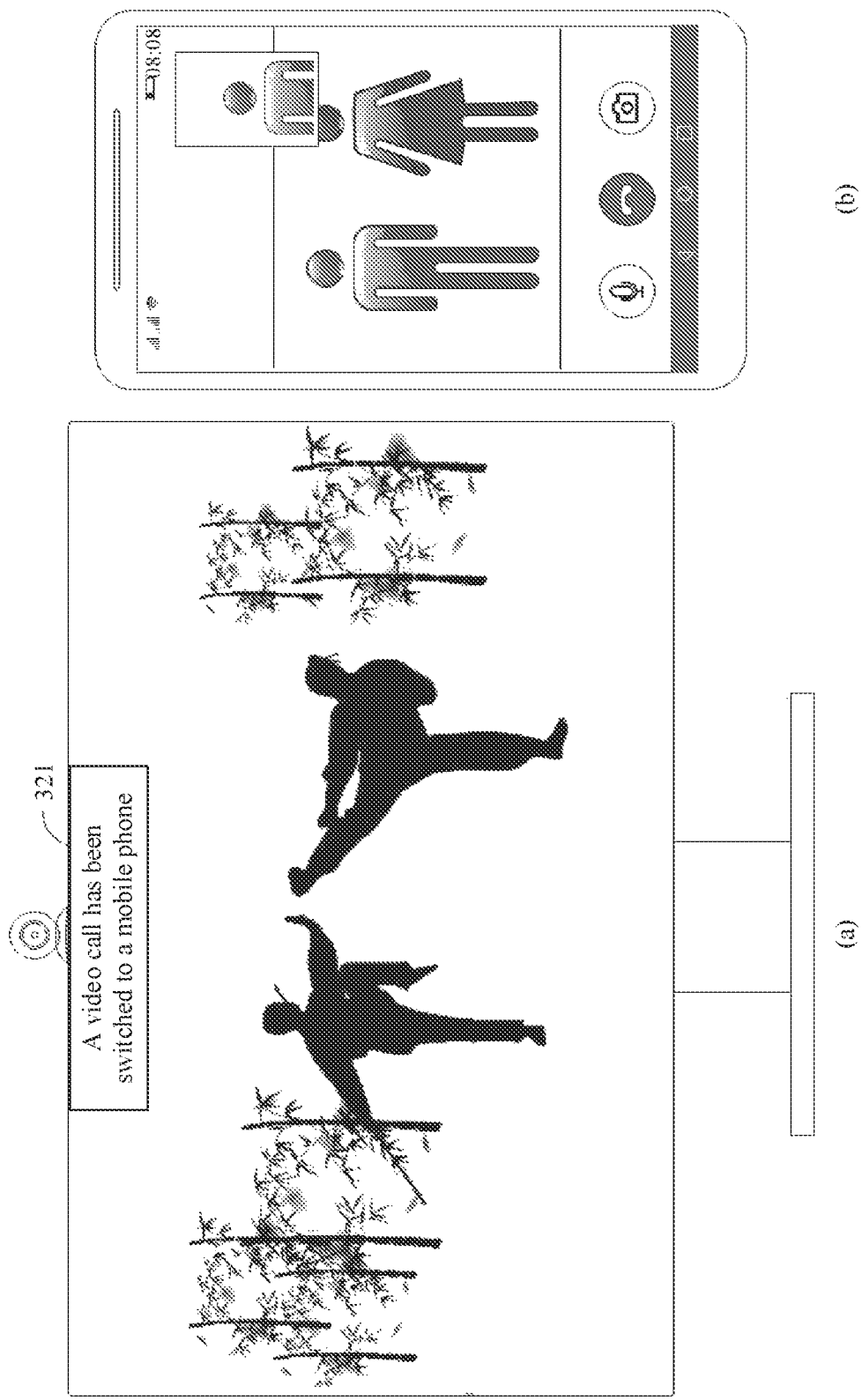
FIG. 10(a) and FIG. 10(b) show still further graphical user interfaces during device interaction according to an embodiment of this application.

FIG. 10 shows an example of graphical user interfaces displayed when a video call is switched from a smart television to a mobile phone. If the smart television detects an operation that triggers device interaction, for example, as shown in FIG. 9(c), the smart television detects a voice indication "mobile phone" input by a user by using a microphone of the smart television or a microphone built in a remote control, the smart television may send a seventh notification message to the mobile phone. After receiving the seventh notification message, the video call is switched back to the mobile phone. The smart television may continue to display a video, as shown in FIG. 10(a). In addition, the user interface displayed by the smart television may further include a notification message 320. The notification message 320 may be text information, for example, "A video call is being performed on a mobile phone", to notify the user of a device that is currently performing the video call. In some other embodiments, the notification message may include a control (not shown in the figure), and in response to an operation performed on the control, the video call may be switched from the mobile phone to the smart television for continuing.

When the video call is switched to the mobile phone, a graphical user interface shown in FIG. 10(b) may be displayed on the mobile phone. The graphical user interface may include a hang-up control, a camera switching control, a voice switching control, a first video display area, and a second video display area. For the foregoing content, refer to FIG. 3(c). Details are not described herein again.

In some embodiments, when the video call is performed on the smart television, a built-in or external camera of the smart television may be used. When the video call is performed on the mobile phone, a camera of the mobile phone may be used. Therefore, after device switching, data that is collected by the camera of the device of this party and that is displayed on the smart television and the mobile phone may be different.

Figure 11:
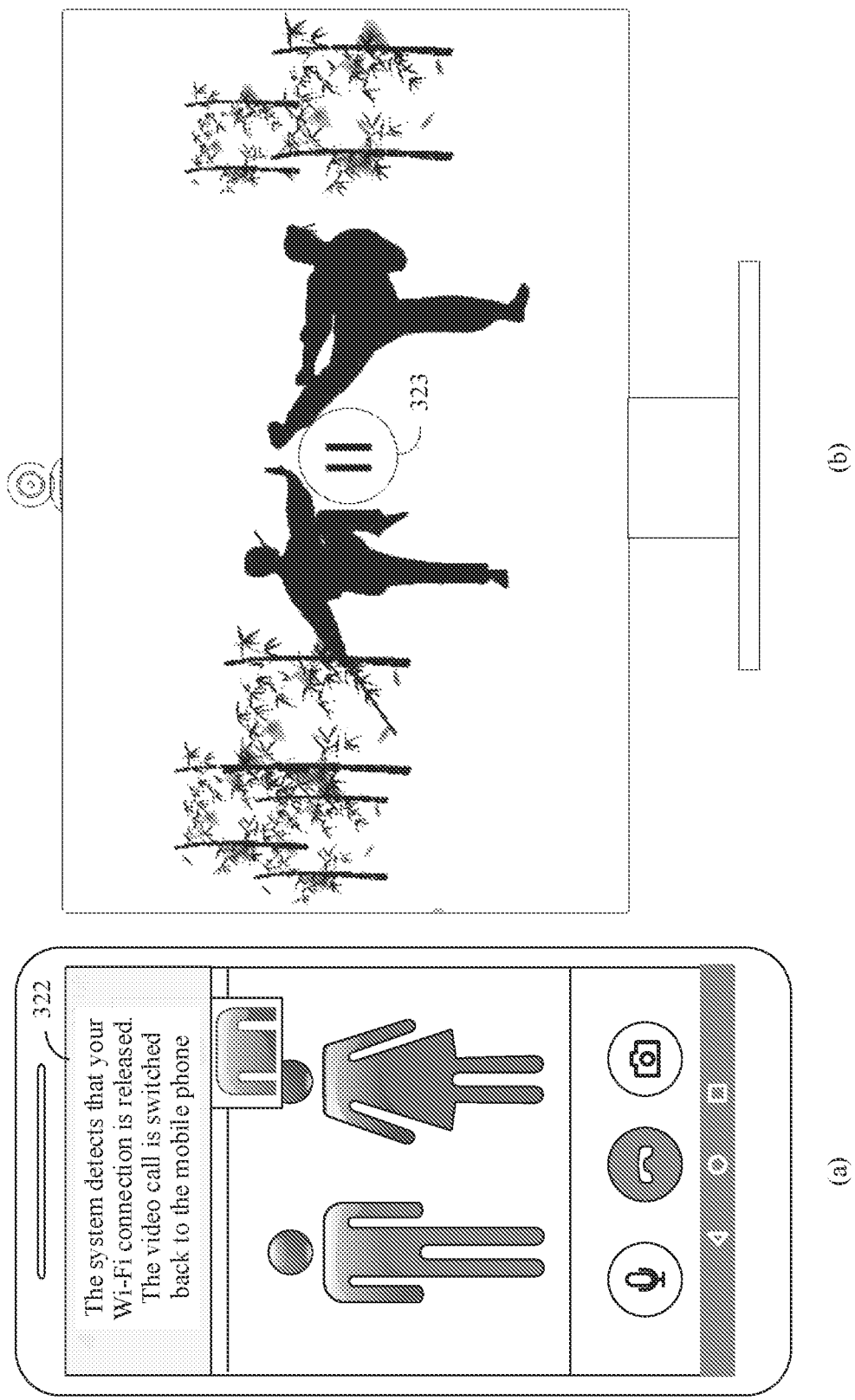
FIG. 11(a) and FIG. 11(b) show yet further graphical user interfaces during device interaction according to an embodiment of this application.

In some other embodiments, the electronic device 100 can perform device interaction based on a device change status of a device group. FIG. 11 shows an example of graphical user interfaces displayed when device switching is performed after a video call is switched from a mobile phone to a smart television and a connection to a local area network is released. As shown in FIG. 10(b), before the video call is switched to the smart television, a video may be played on the smart television. After the mobile phone is disconnected from the local area network, the mobile phone may send an eighth notification message to a video call application server. After the server receives the eighth notification message, the video call may be switched from the smart television to the mobile phone for continuing. As shown in FIG. 11(a), the video call interface may be displayed on the mobile phone. In addition, the graphical user interface displayed on the mobile phone may further include a notification message 322, and the notification message may include text such as "The system detects that your Wi-Fi connection is released. The video call is switched back to the mobile phone", to notify a user of a current status and a device that performs the video call.

After the video call is switched to the mobile phone, the smart television may pause displaying the video. As shown in FIG. 11(b), a user interface displayed by the smart television includes a pause identifier 323, to prompt the user that the current video is in a paused state.

Figure 12:
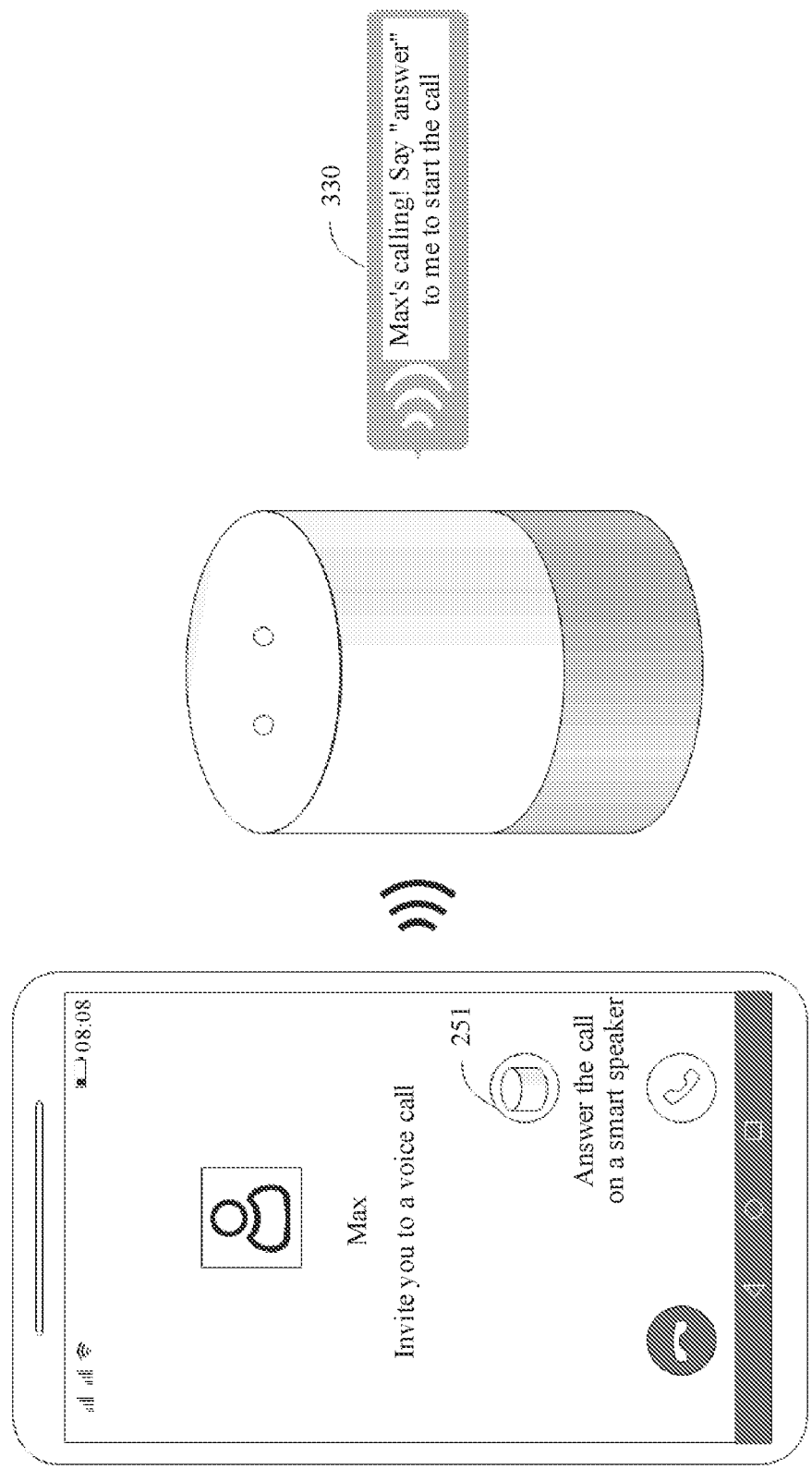
FIG. 12 is a schematic diagram of another device interaction according to an embodiment of this application.

In some other embodiments, when determining that a mobile phone is currently in a voice call state, the mobile phone may send a notification message to a smart speaker in a device group. After receiving the notification message, the smart speaker may prompt, through a voice, a user to answer a voice call by using the smart speaker. As shown in FIG. 12, when determining that the mobile phone is in a voice call state, the mobile phone may display, on a graphical user interface, the control 251 shown in FIG. 8(c). Details are not described herein again. When determining that the mobile phone is in a voice call state, the mobile phone may further send a ninth notification message to the smart speaker. After receiving the ninth notification message, the smart speaker may play audio 330 through a voice. Audio content may be "Max is calling. Say "answer" to me to start the call", to prompt that a voice call request is received and can be answered by using the smart speaker. When the smart speaker detects a related voice indication, the smart speaker may use a voice assistant to establish a voice call connection.

Figure 13:
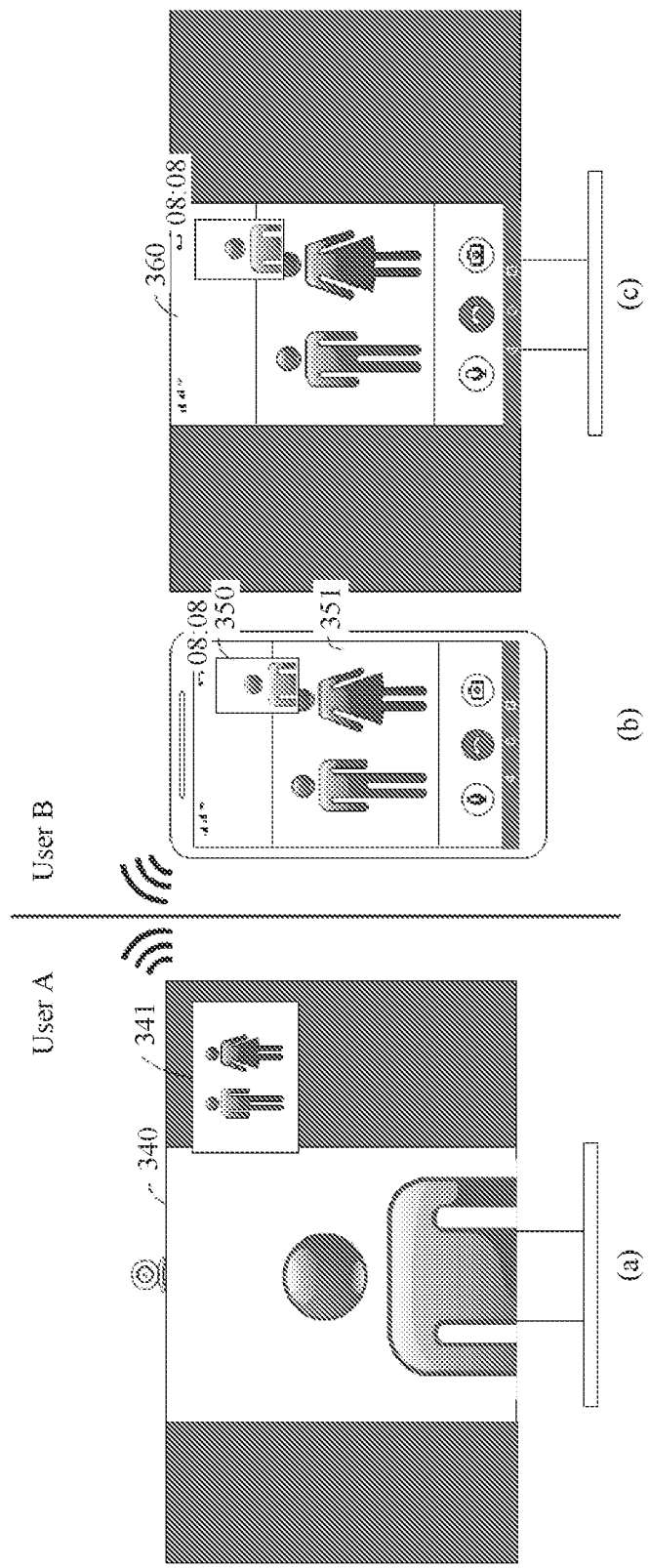
FIG. 13(a) to FIG. 13(c) show still yet further graphical user interfaces during device interaction according to an embodiment of this application.

FIG. 13 shows an example of a graphical user interface displayed by each device after two parties of a video call perform device interaction. As shown in FIG. 13, a user A and a user B have a video call. A same video call application, or different versions (for example, a mobile phone version and a television version) of a same video call application, or different applications that can share an account is installed on a smart television of the user A and a mobile phone of the user A. In addition, the smart television of the user A may have a built-in or external camera and microphone. When the user A makes a video call, and the mobile phone of the user A determines that the user A is in a video call state, the video call may be switched from the mobile phone to the smart television for continuing.

As shown in FIG. 13(a), a user interface displayed by the smart television of the user A may include a video display area 340 and a video display area 341. The video display area 340 may display data collected by a camera of a mobile phone of the user B, and the video display area 341 may display data collected by the camera of the smart television of the user A.

A video call application that is the same as that of the mobile phone of the user B, or different versions of a same video call application, or different applications that can share an account may not be installed on a smart television of the user B. In addition, the smart television of the user B may not be connected to a camera or a microphone. When the user B makes a video call, and the mobile phone of the user B determines that the mobile phone is in a video call state, a screen projection operation may be performed on the mobile phone, so that a graphical user interface that is the same as that on the mobile phone is displayed on the smart television of the user B.

As shown in FIG. 13(b), the user interface displayed by the mobile phone of the user B may include a video display area 350, a video display area 351, a status bar, a navigation bar, a hang-up control, a camera switching control, and a voice switching control. The video display area 350 may display the data collected by the camera of the mobile phone of the user B, and the video display area 351 may display the data collected by the camera of the smart television of the user A.

As shown in FIG. 13(c), the user interface 360 displayed by the smart television of the user B may have a same display effect as that of the user interface displayed on the mobile phone of the user B, but areas and controls included in the user interface 360 displayed by the smart television of the user B cannot receive an operation of the user.

In some other embodiments, the interface displayed on the smart television may be the same as a part that is of the graphical user interface displayed on the mobile phone and that does not include a status bar or a navigation bar. In some other embodiments, the interface displayed on the smart television may be the same as a video call application window.

Figure 14A:
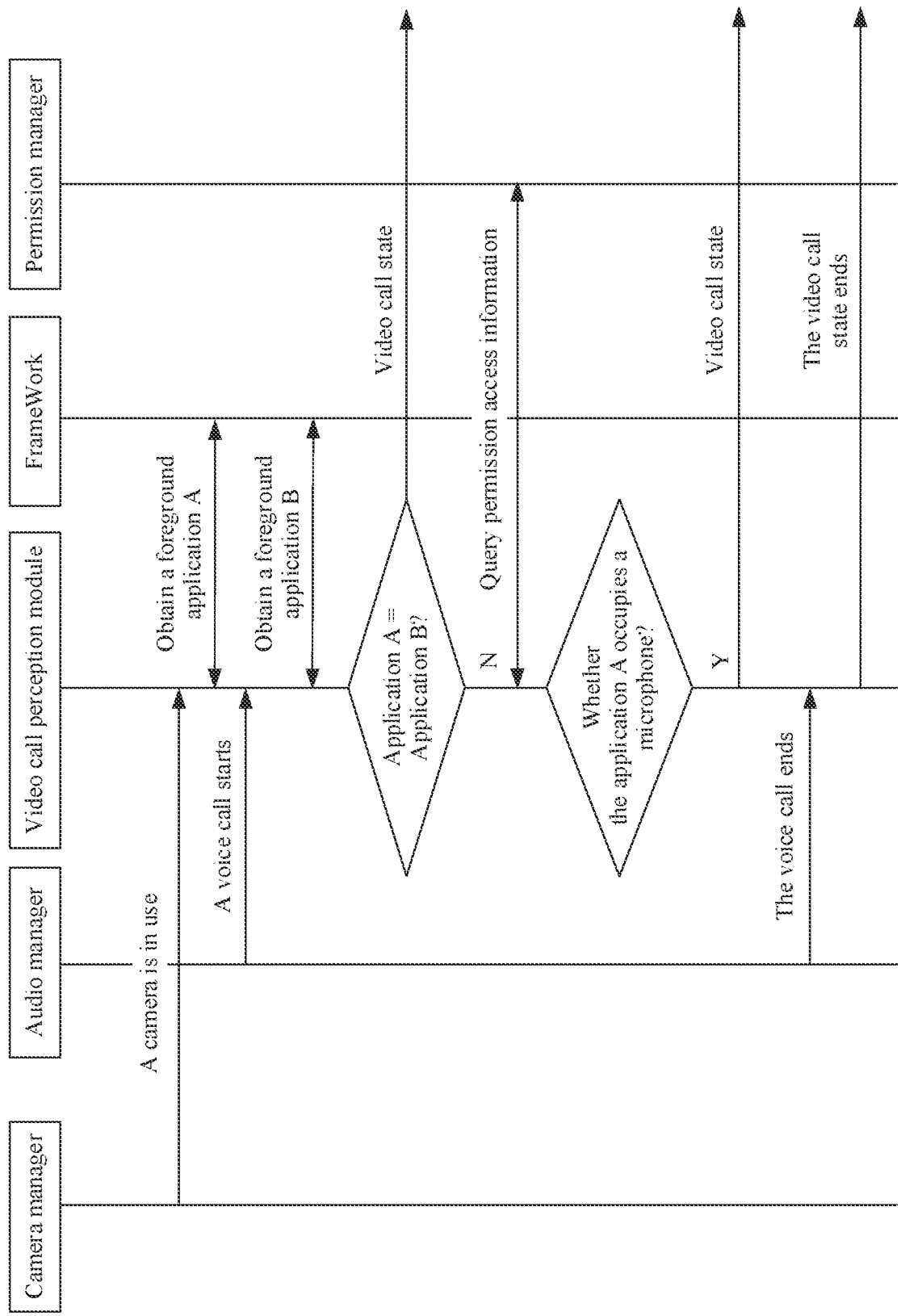
FIG. 14A and FIG. 14B are schematic flowcharts of a method for determining a status of an electronic device according to an embodiment of this application.
Figure 14B:
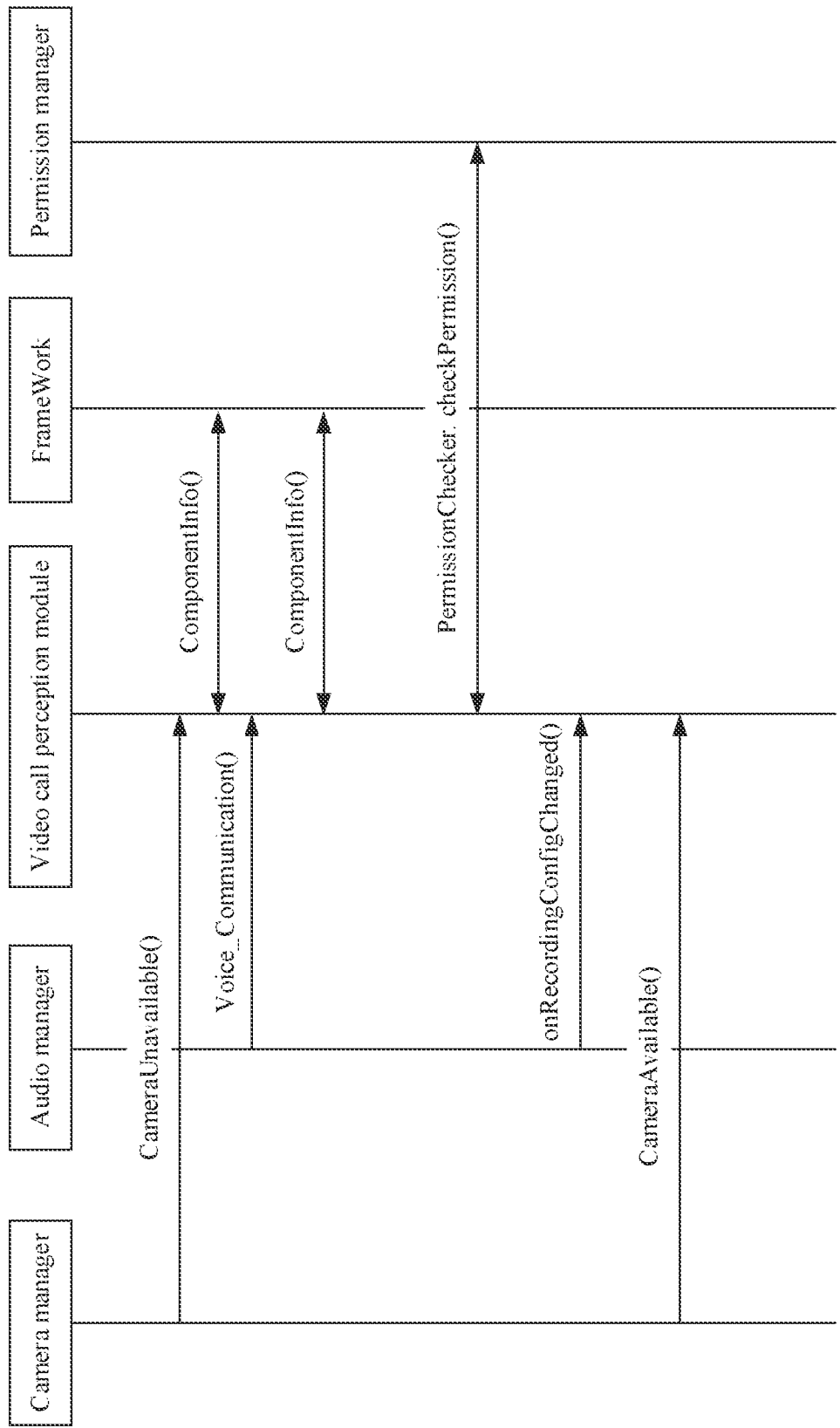

FIG. 14A and FIG. 14B show an example of a method for determining a current service status according to an embodiment of this application. The service status includes a video call, a voice call, and the like.

The electronic device 100 may monitor usage of a hardware device resource, and determine the current service status based on usage and release of the hardware device resource. For example, the electronic device 100 may monitor whether device resources such as a microphone, a speaker, and a camera are used by a same process. If the microphone, the speaker, and the camera are used by the same process, the electronic device 100 may determine to currently enter a video call state. In some other embodiments, the electronic device 100 determines, by monitoring whether the camera is used and whether the microphone and/or the speaker are/is used by a same process, whether to currently enter a video call state. For example, when both users are in a video call, from a moment at which an initiator of the video call starts to make a call, a camera and a speaker of an electronic device of the initiator may be used in a video call process. When a receiver of the video call receives a video call request, a camera and/or a speaker of an electronic device of the receiver are/is used in the video call process. The camera may include a front-facing camera and a rear-facing camera. From a moment at which the video call is connected, microphones of the initiator and the receiver are started, and the microphones start to be used by the video call process. In some other embodiments, the camera may be a front-facing camera.

Specifically, the electronic device 100 may obtain camera use and release events by using the camera manager at the application framework layer shown in FIG. 2B. In addition, the electronic device 100 may obtain audio resource usage by using the audio manager at the application framework layer shown in FIG. 2B. The audio resource may include a microphone and a speaker. An Android system is used as an example. The electronic device 100 may listen to camera use and release events by using a camera manager built in the Android system, and can further obtain an ID of a used camera which corresponds to a front-facing camera or a rear-facing camera. The electronic device 100 may listen to a voice call event by using an audio manager built in the Android system. When a call starts, onRecordingConfigChanged can be triggered, and a signal MediaRecorder.AudioSource.VOICE_COMMUNICATION is received from the audio manager. When a call ends, onRecordingConfigChanged can be triggered, and an empty set is received. The voice call event indicates that the signal MediaRecorder.AudioSource.VOICE_COMMUNICATION is received. When the foregoing voice call event occurs, it may indicate that the audio resource including the microphone and the speaker is used.

The audio manager is configured to manage usage of the audio resource, and output a corresponding message based on the usage of the audio resource. For example, the audio manager may output a message indicating that the microphone is used, or may indicate a corresponding message according to different scenarios. For example, VOICE_COMMUNICATION indicates that the device is in the voice call. In addition, the output message may also be VOICE_DOWNLINK, VOICE_UPLINK, or the like, and is used to indicate an uplink/downlink state of the audio signal.

In some other embodiments, the electronic device 100 may obtain a dynamic message of an application by using an activity notification plug-in of an application management package. For example, when a video call is initiated, a VideoActivity message of a video call application can be monitored by using the activity notification plug-in.

In some embodiments, after receiving, from the camera manager, a message (for example, a message CameraUnavailable) indicating that the camera is used, the electronic device 100 may obtain, from Frame Work, a foreground application A that uses the camera. If occurrence of a voice call event (that is, a signal MediaRecorderAudioSource.VOICE_COMMUNICATION is received from the audio manager) is detected during use of the camera (for example, no message CameraAvailable is received), the electronic device 100 may obtain, from the FrameWork, a foreground application B in this case. If the application A is the same as the application B, the electronic device 100 may determine to enter a video call state. In some other embodiments, the electronic device 100 receives, at a moment T1, a message indicating that the camera is used, and detects, at a moment T2, that a voice call event occurs. When the voice call event occurs when the camera is used, the electronic device 100 may query a foreground application list. If the foreground application does not change in a time period from T1 to T2, it indicates that the camera, the microphone, and the speaker are used by the application. The electronic device 100 may determine to enter a video call state.

If a video call user minimizes the video call application and starts another application before the video call is connected, the foreground application may change. If the application A is not the same as the application B, or the foreground application changes in the time period from T1 to T2, the electronic device 100 may query permission access information, for example, a permission access record. Specifically, the electronic device may obtain a foreground application name APP1 when the camera is used, and may query, by using a function PermissionChecker.checkPermission( ) and by using an application name and a permission type, whether an application that recently accesses the permission type matches an entered application. The application name may also be a package name, or may be a process name corresponding to the application. The permission type may be a type such as a microphone permission or a camera permission. For example, when the function PermissionChecker.checkPermission( ) is used to query whether the application that recently accesses the microphone permission is APP1, if the function PermissionChecker.checkPermission( ) returns PERMISSION-Granted, it indicates that the application that recently applies for the microphone permission is APP1, and currently the microphone is used by APP1; or if the function returns PERMISSION-DENIED or PERMISSION_DENIED_APP_OP, it indicates that currently the microphone is not used by APP1.

Therefore, if a return value queried by using the function PermissionChecker.checkPermission( ) is PERMISSION-Granted, it indicates that the camera, the microphone, and the speaker are all used by APP1, and the electronic device 100 may determine to enter a video call state.

In some other embodiments, if the application A is not the same as the application B, or the foreground application changes in the time period from T1 to T2, the electronic device 100 may separately query permission access records of the camera and the microphone, to obtain information about applications that recently access the camera and the microphone. If the two applications are a same application, the electronic device 100 may determine to enter a video call state.

In some other embodiments, the electronic device 100 may first detect occurrence of a voice call event, and may continue to wait for receiving, from the camera manager, a message indicating that the camera is used. If the message indicating that the camera is used is received when the voice call event is performed, the electronic device 100 may separately query the foreground application when the voice call event occurs and when the message indicating that the camera is used is received, or may query the foreground application list after receiving the message indicating that the camera is used. The electronic device 100 detects, at a moment T3, that the voice call event occurs, and receives, at a moment T4, the message indicating that the camera is used. If the foreground application does not change in a time period from T3 to T4, it indicates that the camera, the microphone, and the speaker are used by the application. The electronic device 100 may determine to enter a video call state.

If queried foreground applications are not a same application, or a foreground application changes in the time period from T3 to T4, the electronic device 100 may query whether an application that recently applies for camera usage permission matches a foreground application when the voice call event occurs. In some other embodiments, the electronic device 100 may query whether an application that recently applies for microphone usage permission and a foreground application that receives the message indicating that the camera is used are a same application. If they are the same application, the electronic device 100 may determine to enter a video call state. When the electronic device 100 receives a signal onRecordingConfigChanged from the audio manager and receives an empty set, it indicates that the voice call event ends, and the electronic device 100 may determine that the video call state ends.

In some embodiments, the foregoing step of determining a video call state is completed by a video call perception module of the electronic device 100. The module may be located at the application layer and serve as a system application. In some other embodiments, the module may also be located at the application framework layer.

The electronic device 100 may query the permission access record from the permission manager located at the application framework layer, or may obtain the permission access information by using the permission access record of the electronic device 100 at the application layer.

In some embodiments, the electronic device 100 may monitor whether the camera is used, and then detect whether the microphone or the speaker is used by a same process, to determine whether to enter a video call state. If the camera is used by a process A, and the microphone or the speaker is used by a process B, the electronic device determines that the electronic device does not enter a video call state, or if the microphone or the speaker is also used by the process A, the electronic device determines to enter a video call state. In some other embodiments, the electronic device 100 may alternatively first detect whether the microphone or the speaker is used, and then detect whether the camera is used. A sequence of detecting devices by the electronic device 100 is not limited in this embodiment of this application.

In some other embodiments, the electronic device 100 may determine, by monitoring whether the camera is used, monitoring a voice call state, and monitoring a running status of a video call application process, whether to enter a video call state. For example, the electronic device 100 may obtain, by using the camera manager shown in FIG. 2B, whether the camera is used, and obtain, by using the audio manager shown in FIG. 2B, whether the camera enters a voice call state. If the electronic device 100 detects that the camera is used when the video call application runs in the foreground, and the electronic device 100 is in a voice call state, it may be determined that the electronic device 100 enters a video call state.

For example, when the system detects a message CameraAvailable, it indicates that the camera is not used; when the system detects a message CameraUnavailable, it indicates that the camera is used; when the system detects a message MicOpen, it indicates that the microphone is turned on and is in a used state; and when the system detects a message MicClose, it indicates that the microphone is turned off and is not used.

It may be understood that the "video call" and the "voice call" are merely used as examples to describe different states of the electronic device, and may also be a "first state" or a "second state", or may be different flags. This is not limited in this embodiment of this application.

In some other embodiments, the electronic device 100 may monitor usage of the front-facing camera and the microphone and/or the speaker to determine whether to enter a video call state.

In some other embodiments, the electronic device 100 may determine, by monitoring whether the front-facing camera is used, monitoring a voice call state, and monitoring a running status of a video call application process, whether to enter a video call state.

In some other embodiments, the electronic device 100 may determine, by monitoring whether the microphone and the speaker are used by a same process, whether to currently enter a voice call state. When the microphone and the speaker are used by a same process, but the camera is not used by the process, the electronic device 100 may determine that the electronic device 100 currently enters a voice call state.

In some other embodiments, the electronic device 100 may listen to and listen to a voice call event, and determine whether to currently enter a voice call state. When the electronic device 100 detects a voice call event, but the camera is not used in a voice call process, the electronic device 100 may determine that the electronic device 100 currently enters a voice call state.

The electronic device 100 may further determine a current service status by monitoring a memory and/or a traffic change. Specifically, the electronic device 100 may obtain memory change data and/or traffic data, input the memory change data and/or the traffic data into a service status model, and determine a current service status based on an output result of the service status model.

For example, it may be determined, by detecting a Java stack memory corresponding to a video call application, that the electronic device enters a video call state. After a video call starts, the Java stack memory of the video call application increases. In addition, the electronic device 100 may determine, by inputting sampling samples of uplink and downlink traffic into the service status model, that the electronic device 100 is currently in a video call state; or may determine, by monitoring downlink traffic and inputting sampling samples of downlink traffic into the service status model, that the electronic device 100 is currently in a video on-demand state.

In some embodiments, the service status model may be a binary classifier, for example, a logistic regression (LR) classifier, or a support vector machine (SVM) classifier. The service status model may be prestored in the electronic device 100, or may be from a second device. The second device may be a server or another electronic device. The another electronic device may be a portable electronic device or a non-portable electronic device such as a mobile phone, a tablet computer, or a wearable electronic device. The second device trains the service status model by using training samples, and sends a trained service status model to the electronic device 100.

Specifically, the second device may train the service status model by using the following process.

The second device collects a predetermined quantity of sample data for a service type. For example, memory change data and data traffic change data of one or more electronic devices in processes of various service statuses (such as a video call, live broadcast, and on-demand) may be collected as the sample data. In some other embodiments, the foregoing sample data may be generated through simulation.

The second device may divide the sample data into different datasets according to a predetermined proportion, and the different datasets are separately used for model training, verification, and testing. In some embodiments, the second device may divide the sample data at a ratio of 7:2:1.

The sample data is used for model training, verification, and testing. Usually, if accuracy of a model reaches 95% or higher during testing, it is indicated that the model implements better performance and model training can be stopped.

In some other embodiments, the electronic device 100 may identify a current service status based on a technology such as deep packet inspection (Deep Packet Inspection, DPI) or deep flow inspection (Deep Flow Inspection, DFI). In the DPI technology, the service type is identified mainly by parsing an application layer packet. In the DFI technology, the service type is identified mainly based on packet header information of an IP layer or a transport layer.

In some other embodiments, the electronic device 100 may determine a current service status by detecting a displayed graphical user interface or jointly determine a current service status with another detection manner. Specifically, the electronic device 100 may determine a current service status by detecting an eigenvalue on a single graphical user interface and/or a change of the graphical user interface. For example, when the electronic device 100 detects that a hang-up button and a voice switching button are displayed on a graphical user interface of the electronic device 100, and detects that WeChat is currently running, the electronic device 100 may determine that the electronic device 100 currently enters a video call state. In some other embodiments, the electronic device 100 may further determine different stages of a same service status by monitoring usage of a hardware device resource and monitoring a memory and/or traffic change. For example, the electronic device 100 may determine, by monitoring whether a camera and a microphone and/or a speaker are used by a same process, to enter a video call service. However, when the electronic device is in a stage in which a video call is initiated or answered but the video call is not started, data traffic of the electronic device is relatively low; and when the electronic device starts the video call, uplink and downlink data traffic of the electronic device is relatively high. Therefore, different stages of the electronic device in the video call process may be determined by using the change of the data traffic status.

In some other embodiments, the electronic device 100 may further determine a service status by using an application list. The application program list may include an application or a process having a corresponding service. For example, the electronic device 100 may set a video call application list for a video call service, and the application list may include a process name "com.tencent.mm" corresponding to WeChat. The application list may be from the second device, or may be prestored in the electronic device 100. The electronic device 100 may determine, by monitoring a usage status of a hardware resource and a running status of a current foreground program, an application that uses the hardware resource. If the application is in the video call application list, it may be determined that the electronic device 100 is currently in a video call state. Otherwise, it is determined that the electronic device 100 is currently not in a video call state. In some other embodiments, when the application that uses the hardware resource is not in the video call application list, the electronic device 100 may determine, by determining a memory and/or data traffic change status of the application, whether the application is in a video call state.

The foregoing method for determining the service status may be used independently or in combination. For example, using the video call service as an example, the electronic device may determine, in one of the following manners, to enter a video call service:

A: The electronic device 100 may monitor a usage status of a hardware resource and a running status of a video call application process. The foregoing hardware resource may include a camera and a microphone, or may be a camera, a microphone, and a speaker. If the hardware resource is used when the video call application runs, the electronic device 100 determines to enter a video call state.

B: The electronic device 100 may detect a usage status of a camera, detect whether voice call duration occurs, and detect a running status of a video call application process. For example, when the video call application runs in the foreground, if the camera is used and a voice call event is heard, it may be determined that the electronic device is in a video call state.

C: The electronic device 100 may detect a running status of a video call application process, collect memory data and/or traffic data during running of the video call, and input memory data and/or traffic data into the service status model. If the output of the service status model indicates that the current service is the video call service, the electronic device 100 determines to enter a video call state.

D: The electronic device 100 may also monitor a usage status of a hardware resource and a running status of a video call application process. The hardware resource may be a camera and a microphone, or may be a camera, a microphone, and a speaker. If the hardware resource is used, the electronic device determines whether a process that uses the hardware resource is in the video call application list. If the process is in the video call application list, the electronic device determines to enter a video call state; if the process is not in the application list, the electronic device collects memory data and/or traffic data, perform determining by using the service status model, and determines to enter a video call state if output of the service status model indicates that the current service is a video call service.

E: The electronic device 100 may listen to a usage status of a camera, whether a voice call event occurs, and a running status of a video call application process. If it is detected that a voice call event occurs when the camera is used, the electronic device 100 may determine whether a currently running process is in the video call application list. If the process is in the list, the electronic device determines to enter a video call state; or if the process is not in the application list, the electronic device performs determining by using the memory data and/or the traffic data.

After determining the service status, the electronic device 100 may determine whether there is currently an available device that can perform interaction. For example, after determining that a mobile phone is currently in a video call state, the mobile phone may determine whether there is a device having a video playback capability in a current device group, for example, a smart television. In some embodiments, the mobile phone may determine, by using the device description capability obtained during device discovery, whether the device has the video playback capability. In some other embodiments, the mobile phone may determine, by using a name of the device, that the device has the video playback capability. For example, a name of the device is "television", and the mobile phone may determine that the device has the video playback capability. If it is determined that there is a smart television in the current device group, the dialog box 210 shown in FIG. 3(*d*), or the dialog box 220 shown in FIG. 6(*a*), or the control 230 shown in FIG. 7(*b*) is displayed on a graphical user interface. After it is determined that the user is currently in a voice call state, the user may determine whether there is a device capable of performing a voice call in the current device group, for example, a smart speaker. If it is determined that there is a smart speaker in the current device group, the control 251 shown in FIG. 8(*c*) is displayed on the graphical user interface. If there is no device that can perform the current service in the current device group, the electronic device 100 may not display a dialog box or a control.

If there are a plurality of available devices in the current device group, the electronic device 100 may display the plurality of available devices on the graphical user interface. For example, when there are two available devices, a living room television and a bedroom television, in the device group of the mobile phone, the mobile phone may display, on the graphical user interface, the control 230 and the control 231, as shown in FIG. 7(*b*), or may display the dialog box 24, as shown in FIG. 7(*d*), or may display the control 230 and the control 232, as shown in FIG. 7(*c*), and display the dialog box 24 by performing an operation on the control 232. In some other embodiments, the electronic device 100 may preferentially display one of the plurality of available devices. For example, the mobile phone may store an interactive operation history or a recent interactive operation history. If screen projection is performed by using the living room television for a largest quantity of times, or the latest screen projection is performed on the living room television, the living room television may be displayed at the top of the dialog box 24 shown in FIG. 7(*d*). In some other embodiments, the mobile phone may alternatively display, on the graphical user interface, only the control 230 indicating the living room television, and does not display another device. In some other embodiments, the electronic device 100 may preferentially display an available device with a better device capability. For example, in the available devices of the mobile phone, a television screen of the living room television has a larger size than that of the bedroom television, and "Recommended" may be displayed next to the device "living room television" when the dialog box 24 shown in FIG. 7(*d*) is displayed. It may be understood that the foregoing preferential display may further include other manners such as different displayed fonts and different colors.

In some other embodiments, the electronic device 100 may display only an available device with a high priority on the graphical user interface.

In some other embodiments, the electronic device 100 may start to perform device discovery after determining a service status. For example, after determining that the mobile phone is in a video call state, the mobile phone starts to perform device discovery, and determines, in discovered devices, whether there is an available device.

After the electronic device 100 determines a service status and there is an available device, the electronic device 100 may display notification information. The notification message is used to prompt the user to perform device interaction. In some other embodiments, the electronic device 100 may display the notification message on the graphical user interface after detecting that a condition for displaying the notification message is met. For example, when detecting that the camera and the microphone are used by WeChat, the electronic device 100 may display the dialog box shown in FIG. 3(d), or the dialog box or the control shown in FIG. 7(b), FIG. 7(c), or FIG. 7(d). Alternatively, when the electronic device 100 detects that WeChat is running as a foreground application, the camera is used, and a voice call event occurs. The electronic device displays the dialog box shown in FIG. 3(d), or the dialog box or the control shown in FIG. 7(b), FIG. 7(c), or FIG. 7(d). Specifically, the electronic device 100 may display the notification message on the electronic device 100 by using the notification manager at the application framework layer shown in FIG. 2B. In some other embodiments, the electronic device 100 may display a dialog box on the electronic device 100 by using the window manager at the application program framework layer shown in FIG. 2B.

The following uses interaction between a mobile phone and a smart television as an example to describe a specific process of interaction between the electronic device 100 and another device in a device group.

Figure 15:
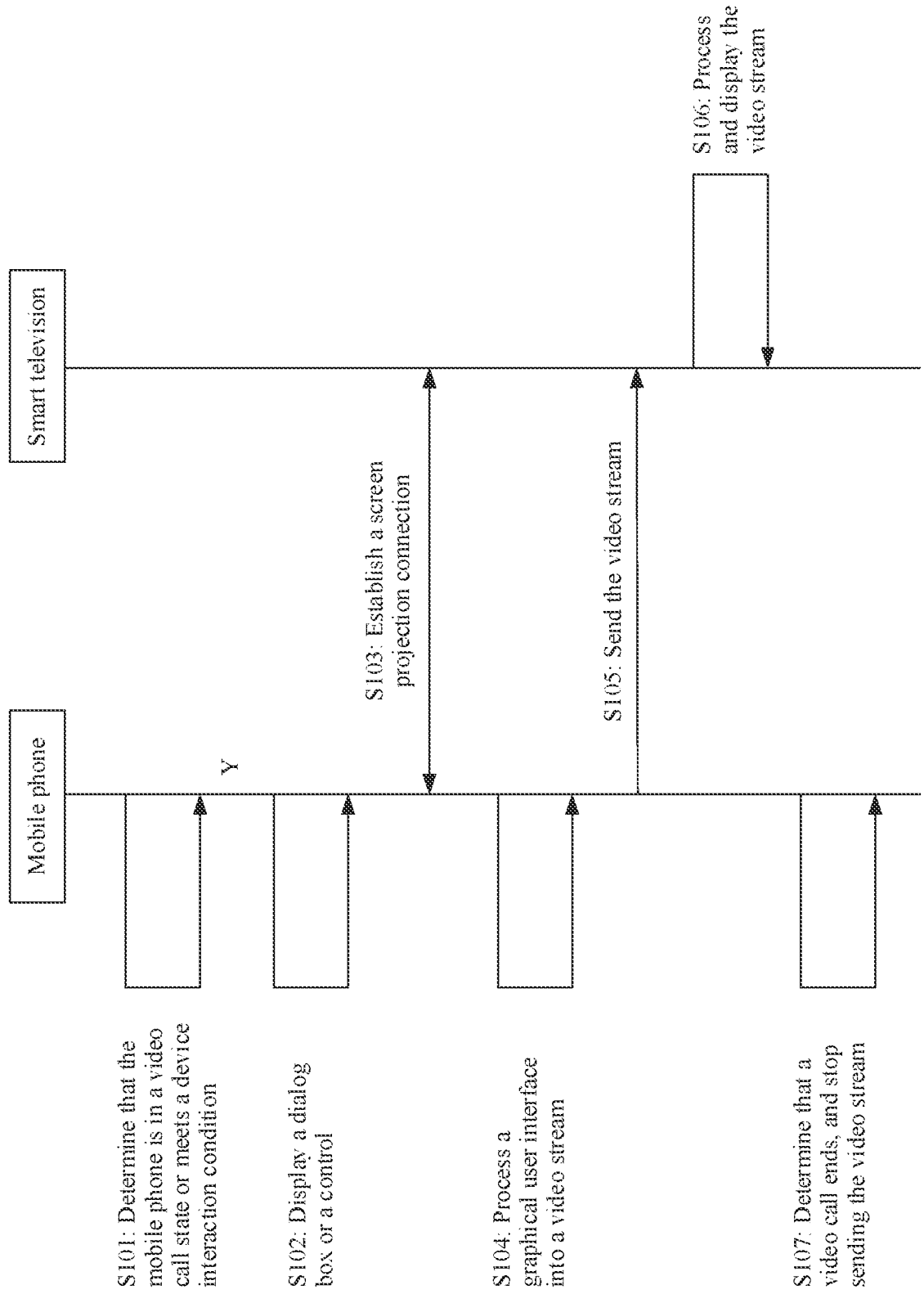
FIG. 15 is a schematic diagram of a signal procedure during device interaction according to an embodiment of this application.

In some embodiments, no video call application that is the same as that on the mobile phone, or different versions of a same video call application, or different applications that can share an account are installed on the smart television. In this embodiment, the mobile phone implements interaction by interacting with the smart television. As shown in FIG. 15, the mobile phone interacts with the smart television by using the following steps.

S101: A mobile phone determines that the mobile phone is in a video call state or meets a device interaction condition. Specifically, the mobile phone may determine, by determining whether a camera and a microphone are used by a video call application, or a voice call event occurs when a camera is used by a video call application, or the like, whether the mobile phone is in a video call state or whether a device interaction condition is met.

S102: The mobile phone may display, on a graphical user interface, the dialog box 220 shown in FIG. 6(a), or the control 230 and the control 231 shown in FIG. 7(b), and determine an interactive device by detecting an operation performed on the foregoing elements; or may display the control 232 shown in FIG. 7(c) and/or the dialog box 24 shown in FIG. 7(d), and determine a device selected by a user by detecting an operation performed on the foregoing elements.

S103: In response to an operation of triggering device interaction, the mobile phone may establish a screen projection connection to the smart television. In some embodiments, the mobile phone may establish a screen projection connection to the smart television by using a wireless display standard Miracast protocol in a wireless video display (Wi-Fi Display, WFD) technology.

In some embodiments, after the mobile phone establishes the screen projection connection to the smart television, the smart television may return a screen projection connection response to the mobile phone. In a process in which the mobile phone establishes the screen projection connection to the smart television, the mobile phone and the smart television may exchange and negotiate performance parameters. For example, the mobile phone may obtain an image size parameter of the smart television, a data format parameter that can be received by the smart television, and/or the like.

S104: The mobile phone processes the displayed graphical user interface into a video stream. In some embodiments, the mobile phone may process the displayed graphical user interface into a plurality of image frames based on a specific frequency, and perform video compression coding on the plurality of image frames in a plurality of consecutive time nodes to obtain the video stream. In some embodiments, the mobile phone may alternatively compress each image frame, so that a size of a compressed image is the same as a size of an image on the smart television.

In some other embodiments, the mobile phone may further obtain audio data of the graphical user interface in a period of time, where the period of time is determined by the foregoing plurality of contact time nodes. The mobile phone may perform audio compression coding on the audio data in the period of time, and mix, into the video stream, the audio data in the period of time after the video compression coding is performed on the plurality of image frames. A format of the video stream may be a video stream of any data format (for example, an MP4 (MPEG-4 Part 14) format) that can be received by the smart television. An image and audio corresponding to the video stream may be synchronously presented on the smart television.

S105: The mobile phone sends the video stream to the smart television.

S106: After receiving the video stream, the smart television processes the video stream into an image and/or audio and outputs the image and/or audio.

In some embodiments, the mobile phone may use the video stream as screen projection data to be carried by using a video streaming protocol (Real Time Streaming Protocol, RTSP) and output the screen projection data to the smart television. The smart television performs video streaming protocol receiving and processing and video and audio decoding on the screen projection data, and then renders and outputs the data.

S107: If the mobile phone determines that a video call of the mobile phone ends or a hardware resource is released, the mobile phone stops sending the screen projection data to the smart television. Specifically, the mobile phone may determine, by determining whether the hardware resource is released, whether the video call ends. The foregoing hardware resource may be the camera and the microphone, or may be the camera, the microphone, and a speaker. In addition, the mobile phone may alternatively determine, by determining that a voice call ends, that the video call ends. For example, when the audio manager in FIG. 2B detects an onRecordingConfigChanged method and receives an empty set, it indicates that the voice call ends, and the microphone and the speaker are released. In addition, a system can detect a CameraAvailable event, indicating that the camera is released. The mobile phone may determine that the video call ends. In some other embodiments, the mobile phone detects that the hardware resource is released, and may stop sending the video stream to the smart television. The smart television cannot receive the video stream, and does not display a video call interface.

Figure 16:
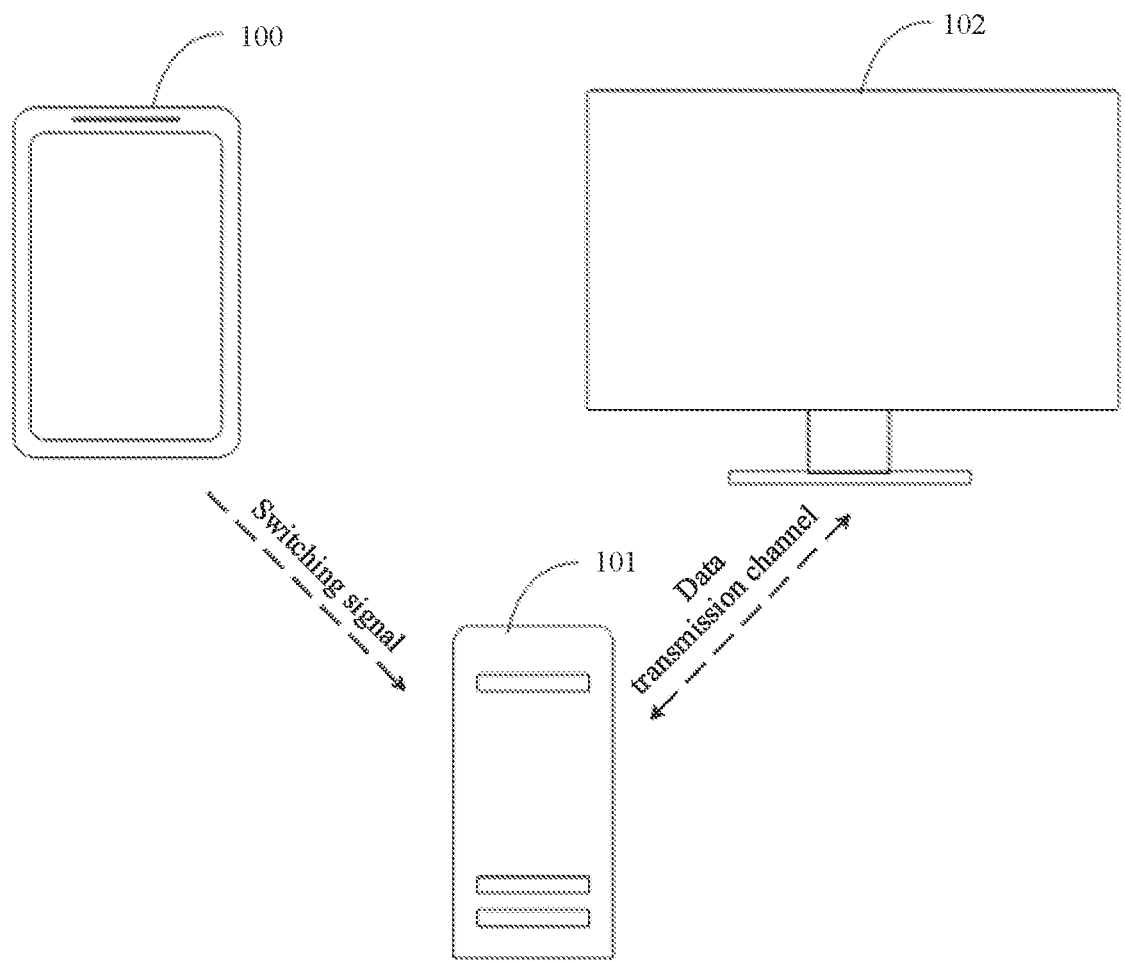
FIG. 16 is a schematic diagram of a system structure during another device interaction according to an embodiment of this application.
Figure 17:
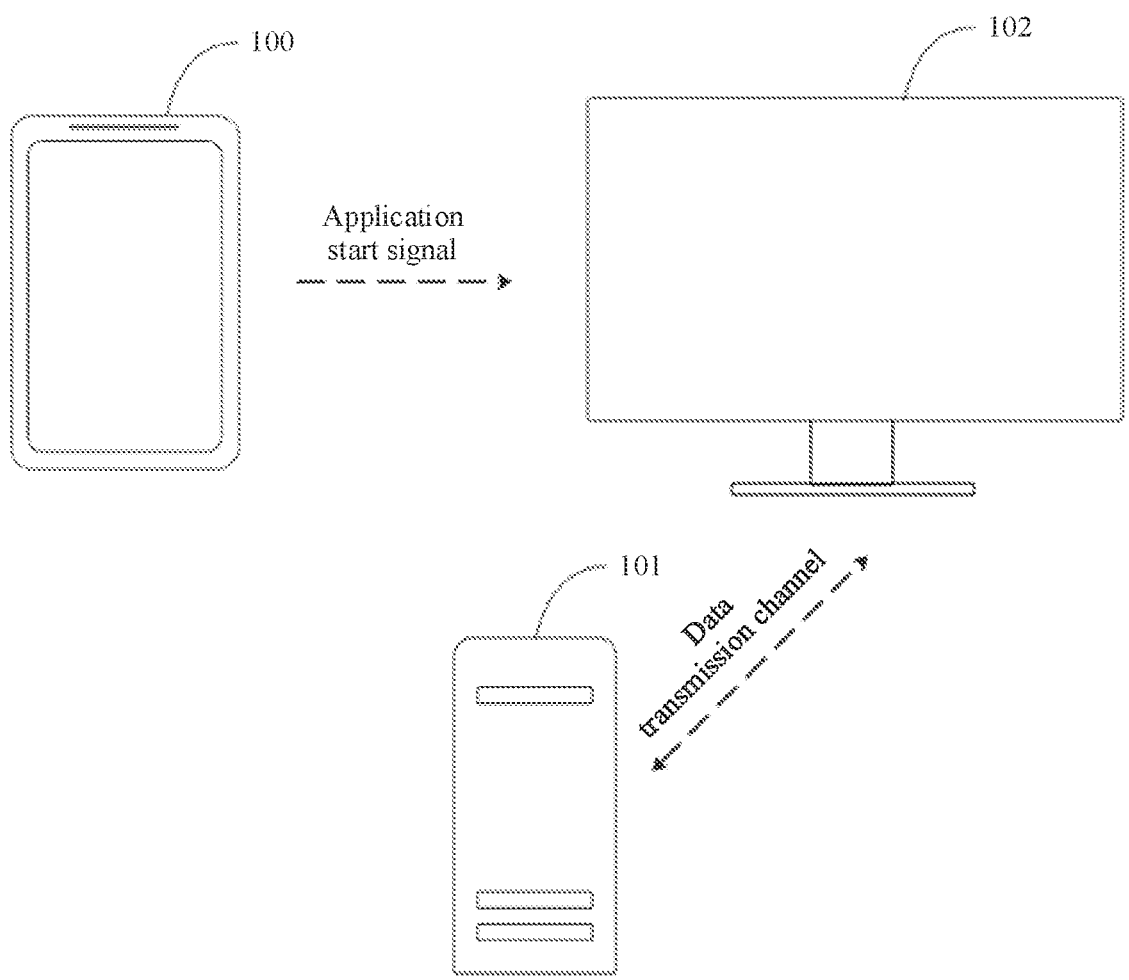
FIG. 17 is a schematic diagram of a system structure during still another device interaction according to an embodiment of this application.

In some other embodiments, a video call application that is the same as that on the mobile phone, or different versions of a same video call application, or different applications that can share an account may be installed on the smart television. FIG. 16 and FIG. 17 show two different manners in which a mobile phone interacts with a smart television and a server. Specifically, FIG. 16 shows a method in which the mobile phone interacts with the smart television by using the server. In FIG. 17, the mobile phone interacts with the smart television, so that the smart television can further interact with the server. The server may be a video call application server.

Figure 18:
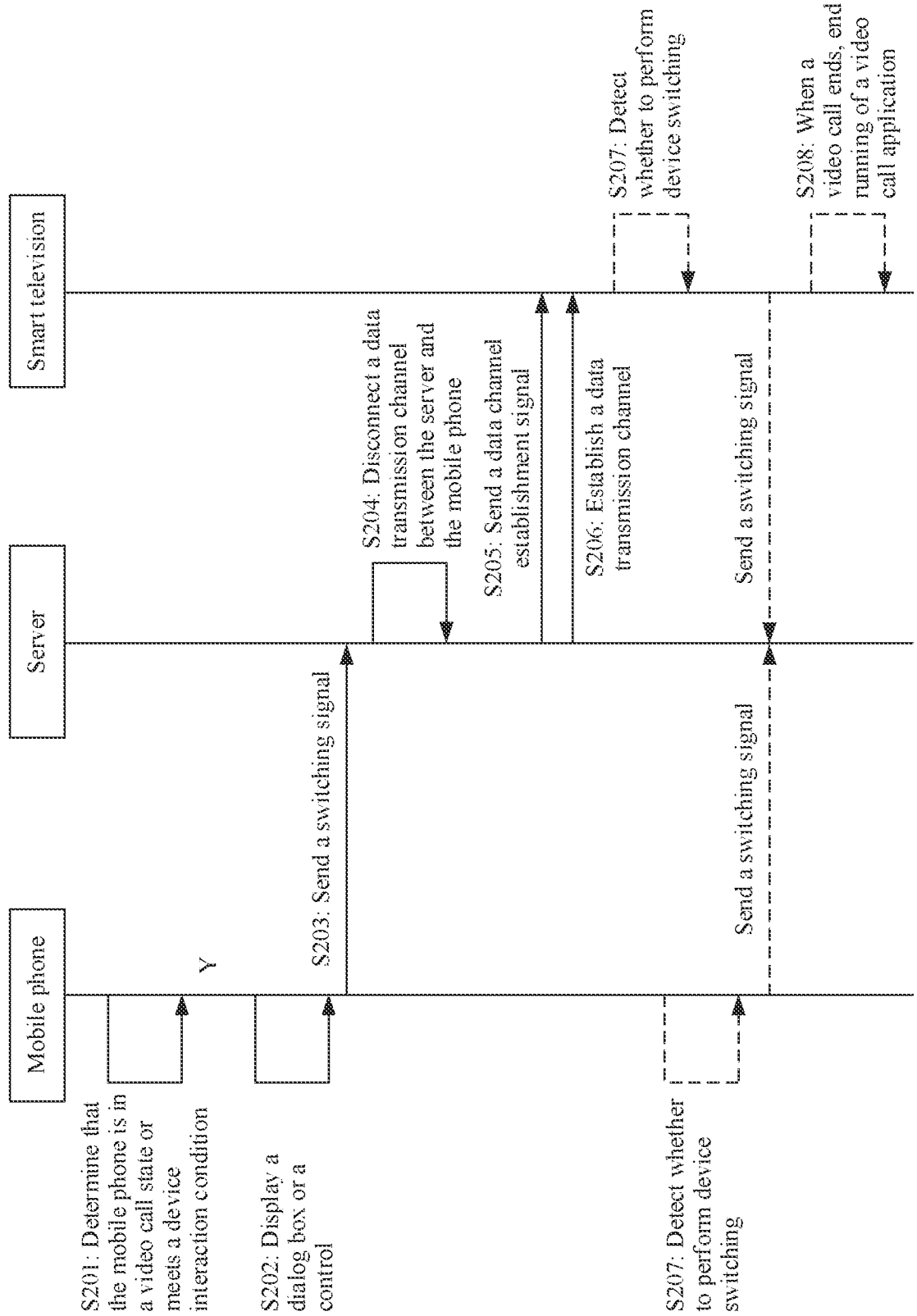
FIG. 18 is a schematic diagram of a signal procedure during another device interaction according to an embodiment of this application.

FIG. 18 shows an example of specific steps of a method in which a mobile phone interacts with a smart television by using a server.

S201: The mobile phone determines that the mobile phone is in a video call state or meets a condition of a video call state. For details of this step, refer to step S101. Details are not described herein again.

S202: The mobile phone may display, on a graphical user interface, the dialog box 210 shown in FIG. 3(d), or the control 230 and the control 231 shown in FIG. 7(b), and determine an interactive device by detecting an operation performed on the foregoing elements; or may display the control 232 shown in FIG. 7(c) and/or the dialog box 24 shown in FIG. 7(d), and determine a device selected by a user by detecting an operation performed on the foregoing elements.

S203: The mobile phone may send a switching signal to the server, where the switching signal is used to indicate the server to stop continuing mutual transmission of audio and video data related to current video call information with the mobile phone. The switching signal may include an uplink switching signal and a downlink switching signal. The uplink switching signal may be used to enable the server to stop operations such as data collection, encoding, and uploading on a camera and a microphone of the mobile phone. The downlink switching signal is used to enable the server to stop sending, to the mobile phone, data collected by a camera and a microphone of a mobile phone of the other party of a video call.

S204: The server disconnects a data transmission channel between the server and the mobile phone. Specifically, after the mobile phone sends the switching signal to the server, the server disconnects the data transmission channel that is established between the server and the mobile phone and that is used to transmit the audio and video data, so that the mobile phone cannot continue the video call with the other party of the video call. In addition, the server also releases related computing resources and memory resources between the server and the mobile phone, to avoid additional consumption of network resources.

S205: The server sends a data channel establishment signal to the smart television, where the data channel establishment signal is used to notify the smart television that the server is to establish a data connection to the smart television. Specifically, the data channel establishment signal may include running data of a current video call application. For example, before the mobile phone disconnects the data transmission channel from the server, the mobile phone is on a page for chatting with Max. In response to received running data, the smart television displays a chat page of Max after opening the video call application.

In some embodiments, the data channel establishment signal may include an application start indication. The indication is used to start the video call application. After receiving the application start indication, the smart television opens the video call application.

S206: The server establishes a data transmission channel connected to the smart television. Specifically, the server receives, by using the data transmission channel, the audio and video data sent by the smart television, and the server sends the audio and video data related to the video call to the smart television.

S207: The smart television may detect whether to trigger video call device switching, and if a corresponding operation is detected, the smart television sends a switching signal to the server; or the mobile phone may detect whether to trigger video call device switching, and if a corresponding operation is detected, the mobile phone sends a switching signal to the server, where the switching signal is used to indicate the server to cut off the data transmission channel between the mobile phone and the smart television.

In some other embodiments, when the mobile phone is disconnected from a local area network, the mobile phone may send a switching signal to the server. The switching signal enables the server to disconnect the data transmission channel between the server and the smart television, establish the data transmission channel between the server and the mobile phone, and switch the video call from the smart television to the mobile phone for continuing.

In some other embodiments, when the smart television detects that the smart television is not connected to the mobile phone, the smart television may pause a currently played video. In some other embodiments, when detecting that the mobile phone is disconnected from the local area network, a control device in the local area network may send a pause message to the smart television. After receiving the pause message, the smart television may pause a currently played video.

S208: If the video call is switched from the smart television back to the mobile phone, or the video call ends on the smart television, the smart television ends running of the video call application.

Figure 19:
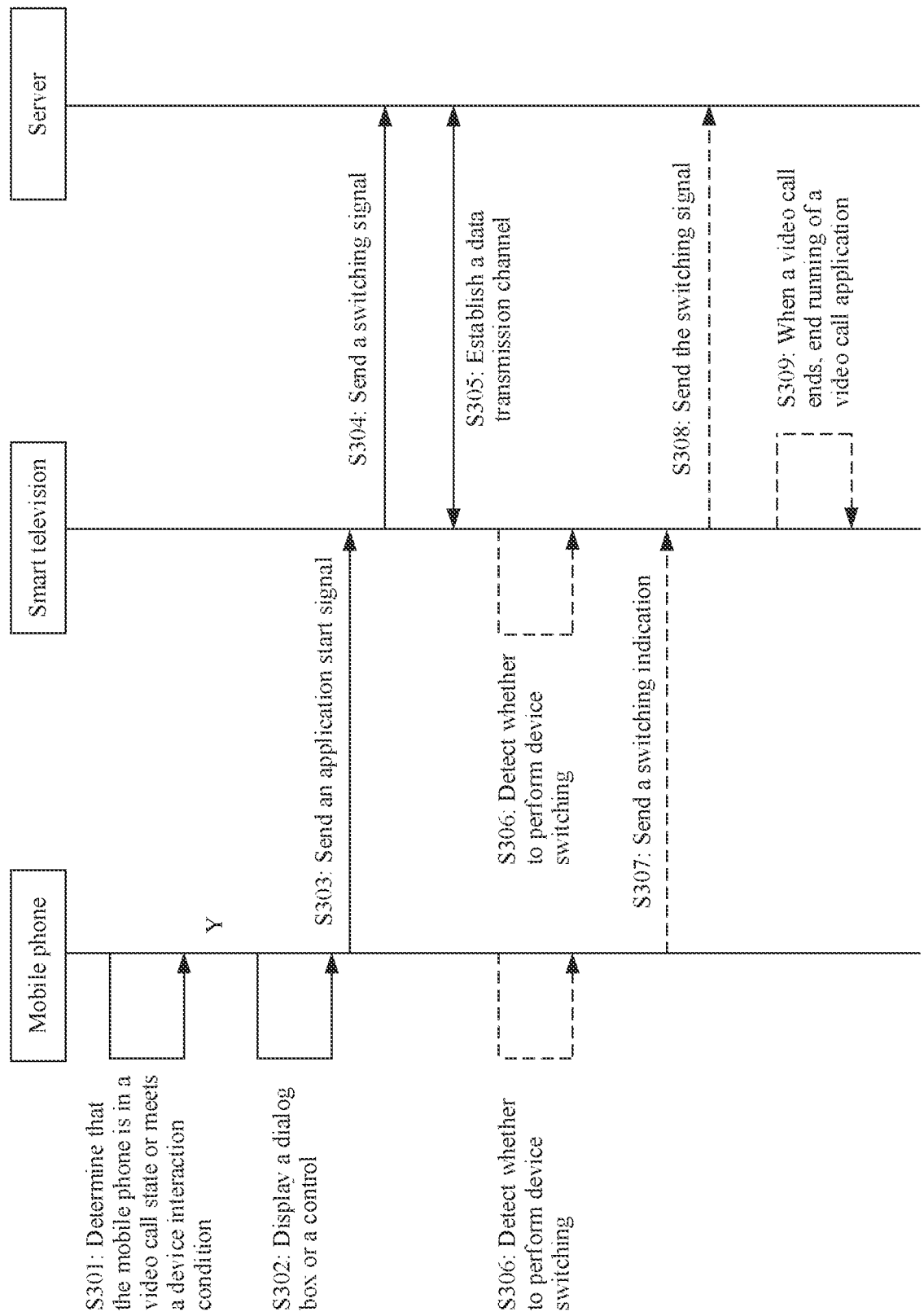
FIG. 19 is a schematic diagram of a signal procedure during still another device interaction according to an embodiment of this application.

FIG. 19 shows an example of specific steps of a method in which a mobile phone interacts with a smart television, so that the smart television can further interact with a server.

S301: The mobile phone determines that the mobile phone is in a video call state or meets a device interaction condition. For details of this step, refer to step S101. Details are not described herein again.

S302: The mobile phone may display, on a graphical user interface, the dialog box 210 shown in FIG. 3(d), or the control 230 and the control 231 shown in FIG. 7(b), and determine an interactive device by detecting an operation performed on the foregoing elements; or may display the control 232 shown in FIG. 7(c) and/or the dialog box 24 shown in FIG. 7(d), and determine a device selected by a user by detecting an operation performed on the foregoing elements.

S303: The mobile phone may send a video calling application starting signal to the smart television, and after the smart television receives the signal, the smart television starts a video calling application installed on the smart television. In some embodiments, the signal may carry running data of the current video call application, and the running data indicates current application data of the video call application, for example, current contact information of the video call application. After starting the video call application installed on the smart television, the smart television may automatically jump to a chat interface of an indicated contact based on the running data.

S304: The smart television may send a switching signal to the video calling application server, where the switching signal is used to indicate the server to cut off a previous data transmission channel with the mobile phone and establish a data transmission channel with the smart television. Specifically, after the server receives the switching signal, the server disconnects the data transmission channel that is established between the server and the mobile phone and that is used to transmit audio and video data, so that the mobile phone cannot continue the video call with the other party of the video call. In addition, the server also releases related computing resources and memory resources between the server and the mobile phone, to avoid additional consumption of network resources.

S305: The server establishes the data transmission channel with the smart television, starts to send, to the smart television, audio and video data collected by a device of the other party of the video call, and receives, from the smart television, the audio and video data collected by the smart television.

S306: The mobile phone may detect whether to trigger video call device switching, and if a corresponding operation is detected, perform S307.

S307: The mobile phone sends a switching indication to the smart television.

S308: The smart television may detect whether to trigger video call device switching, or receive a switching indication from the mobile phone, and if a corresponding operation is detected, the smart television sends a switching signal to the server, where the switching signal is used to indicate the server to cut off the data transmission channel between the server and the smart television and establish the data transmission channel between the smart television and the mobile phone.

S309: If the video call is switched from the smart television back to the mobile phone, or the video call ends on the smart television, the smart television ends running of the video call application.

Implementations of the present invention may be combined at random to implement different technical effects.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid-State Drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A device interaction method implemented by a first device, wherein the device interaction method comprises:
 displaying a first interface;
 determining that a first hardware resource is being used;
 determining a first application that is using the first hardware resource;
 determining that a second hardware resource is being used;
 determining a second application that is using the second hardware resource;
 displaying a first control on the first interface when a preset condition is met, wherein the preset condition comprises that the first application and the second application are a same application and a second device has a video playback capability, wherein the second device and the first device are connected to a same local area network; and
 sending first information to the second device in response to a first operation on the first control,
 wherein the first information enables the second device to display a second interface,
 wherein the second interface is associated with the first interface, and
 wherein the first hardware resource is a camera and the second hardware resource is an audio resource, or the first hardware resource is the audio resource and the second hardware resource is the camera.

2. The device interaction method of claim 1, wherein the camera is a front-facing camera.

3. The device interaction method of claim 1, wherein the audio resource comprises a microphone.

4. The device interaction method of claim 1, wherein the first interface is of a video call.

5. The device interaction method of claim 1, wherein the second interface is the same as the first interface.

6. The device interaction method of claim 1, wherein the first interface and the second interface comprise a same element and different layouts.

7. The device interaction method of claim 4, further comprising connecting the video call after displaying the first interface.

8. The device interaction method of claim 7, further comprising further connecting, in response to the first operation, the video call.

9. The device interaction method of claim 1, further comprising:
 determining, using a first message from a camera manager, that the camera is being used; and
 determining, using a second message from an audio manager, that the audio resource is being used.

10. The device interaction method of claim 1, further comprising:
  determining a first foreground application when the first hardware resource is being used;
  determining a second foreground application when the second hardware resource is being used;
  making a first determination that the second foreground application and the first foreground application are the same application; and
  determining, in response to the first determination, the first foreground application as the first application and the second foreground application as the second application.

11. The device interaction method of claim 1, further comprising:
  determining, based on a first time of receiving the first message, a first foreground application when the first hardware resource is being used;
  determining, based on a second time of receiving the second message, a second foreground application when the second hardware resource is being used;
  identifying that the second foreground application and the first foreground application are a same application; and
  determining, in response to the identifying that the second foreground application and the first foreground application are the same application, the first foreground application as the first application and the second foreground application as the second application.

12. The device interaction method of claim 10, further comprising:
  making a second determination that the first foreground application and the second foreground application are different applications; and
  in response to the second determination:
    determining, using first permission access information of the first hardware resource, the first application that uses the first hardware resource; and
    determining, using second permission access information of the second hardware resource, the second application that uses the second hardware resource.

13. The device interaction method of claim 10, further comprising:
  making a second determination that the first foreground application and the second foreground application are different applications; and
  determining, in response to the second determination and using permission access information of the microphone, a third application that uses the audio resource.

14. The device interaction method of claim 1, further comprising:
  displaying a second control on the first interface when the preset condition further comprises that a third device has the video playback capability, wherein the third device and the first device are connected to the same local area network; and
  sending, to the third device in response to an operation on the second control, second information to enable the third device to display a third interface associated with the first interface.

15. The device interaction method of claim 1, further comprising:
  receiving a video call request;
  further displaying, in response to receiving the video call request, the first interface; and
  sending, when the preset condition is met, third information to the second device to enable the second device to display the video call request.

16. The device interaction method of claim 1, further comprising displaying the first interface when the second device displays the second interface and when the first device is disconnected from the local area network.

17. The device interaction method of claim 1, further comprising displaying a third control when the second device displays the second interface to enable the second device to skip displaying the second interface in response to an operation on the third control.

18. The device interaction method of claim 1, wherein the preset condition further comprises that the first application is comprised in an application list, and wherein the application list comprises one or more applications.

19. A device interaction system comprising:
  a second device connected to a local area network; and
  a first device connected to the local area network and configured to:
    display a first interface;
    determine that a first hardware resource is being used;
    determine a first application that is using the first hardware resource;
    determine that a second hardware resource is being used, wherein the first hardware resource is a camera and the second hardware resource is an audio resource, or the first hardware resource is the audio resource and the second hardware resource is the camera;
    determine a second application that is using the second hardware resource;
    display a first control on the first interface when a preset condition is met, wherein the preset condition comprises that the first application and the second application are a same application and that the second device has a video playback capability; and
    send first information to the second device in response to a first operation on the first control,
  wherein the second device is configured to display a second interface in response to receiving the first information, wherein the second interface is associated with the first interface.

20. An electronic device comprising:
  a memory configured to store instructions; and
  a processor coupled to the memory and configured to execute the instructions to cause the electronic device to:
    display a first interface;
    determine that a first hardware resource is being used;
    determine a first application that is using the first hardware resource;
    determine that a second hardware resource is being used;
    determine a second application that is using the second hardware resource;
    display a first control on the first interface when a preset condition is met, wherein the preset condition comprises that the first application and the second application are a same application and that a second device has a video playback capability, and wherein the second device and the first device are connected to a same local area network; and
    send first information to the second device in response to a first operation on the first control,
  wherein the first information enables the second device to display a second interface,
  wherein the second interface is associated with the first interface, and wherein the first hardware resource is a camera and the second hardware resource is an audio resource, or the first hardware resource is the audio resource and the second hardware resource is the camera.

* * * * *